US011326993B2

(12) United States Patent
Shishido et al.

(10) Patent No.: US 11,326,993 B2
(45) Date of Patent: May 10, 2022

(54) DEFORMATION TESTING APPARATUS

(71) Applicants: YUASA SYSTEM CO., LTD., Okayama (JP); Tokyo Institute of Technology, Tokyo (JP)

(72) Inventors: Atsushi Shishido, Tokyo (JP); Norihisa Akamatsu, Tokyo (JP); Ryo Taguchi, Tokyo (JP); Yoshihito Ota, Okayama (JP); Hisao Sasaki, Okayama (JP); Yasuhisa Okazaki, Okayama (JP)

(73) Assignee: Yuasa System Co., LTD., Tokyo (JP)

( * ) Notice: Subject to any disclaimer, the term of this patent is extended or adjusted under 35 U.S.C. 154(b) by 56 days.

(21) Appl. No.: 17/052,101

(22) PCT Filed: Jan. 6, 2020

(86) PCT No.: PCT/JP2020/000093
§ 371 (c)(1),
(2) Date: Oct. 30, 2020

(87) PCT Pub. No.: WO2021/038898
PCT Pub. Date: Mar. 4, 2021

(65) Prior Publication Data
US 2021/0215586 A1 Jul. 15, 2021

(30) Foreign Application Priority Data

Aug. 29, 2019 (JP) .............................. JP2019-156467

(51) Int. Cl.
*G01N 21/88* (2006.01)
*G01N 3/06* (2006.01)
(Continued)

(52) U.S. Cl.
CPC ............... *G01N 3/068* (2013.01); *G01N 3/32* (2013.01); *G06T 7/001* (2013.01); *G06T 7/60* (2013.01);
(Continued)

(58) Field of Classification Search
CPC ............ G01N 3/068; G01N 3/32; G01N 3/34; G01N 2021/8883; G01N 2021/8887;
(Continued)

(56) References Cited

U.S. PATENT DOCUMENTS 5,101,655 A * 4/1992 Mueller .................... G01N 3/56
73/150 R
5,992,224 A * 11/1999 Weinhold ................. G01N 3/42
73/81
(Continued)

FOREIGN PATENT DOCUMENTS

CN 10859347 8/2018
JP 10202736 8/1998
(Continued)

*Primary Examiner* — Howard D Brown, Jr.
(74) *Attorney, Agent, or Firm* — Trojan Law Offices

(57) ABSTRACT

Provide is a deformation testing apparatus in which a sign of breakage of a specimen under a deformation test can be detected before an actual breakage. The deformation testing apparatus carrying out a plurality of deformation cycles includes an image capturing means; reference data storing means storing the reference data showing the deformation state calculated based on the reference image data shot by the image capturing means; reference cycle number deformation data calculating means to calculate the reference data; detection cycle number deformation data calculating means to calculate detection cycle number deformation data showing the deformation state based on the detection image data shot at the detection cycle number being larger than the reference cycle number; and change detection means to detect that the deformation caused in the specimen is changed based on the reference cycle number deformation data and the detection cycle number deformation data.

20 Claims, 32 Drawing Sheets

(51) Int. Cl.
*H04N 5/232* (2006.01)
*G01N 3/32* (2006.01)
*G06T 7/00* (2017.01)
*G06T 7/60* (2017.01)
*G01N 3/34* (2006.01)

(52) U.S. Cl.
CPC ..... *H04N 5/23229* (2013.01); *H04N 5/23299* (2018.08); *G01N 3/34* (2013.01); *G06T 2207/30108* (2013.01)

(58) Field of Classification Search
CPC .... G01N 2203/0647; G01N 3/20; G01N 3/08; G01N 21/8851; G01N 2203/0017; G01N 2203/0023; G01N 2203/0067; G01N 2203/0278; G06T 7/001; G06T 7/60; G06T 2207/30108; H04N 5/23229; H04N 5/23299; H04N 5/232
See application file for complete search history.

(56) References Cited

U.S. PATENT DOCUMENTS

| | | | | |
|---|---|---|---|---|
| 2003/0188585 | A1* | 10/2003 | Esser | G01N 3/38 73/826 |
| 2006/0070452 | A1* | 4/2006 | Bohlmann | G01N 3/08 73/800 |
| 2013/0196872 | A1* | 8/2013 | Low | B03C 5/026 506/15 |
| 2014/0023591 | A1* | 1/2014 | Sen Gupta | A61K 49/0084 424/9.6 |
| 2016/0015833 | A1* | 1/2016 | Sen Gupta | C12Y 304/21068 424/9.6 |
| 2017/0211922 | A1* | 7/2017 | Aguilar Amaya | G01B 7/345 |
| 2018/0281506 | A1* | 10/2018 | Egashira | B44C 1/105 |
| 2018/0304683 | A1* | 10/2018 | Mashita | B60C 11/00 |
| 2020/0264082 | A1* | 8/2020 | Shao | G06T 7/579 |
| 2020/0408509 | A1* | 12/2020 | Riddick | H04N 7/183 |

FOREIGN PATENT DOCUMENTS

| | | |
|---|---|---|
| JP | 2001-021470 | 1/2001 |
| JP | 2013-057538 | 3/2013 |
| JP | 2013-064658 | 4/2013 |
| JP | 2013-125002 | 6/2013 |
| JP | 2014-157038 | 8/2014 |
| JP | 2016-042048 | 3/2016 |
| JP | 2016-080694 | 5/2016 |
| JP | 2019-039743 | 3/2019 |
| JP | 2020-071082 | 5/2020 |
| KR | 10-2017-0048642 A | 5/2017 |

* cited by examiner

DEFORMATION TESTING APPARATUS

FIELD OF THE INVENTION

The present invention relates to a deformation tester (i.e., deformation testing apparatus) and more specifically relates to a deformation testing apparatus that tests durability of a specimen such as a thin glass plate and a resin plate to be used for a flexible display such as a substrate of a mobile phone or the like and an organic electroluminescence display or the like by deforming the specimen.

BACKGROUND ART

A deformation testing apparatus for testing durability of a plane-like specimen such as a thin glass plate and a resin plate to be used for a flexible display such as a substrate of a mobile phone or the like and an organic electroluminescence display or the like by deforming the specimen has been known before (for example, refer to Patent References 1-6).

PRIOR ART REFERENCE

Patent Reference

[Patent Reference 1] Japanese Patent Application Publication No. 2016-80694
[Patent Reference 2] Japanese Patent Application Publication No. 2016-42048
[Patent Reference 3] Japanese Patent Application Publication No. 2013-125002
[Patent Reference 4] Japanese Patent Application Publication No. 2013-64658
[Patent Reference 5] Japanese Patent Application Publication No. 2013-57538
[Patent Reference 6] Japanese Patent Application Publication No. 2019-39743

SUMMARY OF THE INVENTION

Problems to be Solved by the Invention

In a testing apparatus including a detector, the detector can detect stably and accurately state of a portion of a specimen to be tested. However, in a deformation testing machine in which a portion of the specimen is deformed, there is demand to observe a process in which the specimen is broken or largely deformed plastically (hereinafter, breakage and large plastic deformation is collectively referred to as "breakage and the like") and it is preferable to observe the specimen to be tested by the deformation testing machine after detecting a sign of breakage and the like occurring, but before the actual breakage and the like.

Here, in the present disclosure, provided is a deformation testing machine that can detect a sign of breakage and the like before the breakage or the like in the specimen to be provided to the deformation testing machine.

Means Solving the Problem

In the Japanese patent application No. 2018-203662 of the Applicants (The entire contents of Japanese patent application No. 2018-203662 are incorporated herein by reference), provided is a deformation testing machine in which a state of a specimen can be successfully detected during a period of time when the specimen bridged between a first edge portion of a first attachment face and a second edge portion of a second attachment face is folded and unfolded repeatedly. For example, provided is a deformation testing machine comprising: a first attachment plate having a first attachment face to which a specimen is attached and a first edge portion that is an edge portion of the first attachment face provided along a first line segment; a second attachment plate having a second attachment face to which the specimen is attached and a second edge portion that is an edge portion of the second attachment face provided along a second line segment; supporting means capable of supporting the first attachment plate and the second attachment plate such that the first attachment plate is rotatable about the first line segment as a center relatively with respect to the second line segment and/or the second attachment plate is rotatable about the second line segment as a center relatively with respect to the first line segment while the first line segment and the second line segment are kept mutually parallel and their relative positions are held such that a gap across which the specimen is bridged is formed between the first edge portion and the second edge portion; rotating means capable of rotating the first attachment plate about the first line segment as the center relatively with respect to the second line segment and/or the second attachment plate about the second line segment as the center relatively with respect to the first line segment; and detector supporting means capable of supporting a detector to detect a state of a portion of the specimen provided between the first edge portion and the second edge portion. And the first attachment plate is rotated about the first line segment as the center relatively with respect to the second line segment and/or the second attachment plate is rotated about the second line segment as the center relatively with respect to the first line segment. In this way, with respect to the deformation testing machine to deform a portion of the specimen provided between the first edge portion and the second edge portion, an absolute position of a subject area that is shaped in a virtual rectangle having two sides corresponding to the first line segment and the second line segment, respectively, is to be changed. Thus, the deformation testing machine is disclosed in which, irrespective of the absolute position change of the subject area, the relative position of the subject area relative to the detector supported by the detector supporting means is substantially the same. Thus, in a state where the specimen is attached to the first attachment face and the second attachment face such that the specimen is bridged between the first edge portion of the first attachment face and the second edge portion of the second attachment face, the force other than that to bend the specimen in an intended manner can be prevented or reduced by rotating the first attachment plate about the first line segment as the center relatively with respect to the second line segment and/or rotating the second attachment plate about the second line segment as the center relatively with respect to the first line segment while the first line segment defining the first edge portion and the second line segment defining the second edge portion are kept mutually parallel and their relative positions are held. The other force may include, for example, a force to bend the specimen suddenly and inhomogeneously and a force to stretch the specimen and a force to compress the specimen. For example, without using a spring plate 12 described in Patent Reference 1, the force other than that to bend the specimen in the intended manner can be reduced or prevented from being applied to the specimen. Further, both edge portions can be made close with ease such that the distance between the first edge portion and the second edge portion may become extremely small. The distance can be theoretically as close to zero as possible. And the specimen can be tested by folding (bending) and unfolding the specimen repeatedly with whatever small radius of bending. And, seeing from the detector supported by the detector supporting means, the relative position of the subject area has substantially the same position. The portion of the specimen provided between the first edge portion and the second edge portion is located near the subject area. And the relative distance may be defined by the distance and/or the direction. In this way, although the absolute position of the subject area in the deformation test is changed, the relative position (distance and direction) of the detector relative to the portion of the specimen provided between the first edge portion and the second edge portion may be kept almost the same. And the state of the portion as the objective can be detected stably and accurately by the detector.

In the present disclosure, a deformation testing apparatus (hereinafter referred to as "present testing apparatus") is a deformation testing apparatus in which a plurality of deformation cycles are carried out such that the same deformation is supposed to be caused in a specimen for each cycle and it is detected that the deformation caused in the specimen varies as the number of deformation cycles having been carried out is increased, the deformation testing apparatus comprises: image capturing means (or image capturing device, camera, ad so on) to create captured image data by shooting the specimen; reference data storing means (or reference data storing unit) to store reference data that is reference cycle number deformation data showing a deformation state of the specimen at a reference cycle number calculated based on the reference captured image data or the reference captured image data of the specimen shot by the image capturing means at the reference cycle number of a cycle number of times the deformation cycle is performed as the reference deformation caused in the specimen; reference cycle number deformation data calculating means (or reference cycle number deformation data calculating unit) to calculate reference cycle number deformation data based on reference captured image data; detection cycle number deformation data calculating means (or detection cycle number deformation data calculating unit) to calculate detection cycle number deformation data showing a deformation state of the specimen at a detection cycle number based on detection captured image data of the specimen shot at the detection cycle number of a cycle number of times the deformation cycle is performed, which is greater than the reference cycle number; and change detection means (or change detection unit) to detect a change between deformations caused in the specimen at the reference cycle number and the detection cycle number based on the reference cycle number deformation data and the detection cycle number deformation data.

The present testing apparatus performs a deformation test in which a deformation cycle is carried out a plurality of times in the same manner as in the deformation cycle where the specimen is folded and unfolded (bent and unbent) in the deformation testing apparatus of Patent Reference 6. The deformation cycle in the present testing apparatus is supposed to cause the same deformation in the specimen for each cycle and may usually correspond to the case where the specimen is deformed in the same manner in each deformation cycle in an elastic deformation region. For example, the deformation cycle is that two portions of the specimen are shifted such that relative positions of one portion and the other portion are changed and, as an example of this case, it is exemplified that the same relative position relationship changing from the first relative position to the second relative position (different from the first relative position) and then to the first relative position is kept for each cycle. And the present testing apparatus detects that the deformation caused in the specimen varies as the number of performed deformation cycles is increased in the deformation test in which a plurality of deformation cycles are performed. As mentioned above, the deformation cycle may be supposed to cause the same deformation in the specimen at each cycle. The change of deformation caused in the specimen with an increase of the number of deformation cycles having been performed may be considered a sign of breakage or the like caused by the change in the organization or the like of the specimen. And it is thought that the sign of breakage or the like can be detected before the actual breakage or the like.

The present testing apparatus may comprise image capturing means; reference data storing means; reference cycle number deformation data calculating means; detection cycle number deformation data calculating means; and change detection means. And, using reference captured image data of the specimen shot at the reference cycle number of a cycle number of times the deformation cycle is performed as the reference deformation caused in the specimen and detection captured image data of the specimen shot at the detection cycle number of a cycle number of times the deformation cycle is performed, which is greater than the reference cycle number, the present testing apparatus can detect a change of the deformation caused in the specimen at the detection cycle number (greater than the reference cycle number with respect to the cycle number of times the deformation cycle is performed) as compared to the deformation caused in the specimen at the reference cycle number.

The image capturing means creates captured image data by shooting the specimen.

The reference cycle number deformation data calculating means calculates reference cycle number deformation data showing a deformation state of the specimen at the reference cycle number base don the reference captured image data.

The reference data storing means stores reference data. The reference data comprises the reference captured image data or the reference cycle number deformation data. That is, the reference data storing means may stores the reference captured image data itself. And it may be configured to store the reference cycle number deformation data calculated by the reference cycle number deformation data calculating means. Here, in the case where the reference data storing means stores the reference captured image data as the reference data, the reference captured image data is retrieved from the reference data storing means later and the reference cycle number deformation data calculating means calculates the reference cycle number deformation data based on the thus-retrieved reference captured image data. And in the case where the reference data storing means stores the reference cycle number deformation data as the reference data, the reference cycle number deformation data calculating means calculate the reference cycle number deformation data based on the reference captured image data beforehand such that the reference data storing means stores the thus-calculated reference cycle number deformation data as the reference data.

The detection cycle number deformation data calculating means calculates the detection cycle number deformation data showing the deformation state of the specimen at the detection cycle number based on the detection captured image data.

The change detection means detects that the deformation caused in the specimen changes between at the reference cycle number and at the detection cycle number based on the reference cycle number deformation data and the detection cycle number deformation data.

As mentioned above, the present testing apparatus may detect that the deformation caused in the specimen at the detection cycle number changes as compared to the deformation caused in the specimen at the reference cycle number. Then, the sign of breakage and the like with respect to the specimen provided to the deformation test can be detected before the actual breakage or the like.

In the present testing apparatus, the reference cycle number deformation data calculating means may comprise: reference formula deriving means (or reference formula deriving unit) to derive a reference formula of a formula expressing the shape of the specimen based on the reference captured image data; reference-deformation-degree calculating means (reference-deformation-degree calculating unit) to calculate reference deformation degree showing the deformation degree in at least two or more portions of the specimen based on the reference formula derived by the reference formula deriving means; and reference-deformation-degree selecting means (or reference-deformation-degree selecting unit) to select what is judged to be the largest deformation degree among at least two or more reference deformation degrees calculated by the reference-deformation-degree calculating means as the reference cycle number deformation data.

The reference formula deriving means derives the reference formula of a formula expressing the shape of the specimen based on the reference captured image data. Various kinds of formulae could be adopted as the reference formula and, by way of example, there may be an equation having an expression of a coordinate value on the left-hand side and another expression of a polynomial of degree n (n is an integer of one or more) on the right-hand side using the orthogonal coordinate system with respect to the reference captured image data. The reference formula deriving means calculates the reference deformation degree showing deformation degrees of at least two or more portions of the specimen based on the reference formula. And the reference-deformation-degree selecting means selects, as the reference cycle number deformation data, the one judged to have the largest deformation degree among at least two or more reference deformation degrees calculated by the reference-deformation-degree calculating means. Thus, reference deformation degrees of different portions of the specimen can be calculated using the reference formula made based on the reference captured image data. And among them, the one judged to have the largest deformation degree can be adopted as the reference cycle number deformation data. Thus, it can be the reference cycle number deformation data that shows a deformation state of a portion of the specimen in which the large deformation is caused among deformations at the reference cycle number. And a sign of the breakage or the like can be detected well based on the state of the portion of the specimen in which the large deformation that tends to lead to the breakage or the like is caused.

In the present testing apparatus, the detection cycle number deformation data calculating means may comprise: detection formula deriving means (detection formula deriving unit) to derive a detection formula of a formula showing the shape of the specimen based on the detection captured image data; detection-deformation-degree calculating means (detection-deformation-degree calculating unit) to calculate a detection deformation degree showing deformation degrees of at least two or more portions of the specimen based on the detection formula derived by the detection formula deriving means; and detection-deformation-degree selecting means (or detection-deformation-degree selecting unit) to select the one judged to have the largest deformation degree among at least two or more detection deformation degrees calculated by the detection-deformation-degree calculating means.

The detection formula deriving means derives the detection formula of a formula showing the shape of the specimen based on the detection captured image data. Various kinds of formulae could be adopted as the detection formula in a similar manner to that of the reference formula and, by way of example, there may be an equation having an expression of a coordinate value on the left-hand side and another expression of a polynomial of degree n (n is an integer of one or more) on the right-hand side using the orthogonal coordinate system with respect to the detection captured image data. The detection formula deriving means calculates the detection deformation degree showing deformation degrees of at least two or more portions of the specimen based on the detection formula. And the detection-deformation-degree selecting means selects, as the detection cycle number deformation data, the one judged to have the largest deformation degree among at least two or more detection deformation degrees calculated by the detection-deformation-degree calculating means. Thus, detection deformation degrees of different portions of the specimen can be calculated using the detection formula made based on the detection captured image data and, among them, the one judged to have the largest deformation degree can be adopted as the reference cycle number deformation data. Thus, it can be the detection cycle number deformation data that shows a deformation state of a portion of the specimen in which the large deformation is caused among deformations at the detection cycle number. And a sign of the breakage or the like can be detected well based on the state of the portion of the specimen in which the large deformation that tends to lead to the breakage or the like is caused.

In the present testing apparatus, the detection cycle number deformation data and the reference cycle number deformation data may be a curvature or a radius of curvature showing the shape of the specimen.

The curvature or the radius of curvature can show a deformation state of the specimen well. And, if this is used as the detection cycle number deformation data and the reference cycle number deformation data, it can be detected well that the deformation caused in the specimen changes between at the reference cycle number and at the detection cycle number. And, a sign of the breakage of the like of the specimen provided to the deformation testing apparatus can be detected well.

In the present testing apparatus, the change detection means (hereinafter referred to as "rate-of-change present testing apparatus") may be the one that detects the deformation caused in the specimen is changed between at the reference cycle number and at the detection cycle number from a rate of change that is a rate of one and the other among the detection cycle number deformation data and the reference cycle number deformation data.

Thus, the change of deformation can be detected from the rate of change that is a rate of one to the other among the detection cycle number deformation data A and the reference cycle number deformation data B ((A/B) or (B/A)). And it can surely be detected what degree of the scale of the change is caused. A sign of the breakage or the like to be caused in the specimen provided to the deformation test can be detected well.

In the rate-of-change present testing apparatus, it may be detected that the deformation caused in the specimen varies between at the reference cycle number and at the detection cycle number by comparing a value obtained from the product of the one times a predetermined value or from the quotient of the one divided by a predetermined value with a value of the other, that is, depending on which is smaller or larger.

By judging which is smaller or larger, it is judged whether a value of the product of one of the detection cycle number deformation data and the reference cycle number deformation data times a predetermined value C or a value of the quotient of the one divided by the value C (for example, if the one is A, (C×A) or (A/C)) is smaller or larger than a value of the other (for example, if the one is A then the other is B), it can be judged by a threshold value (C or (1/C)) of the rate of change when the sign of the breakage or the like caused in the specimen is detected.

In the present testing apparatus, when the change detection means detects the deformation caused in the specimen is changed between at the reference cycle number and at the detection cycle number, the deformation test may be stopped.

In this way, the deformation test can be stopped if it is detected that the deformation caused in the specimen is changed between at the reference cycle number and at the detection cycle number. The sign of the breakage or the like can be detected before the breakage or the like (stop the deformation test) and, after detection, the specimen having been provided to the deformation test can be observed. For example, the process that the specimen is broken or a large plastic deformation is caused therein can be observed.

In the present testing apparatus, the image capturing means may be the one that takes an image of the specimen at a different shoot timing in the same cycle or in a different cycle along the cycle progression as the temporal progression in one deformation cycle. The reference data storing means may store the reference data in association with a reference shoot cycle progression that is a cycle progression of shoot timing with respect to the reference data. There may also be provided subject reference data reading means (subject reference data reading unit) to read the reference data from the reference data storing means, the reference data being associated with the reference shoot cycle progression which is the same as or the closest to the detection shoot cycle progression of the cycle progression of shooting with respect to the detection captured image data. The change detection means may be that to conduct detection based on the reference cycle number deformation data based on the reference data read out by the subject reference data reading means (hereinafter referred to as "cycle progression present testing apparatus").

In the case where the image capturing means carries out the image capturing at a different shoot timing in the same or different cycle as the cycle progression, it may be difficult to detect the change based on the reference captured image data and the detection captured image data taken at a quite different shoot timing of the cycle progression. For example, in the case where the change caused in the specimen varies largely depending on the cycle progression in on deformation cycle, the change of the deformation may be detected based on the reference captured image data and the detection captured image data in almost the same cycle progression. Here, the cycle progression may signify a temporal progression indicating how much degree the operation proceeds in one deformation cycle. For example, suppose the start of the deformation is 0% and the completion of the deformation cycle is 100%, the cycle progression may be expressed by 46%, 73%, and so on. And the calculation of such 46% and 73% may be measured by the deformation amount of the specimen in the deformation cycle. For example, suppose that the deformation cycle is that two different positions of the specimen are relatively displaced, a ratio of q1 of the relative displacement amount of the two positions from the start to the present time in the deformation cycle to the sum Q1 of the relative displacement amount of the two positions in the whole one deformation cycle ((q1/Q1)×100)% can be used. And the elapsed time of the deformation cycle may be used as the reference. Suppose that the necessary time for one deformation cycle is Qt, a ratio of the time qt elapsed from the start to the present time of the deformation cycle to the Qt ((qt/Qt)×100)% can be used. And that the shoot timing of the image capturing means is a different cycle progression includes both the case where the shooting is conducted at a different timing of the cycle progression in the same deformation cycle and the case where the shooting is conducted at a different timing of the cycle progression in a different deformation cycle. For example, at the deformation cycle of 503th, the shooting is conducted at two cycle progressions of 40% and 50%. And, for example, the shooting is conducted at the cycle progression of 40% in the 503th deformation cycle and the shooting is conducted at the cycle progression of 50% in the 506th deformation cycle.

As mentioned above, in the case where the image capturing means shoots an image at a different shoot timing in the same or different cycle of the cycle progression, the change of the deformation can be detected well based on the reference captured image data and the detection captured image data taken at close shoot timings of the cycle progression. That is, the reference data storing means stores the reference data in association with the reference shoot cycle progression of the cycle progression at the shoot timing with respect to the reference data. The subject reference data reading means reads out the reference data associated with the reference shoot cycle progression that is the same as or close to the detection shoot cycle progression of the shooting cycle progress with respect to the detection captured image data. And the change detection means conducts the detection based on the reference cycle number deformation data based on the reference data (the reference data with respect to the reference shoot cycle progression close to the detection shoot cycle progression) read out by the subject reference data reading means.

In the cycle progression present testing apparatus, the image capturing means has associated data creation means (associated data creation unit) to create associated data in which the captured image data that the image capturing means takes and deformation operation information with respect to the shoot timing including the deformation cycle number and the cycle progression in the deformation test are associated with each other; and the reference data storing means may be that stores the associated data in which the cycle progression included in the associated data created by the associated data creation means is taken as the reference shoot cycle progression (hereinafter referred to as "associated present testing apparatus").

Thus, the associated data creation means creates the associated data. The associated data is data in which the captured image data taken by the image capturing means and the deformation operation information at the time of taking the captured image data are associated with each other and the deformation operation information includes information with respect to the deformation cycle number and the cycle progression in the deformation test. And the reference data storing means stores the associated data in which the cycle progression included in the associated data created by the associated data creation means is taken as the reference shoot cycle progression such that the reference data storing means stores surely the reference data in association with the reference shoot cycle progression of the shoot timing with respect to the reference data.

In the associated present testing apparatus, the reference data storing means may be the one that stores the associated data as the reference data, in the case where the deformation cycle number included in the associated data is the same as the reference cycle number, among the associated data created by the associated data creation means (hereinafter referred to as "reference present testing apparatus").

Thus, in the case where the deformation cycle number included in the associated data is the same as the reference cycle number, the reference data storing means can surely stores the associated data as the reference data.

In the reference present testing apparatus, the reference data storing means may be the one that stores the associated data as the normal data in the case where the deformation cycle number included in the associated data is different from the reference cycle number (hereinafter referred to as "normal data storing present testing apparatus").

Thus, in the case where the deformation cycle number included in the associated data is different from the reference cycle number, the associated data is stored as the normal data that is different from the reference data such that the associated data other than the reference data is also stored such that the state of the specimen in the deformation test can be stored such that the state can be confirmed later (The normal data may be read out if it is necessary).

In the normal data storing present testing apparatus, data specifying information receiving means (data specifying information receiving unit) may be provided wherein the data specifying information receiving means receives data specifying information showing the deformation cycle number and the cycle progression of the associated data stored as the normal data and the reference data and the reference data storing means may be the one that stores the associated data which matches the data specifying information received by the data specifying information receiving means (hereinafter referred to as "data specifying present testing apparatus").

Thus, the data specifying information receiving means receives the data specifying information. The data specifying information is to show the deformation cycle number and the cycle progression of the associated data stored as the normal data and the reference data. Thus, the associated data to be stored can be specified by the deformation cycle number and the cycle progression such that only the associated data that is necessary can be stored by the reference data storing means efficiently.

In the data specifying present testing apparatus, captured image judgment means (captured image judgment unit) that judges whether the deformation cycle number and the cycle progression in the deformation test matches the data specifying information or not; and capturing order means (or capturing order unit) that instructs the image capturing means to take an image in the case where the captured image judgment means judges that the deformation cycle number and the cycle progression in the deformation test match the data specifying information are provided such that the reference data storing means is to store the associated data including the captured image data taken by the image capturing means upon the instruction by the capturing order means.

The captured image judgment means judges whether the deformation cycle number and the cycle progression in the deformation test match the data specifying information or not. The capturing order means instructs the image capturing means to take an image (the image capturing means takes an image upon reception of the instruction) in the case where the captured image judgment means judges that the deformation cycle number and the cycle progression in the deformation test match the data specifying information. And the reference data storing means stores the associated data including the captured image data taken by the image capturing means upon the instruction by the capturing order means. Thus, the image capturing means takes only the captured image data stored by the reference data storing means such that the load on the image capturing means is reduced and the reference data storing means can store the associated data that matches the data specifying information received by the data specifying information receiving means as the normal data or the reference data.

In the data specifying present testing apparatus, memorization necessity judgment means (or memorization necessity judgment unit) to judge whether the deformation operation information included in the associated data matches the data specifying information or not is provided and, in the case where the memorization necessity judgment means judges that the deformation operation information matches the data specifying information, the reference data storing means may be the one that stores the associated data.

The memorization necessity judgment means judges whether the deformation operation information included in the associated data matches the data specifying information or not. And the reference data storing means stores the associated data in the case where the memorization necessity judgment means judges that the deformation operation information included in the associated data matches the data specifying information. Thus, without the capturing order or the like sent to the image capturing means (the signal exchange with the image capturing means can be simplified), the reference data storing means can store the associated data that matches the data specifying information received by the data specifying information receiving means as the normal data or the reference data.

The associated present testing apparatus is configured to comprise judgment subject condition reception means (or judgment subject condition reception unit) to receive judgment subject condition specifying the deformation cycle number and/or the cycle progression determining whether the deformation caused in the specimen is changed or not and may be the one that judges whether the deformation caused in the specimen is changed or not in the case where the associated data including the deformation operation information that matches the judgment subject condition received by the judgment subject condition reception means is created, but does not make the judgment in the case where the associated data including the deformation operation information that does not match the judgment subject condition is created (hereinafter referred to as "judgment subject condition present testing apparatus").

The judgment subject condition reception means receives the judgment subject condition. The judgment subject condition is to specify the deformation cycle number and/or the cycle progression determining whether the deformation caused in the specimen is changed or not and to specify the detection captured image data for determining the change of the deformation. For example, the judgment subject condition may be set to specify only the deformation cycle number in the case where the image capturing means shoots an image at the same cycle progression and only the cycle progression in the case where the change of the deformation at every cycle number without specifying the deformation cycle number is judged, but may also be set to specify both the deformation cycle number and the cycle progression. And in the case where the associated data including the deformation operation information that matches the judgment subject condition received by the judgment subject condition reception means is created, it is judged whether the deformation caused in the specimen is changed or not, but in the case where the associated data including the deformation operation information that does not match the judgment subject condition is created, the judgment is not performed such that an unnecessary judgment operation can be omitted.

In the judgment subject condition present testing apparatus, provided is necessity signal creating means (necessity signal creating unit) that creates a necessity signal indicating whether to match or not after it is judged whether the deformation operation information included in the associated data matches the judgment subject condition received by the judgment subject condition reception means and, in accordance with the necessity signal that is created by the necessity signal creating means, it may be the one that determines whether it is judged or not whether the deformation caused in the specimen is changed or not (hereinafter referred to as "necessity signal present testing apparatus").

The necessity signal creating means transmits the necessity signal. The necessity signal is a signal indicating whether the deformation operation information included in the associated data matches the judgment subject condition received by the judgment subject condition reception means or not. And in accordance with the necessity signal created by the necessity signal creating means, it is determined whether it is judged or not whether the deformation caused in the specimen is changed or not such that, in accordance with the necessity signal transmitted by the necessity signal creating means which judges whether the deformation operation information matches the judgment subject condition or not, it is surely determined whether the judgment should be made or not.

In the necessity signal present testing apparatus, the necessity signal creating means transmits the necessity signal to the change detection means and the change detection means may be the one that determines whether it should detect or not whether the deformation caused in the specimen is changed or not in accordance with the necessity signal.

Thus, the necessity signal creating means transmits the necessity signal to the change detection means such that the change detection means that detects that the deformation caused in the specimen is changed between at the reference cycle number and at the detection cycle number surely receives the transmitted necessity signal such that it can surely be determined whether it should be detected or not that the deformation caused in the specimen is changed.

In the judgment subject condition present testing apparatus, the detection cycle number deformation data calculating means may be the one that does not calculate the detection cycle number deformation data in the case where the deformation operation information included in the associated data does not match the judgment subject condition received by the judgment subject condition reception means.

Thus, in the case where the deformation operation information included in the associated data does not match the judgment subject condition, the detection cycle number deformation data calculating means does not calculate the detection cycle number deformation data such that an unnecessary calculation operation for the detection cycle number deformation data can be omitted.

In the judgment subject condition present testing apparatus, the subject reference data reading means may be the one that does not read out the reference data from the reference data storing means in the case where the deformation operation information included in the associated data does not match the judgment subject condition received by the judgment subject condition reception means.

Thus, in the case where the deformation operation information included in the associated data does not match the judgment subject condition, the subject reference data reading means does not read out the reference data from the reference data storing means such that the unnecessary reading-out operation by the subject reference data reading means can be omitted.

In the present testing apparatus, the deformation cycle is to repeat that the specimen is folded and unfolded around the folding line that is a virtual straight line passing through the specimen such that the shooting direction of the image capturing means may be substantially parallel to the folding line (hereinafter referred to as "shooting direction parallel present testing apparatus").

In the case of the deformation test in which the deformation cycle folding and unfolding the specimen around the folding line of the virtual straight line passing through the specimen, the specimen is observed in parallel with the folding line such that the state of the deformation caused in the specimen can be accurately grasped. Thus, the shooting direction of the image capturing means is set substantially parallel with the folding line such that it can surely be detected that the deformation caused in the specimen is changed between at the reference cycle number and at the detection cycle number. Here, that the shooting direction of the image capturing means is substantially parallel to the folding line includes the case where a light axis of shooting of the image capturing means exist on the same straight line such that the change of the deformation can be surely detected.

In the shooting direction parallel present testing apparatus, the specimen may be in a film-like or sheet-like shape having a main surface including the folding line.

With respect to the specimen to be in a film-like or sheet-like shape, in the case where the folding line exists in the film-like or sheet-like main surface, the shooting direction of the image capturing means is set to be substantially parallel to the folding line such that it can be well detected that the deformation caused in the specimen is changed between at the reference cycle number and at the detection cycle number. And, in such a case, the light line of shooting of the image capturing means is set to exist on the same straight line of the folding line such that the change of the deformation of the film-like or sheet-like specimen can surely be detected.

In the shooting direction parallel present testing apparatus, the image capturing means may be the one further including illuminating means (including a light source, lighting, an illuminating device, and so on) to illuminate the specimen in parallel to the folding line from the opposite side across the specimen.

Thus, the illuminating means illuminates the specimen in parallel to the folding line from the opposite side across the specimen such that the deformation caused in the specimen can be detected well in the image shooting along the shooting direction substantially parallel to the folding line. Here, illuminating the specimen in parallel to the folding line includes the case where the illuminating direction of the illuminating means exists in the same straight line of the folding line such that the change of the deformation can accurately be detected. And in the case where the specimen is in a film-like or sheet-like shape having a main surface including the folding line, the illuminating direction of the illuminating means is set to exist on the same straight line of the folding line such that the change of the deformation of the specimen in the film-like or sheet-like shape can be detected well.

In the present testing apparatus, it is configured to comprise: a first attachment plate having a first attachment face on which a specimen is attached and a first edge portion that is an edge portion of the first attachment face existing on a first line segment; a second attachment plate having a second attachment face on which the specimen is attached and a second edge portion that is an edge portion of the second attachment face existing on a second line segment; supporting means (or supporting unit) capable of supporting the first attachment plate and the second attachment plate such that the first attachment plate is rotatable around the first line segment as the center relatively to the second line segment and/or the second attachment plate is rotatable around the second line segment as the center relatively to the first line segment as the first line segment and the second line segment keep their relative positions in parallel with each other such that a gap is formed between the first edge portion and the second edge portion, the specimen being bridged across the gap; and rotating means (or rotating unit) capable of rotating the first attachment plate around the first line segment as the center relatively to the second line segment and/or the second attachment plate around the second line segment as the center relatively to the first line segment; wherein the first attachment plate is rotated around the first line segment as the center relatively to the second line segment and/or the second attachment plate is rotated around the second line segment as the center relatively to the first line segment such that a portion of the specimen located between the first edge portion and the second edge portion is deformed, an absolute position of a subject area in a shape of virtual rectangular having two sides of the first edge portion and the second edge portion is changed and a relative position of the subject area with respect to the image capturing means may be kept substantially the same irrespective to the change of the absolute position of the subject area (hereinafter referred to as "attachment plate present testing apparatus").

Such an attachment plate present testing apparatus roughly comprises: the first attachment plate; the second attachment plate; the supporting means; and the rotating means.

The first attachment plate has the first attachment face and the first edge portion of the edge portion of the first attachment face. The first attachment face is a face on which the specimen is attached and for example the specimen having the main surface in a sheet-like, film-like, membranal, or plate-like shape is attached to the first attachment face by bonding partially the main surface with glue or the like. The first edge portion is an edge portion of the first attachment face and a straight edge existing on the first line segment.

The second attachment plate has the second attachment face and the second edge portion of the edge portion of the second attachment face. The second attachment face is a face on which the specimen is attached and for example the specimen having the main surface in a sheet-like, film-like, membranal, or plate-like shape is attached to the second attachment face by bonding partially the main surface with glue or the like. The second edge portion is an edge portion of the second attachment face and a straight edge existing on the second line segment.

The specimen is attached to such the first attachment face of the first attachment plate and the second attachment face of the second attachment plate and bridged between the first edge portion and the second edge portion.

The supporting means supports the first attachment plate and the second attachment plate such that at least one or both of the condition that (a) the first attachment plate is rotatable around the first line segment as the center relatively to the second line segment and (b) the second attachment plate is rotatable around the second line segment as the center relatively to the first line segment are satisfied. Even though the rotation of either or both of (a) and (b) is caused, the gap across which the specimen is bridged is formed between the first edge portion and the second edge portion and the first line segment and the second line segment are parallel with each other and the relative positions of both line segments are kept. Here, the relative position of both line segments of the first line segment and the second line segment includes distance between both line segments and position with respect to the parallel direction of both line segments, e.g., one to the other of both (a position of the other shifted in parallel relatively to the one when shifting such that a straight line including the one includes the other).

The rotating means conducts one or both of (c) rotating the first attachment plate around the first line segment as the center relatively to the second line segment and (d) rotating the second attachment plate around the second line segment as the center relatively to the first line segment.

And by rotating the first attachment plate around the first line segment as the center relatively to the second line segment and/or the second attachment plate around the second line segment as the center relatively to the first line segment, the deformation test is performed such that the portion of the specimen located between the first edge portion and the second edge portion is deformed.

In such a deformation test, the absolute position of the subject area of a virtual rectangular having two sides of the first line segment and the second line segment is changed. However, irrespective to the absolute position change of the subject area in the deformation test, the relative position of the subject area to the image capturing means is kept substantially the same.

With respect to the attachment present testing apparatus, in a state where the specimen is attached to the first attachment face and the second attachment face and the specimen is bridged between the first edge portion of the first attachment face and the second edge portion of the second attachment face, as the relative parallel position of the first line segment defining the first edge portion and the second line segment defining the second edge portion is held, by rotating the first attachment plate around the first line segment as the center relatively to the second line segment and/or the second attachment plate around the second line segment as the center relatively to the first line segment, a force (for example, a force causing the specimen unintendedly and inhomogeneously to bend or stretching or compressing the specimen) other than the force that causes the intended bending of the specimen can be prevented or reduced from applying to the specimen and both edge portions can be easily made close to each other such that the distance between the first edge portion and the second edge portion is minimized (It theoretically can be made as close to 0 as possible) such that the specimen can be tested by repeating folding and unfolding with the folding radius of however small radius.

And as the relative position (distance and direction) of the subject area (The portion (that is subject to deformation) of the specimen located between the first edge portion and the second edge portion is located hear the subject area) is kept substantially the same, the relative position (distance and direction) of the image capturing means with respect to the portion of the specimen located between the first edge portion and the second edge portion is kept substantially the same such that the state of the deformation caused in the specimen can be shot well by the image capturing means such that it can be detected that the deformation is changed between at the reference cycle number and at the detection cycle number.

In the attachment plate present testing apparatus, the image capturing means may be the one attached to the first edge portion and/or the second edge portion an absolute position of which is change (hereinafter referred to as "edge attachment present testing apparatus").

Thus, by a simple configuration where the image capturing means is attached to the first edge portion and/or the second edge portion an absolute position of which is changed, the absolute position of the image capturing means is changed according to the absolute position change of the subject area relative to the image capturing means such that the relative position of the subject area with respect to the image capturing means can be kept substantially the same. Here, the attachment of the image capturing means to the first edge portion and/or the second edge portion having a changeable absolute position may be directly (without any other intervening thing) or indirectly (with something intervening).

In the edge attachment present testing apparatus, the supporting means has a both-edge position relation holding member that holds the distance constant between the first straight line and the second straight line such that the first attachment plate is directly or indirectly attached rotatably around the first straight line including the first line segment and the second attachment plate is directly or indirectly attached rotatably around the second straight line including the second line segment such that the image capturing means is attached to the both-edge position relation holding member.

The supporting means is to support the first attachment plate and the second attachment plate such that the gap across which the specimen is bridged is formed between the first edge portion and the second edge portion such that, as the first line segment and the second line segment are parallel with each other and keep their relative position, the first attachment plate is rotatable around the first line segment as the center relatively to the second line segment and/or the second attachment plate is rotatable around the second line segment as the center relatively to the first line segment and the supporting means may have the both-edge position relation holding member. That is, the first attachment plate and the second attachment plate are directly or indirectly attached to the both-edge position relation holding member such that the first attachment plate is directly or indirectly attached rotatably around the first straight line (including the first line segment) with respect to the first attachment plate and the second attachment plate is directly or indirectly attached rotatably around the second straight line (including the second line segment) with respect to the second attachment plate. And the both-edge position relation holding member holds the distance constant between the first straight line that is an axis rotatable to the first attachment plate and the second straight line that is an axis rotatable to the second attachment plate. As the supporting means has such both-edge position relation holding member, the supporting means can be easily configured.

And the image capturing means is attached to the both-edge position relation holding member that moves together with the first line segment and the second line segment such that the absolute position of the image capturing means is changed successfully according to the absolute position change of the subject area having two sides of the first line segment and the second line segment such that the relative position of the subject area with respect to the image capturing means is kept substantially the same. Here, the image capturing means may be attached to the both-edge position relation holding member directly (without any other intervening thing) or indirectly (with something intervening).

EMBODIMENT FOR CARRYING OUT THE INVENTION

In the following, embodiments of the present invention are explained with reference to the drawings. However, these should not limit any of the present invention.

Figure 1:
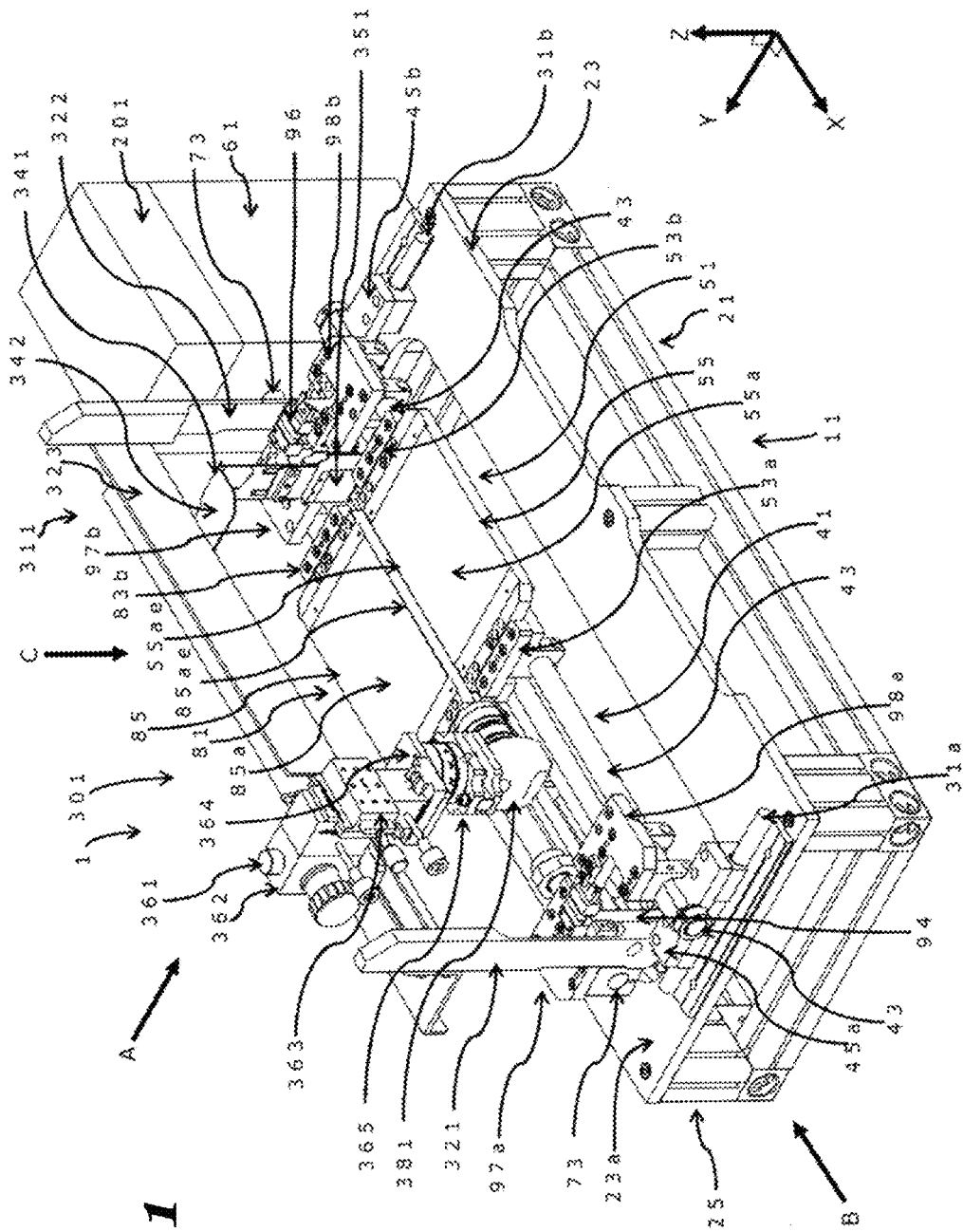
FIG. 1 shows a perspective view illustrating a deformation testing apparatus (present testing apparatus) of the present invention.
Figure 2:
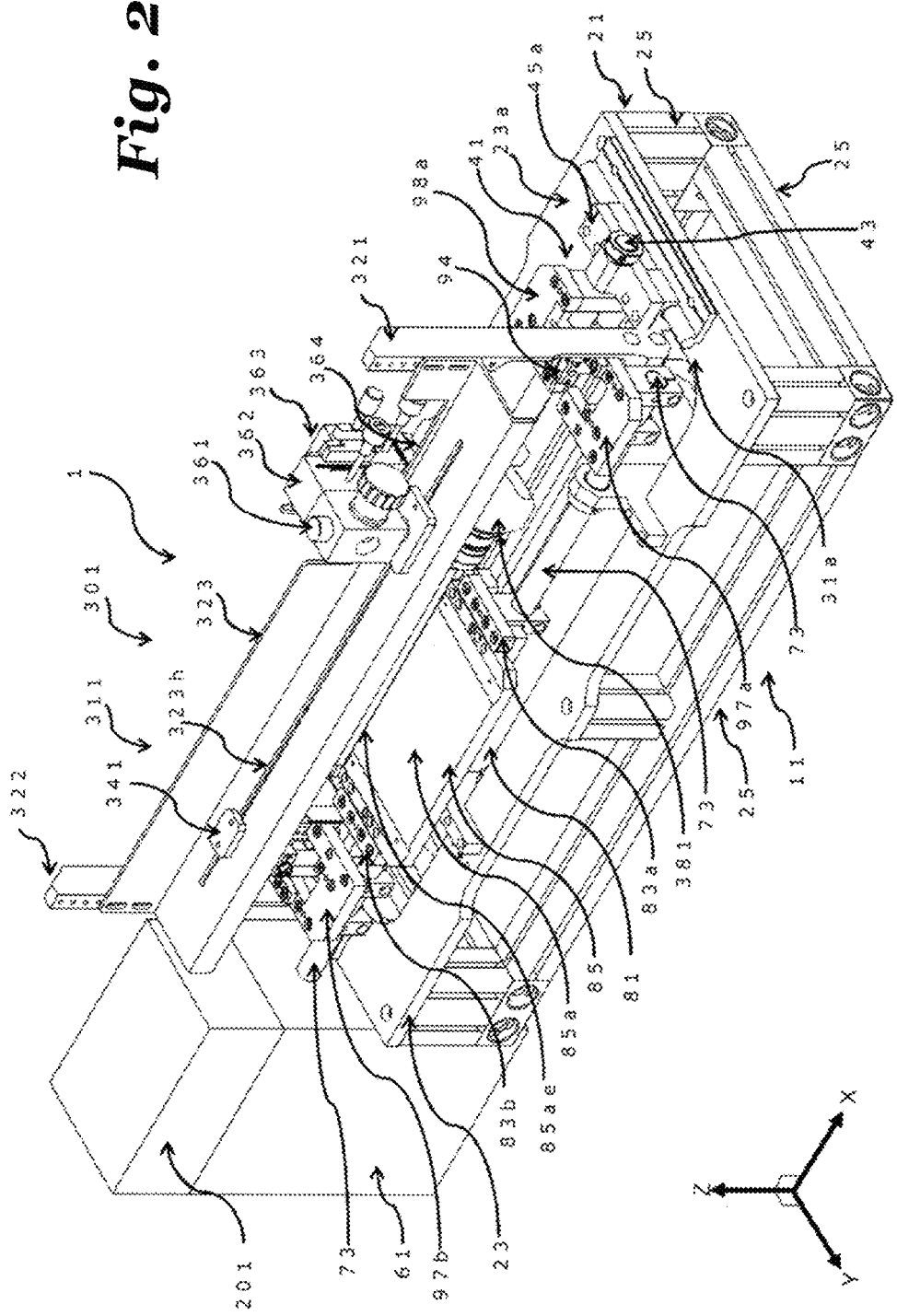
FIG. 2 shows another perspective view illustrating a present testing apparatus.
Figure 3:
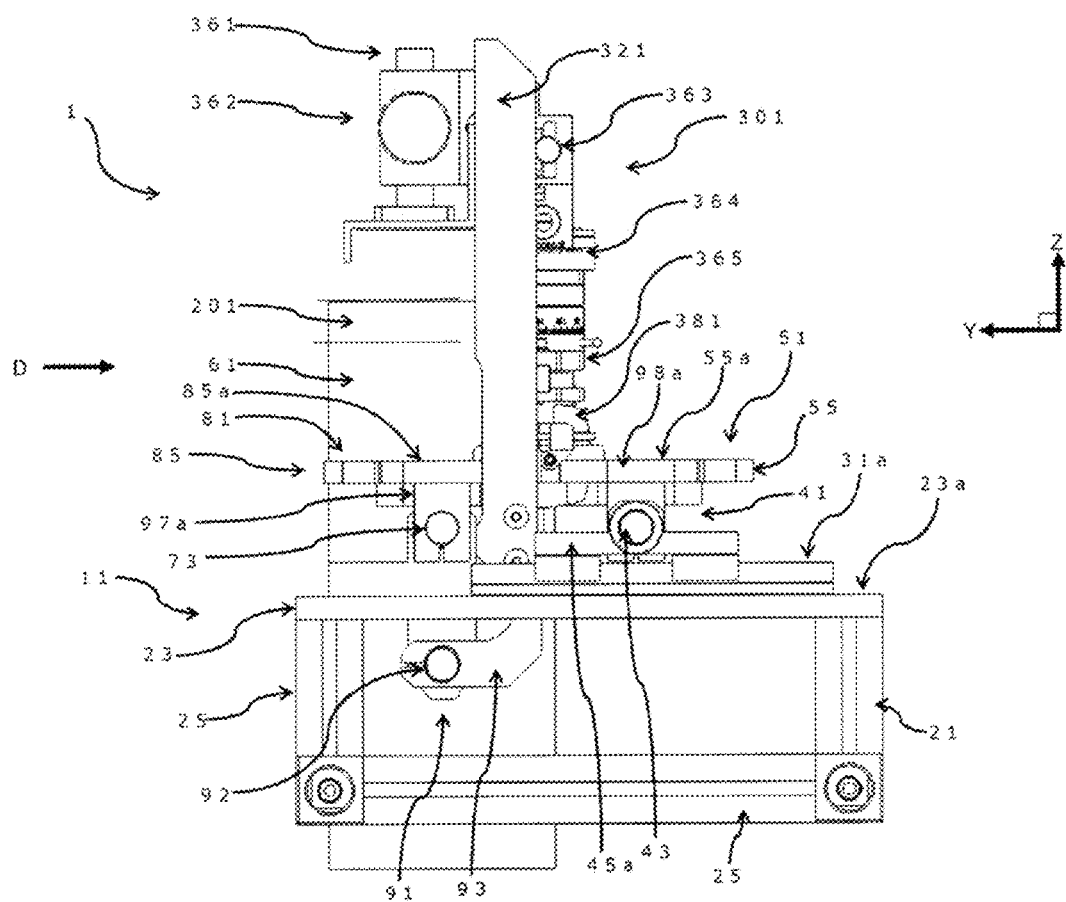
FIG. 3 shows a left side view of the present testing apparatus.
Figure 4:
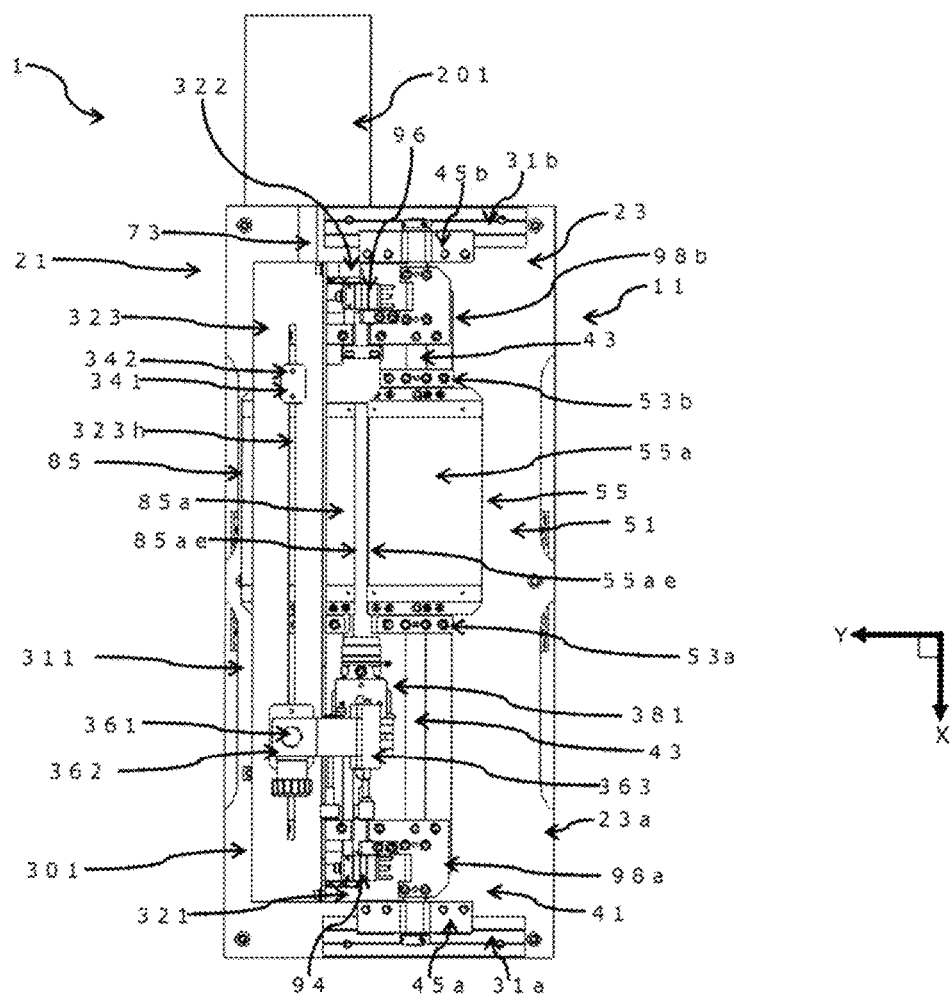
FIG. 4 shows a plan view of the present testing apparatus.
Figure 5:
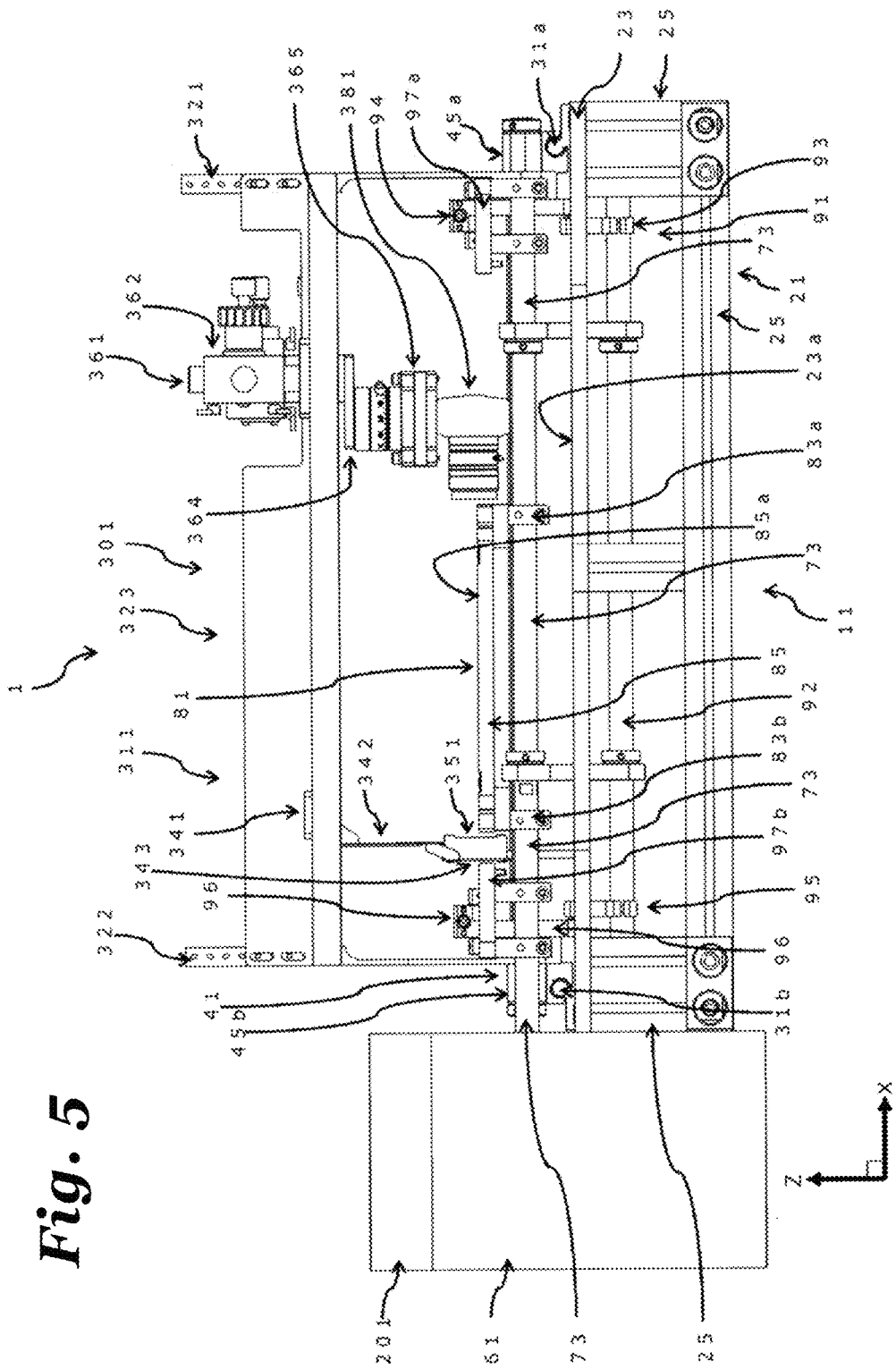
FIG. 5 shows a rear view of the present testing apparatus.
Figure 6:
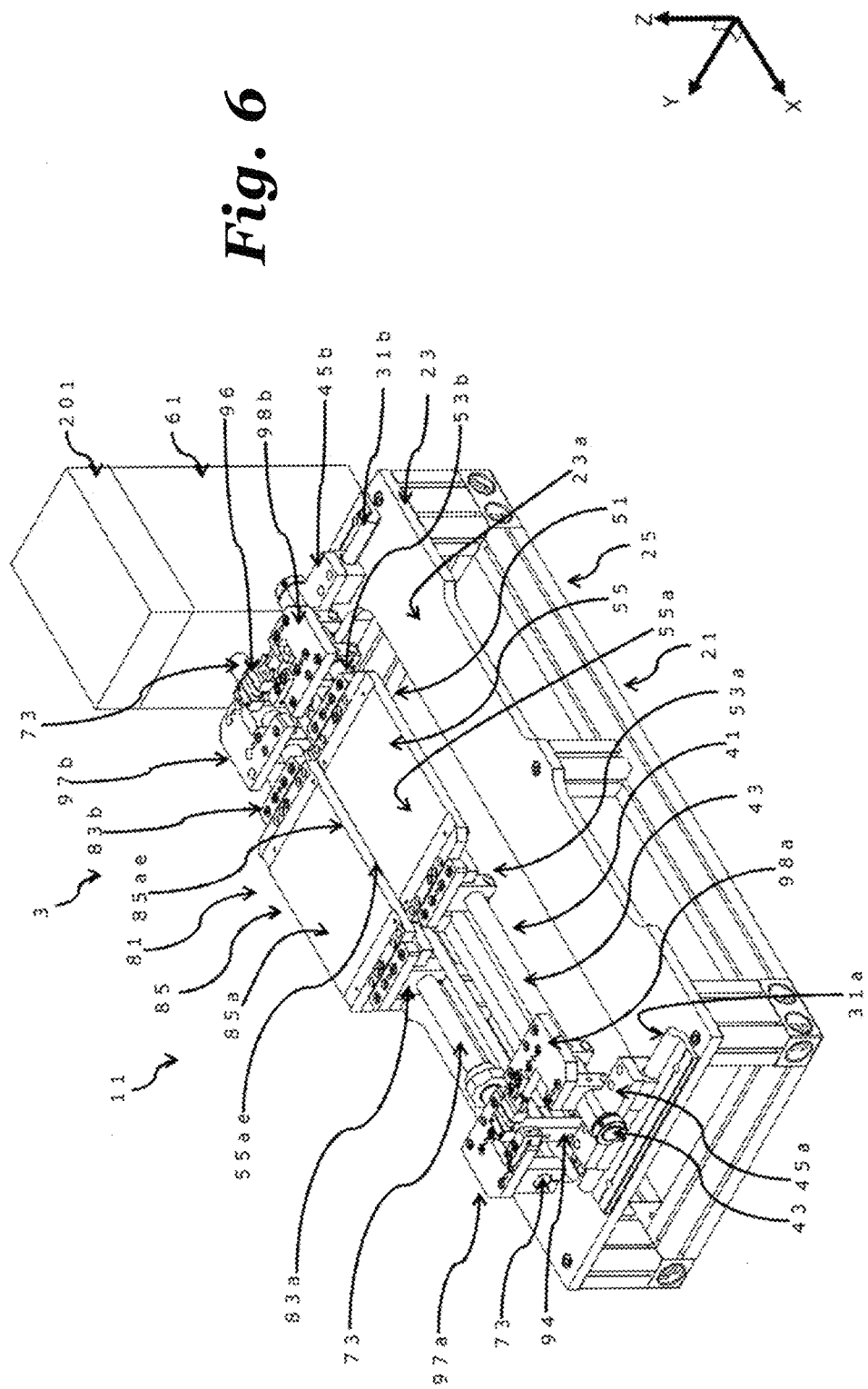
FIG. 6 shows a perspective view of a first part member of the present testing apparatus from which a shooting part is removed.

FIG. 1 shows a perspective view illustrating a deformation testing apparatus (present testing apparatus) 1 of the present invention; FIG. 2 shows another perspective view (seen from an arrow A direction in FIG. 1) illustrating the present testing apparatus 1; FIG. 3 shows a left side view (seen from an arrow B direction in FIG. 1) of the present testing apparatus 1; FIG. 4 shows a plan view (seen from an arrow C direction in FIG. 1); and FIG. 5 shows a rear view (seen from an arrow D direction in FIG. 3) of the present testing apparatus 1. With reference to FIGS. 1 to 5, the present testing apparatus 1 will be explained. The present testing apparatus 1 comprises: a testing apparatus main body 11; a controller 201 to control the testing apparatus main body 11; and a shooting part 301 to shoot a test piece (not shown) to be tested by the testing apparatus main body 11, and roughly the testing apparatus main body 11 is a device for testing endurance by folding (bending) the test piece repeatedly; the shooting part 301 is to shoot a portion to be bent repeatedly of the test piece (not shown) tested by the testing apparatus main body 11; and the controller 201 is to control the testing apparatus main body 11 such that the endurance may be tested by folding (bending) the test piece (not shown) repeatedly under a predetermined condition and to analyze image data taken by the shooting part 301.

Figure 7:
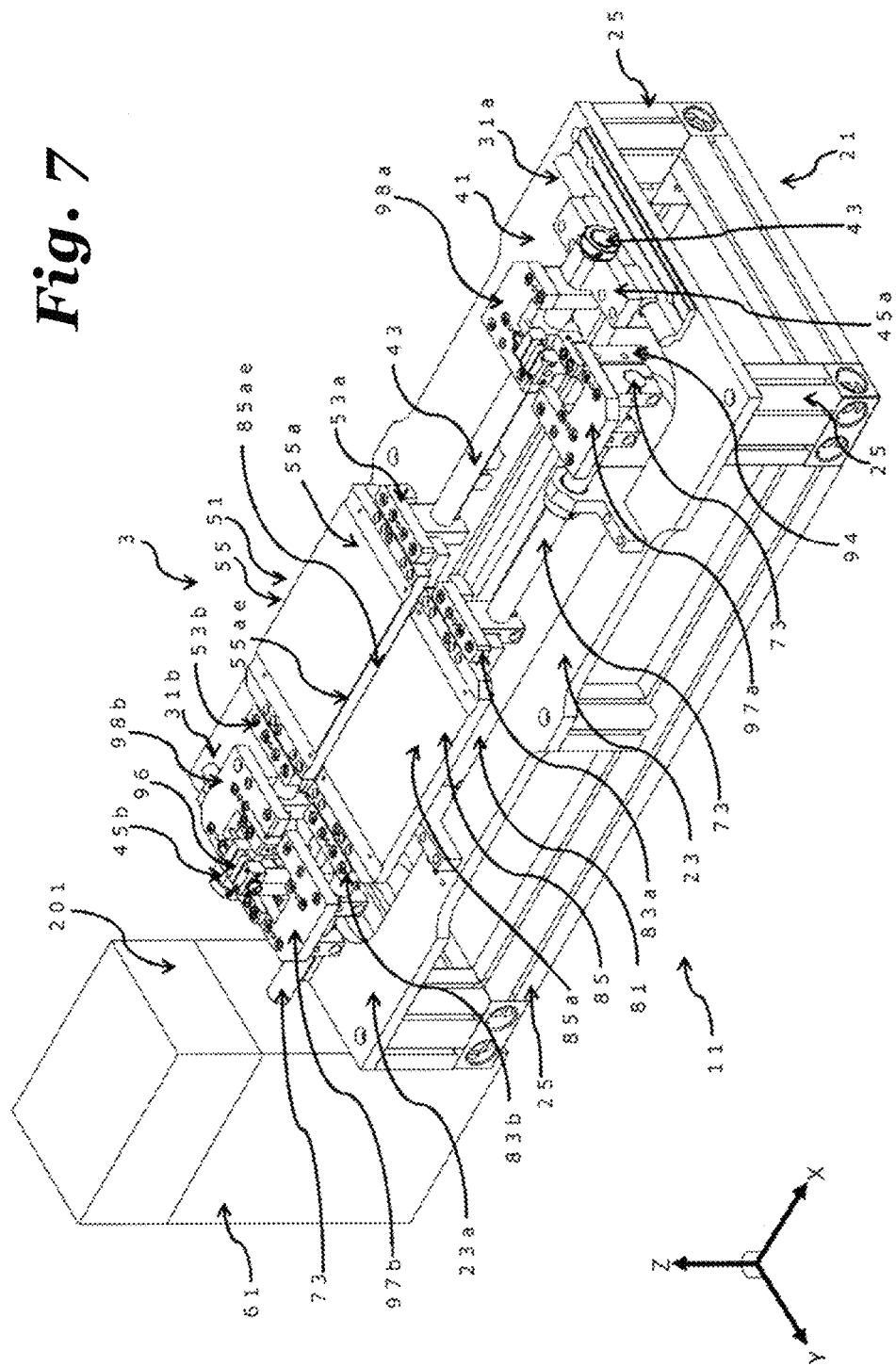
FIG. 7 shows another perspective view of the first part member of the present testing apparatus from which the shooting part is removed.
Figure 8:
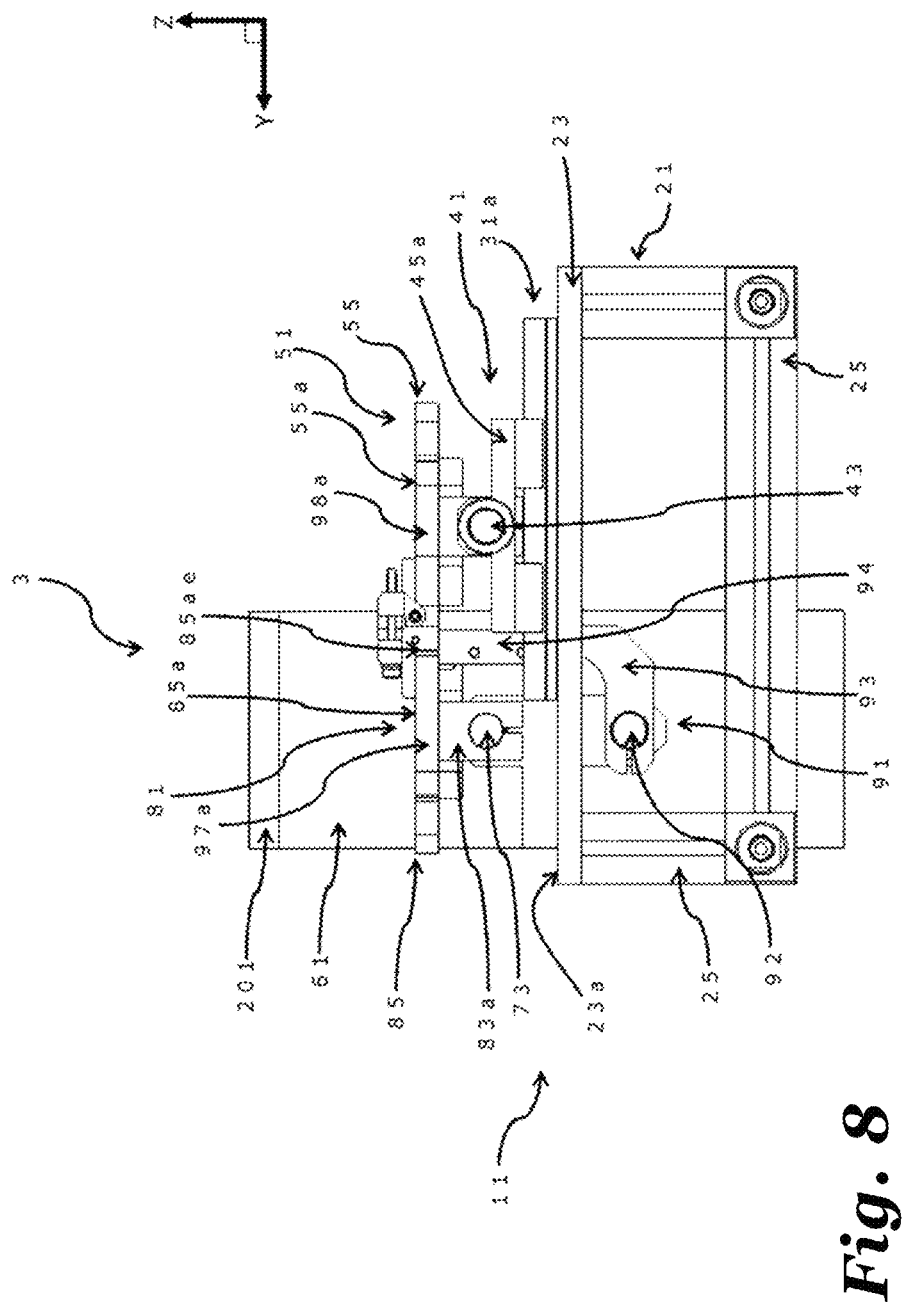
FIG. 8 shows a left side view of the first part member of the present testing apparatus from which the shooting part is removed.
Figure 9:
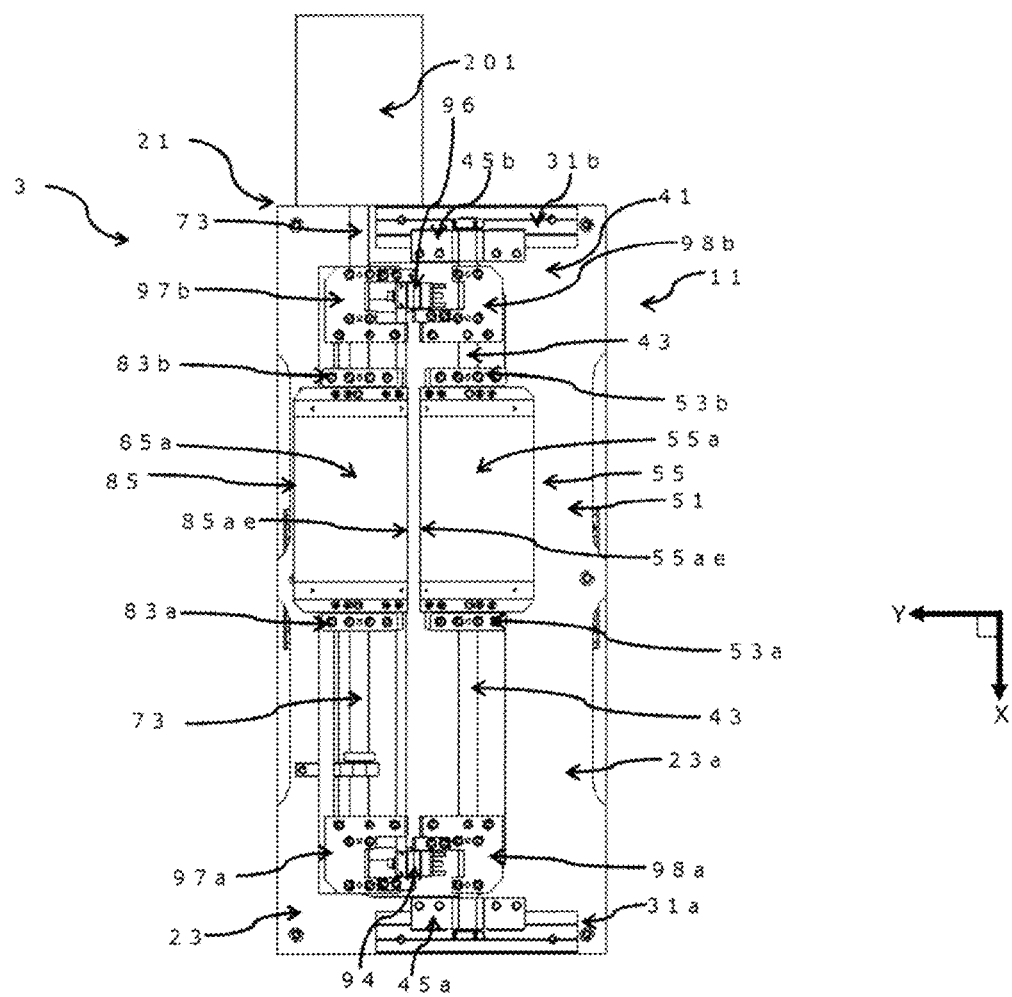
FIG. 9 shows a plan view of the first part member of the present testing apparatus from which the shooting part is removed.
Figure 10:
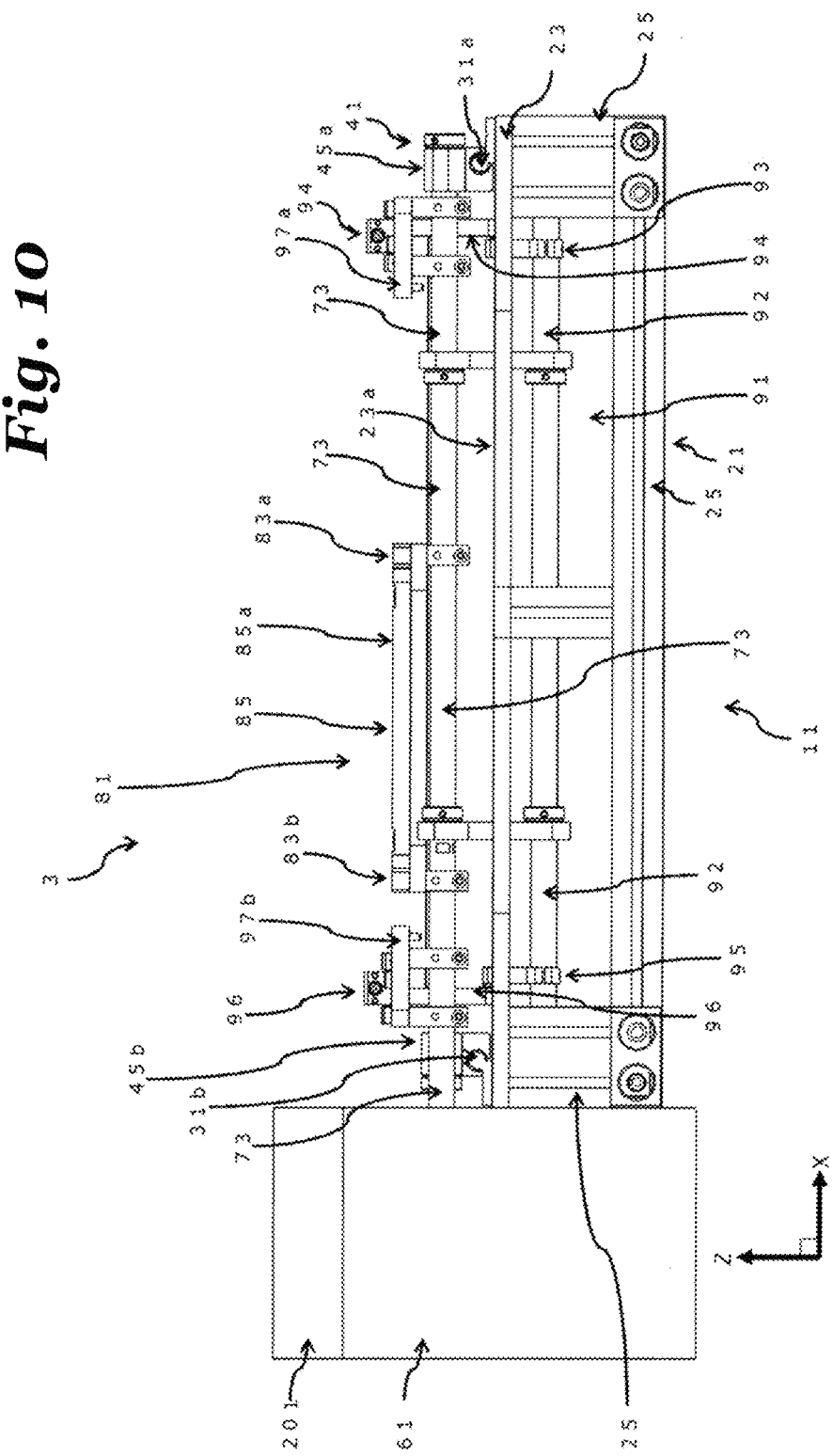
FIG. 10 shows a rear view of the first part member of the present testing apparatus from which the shooting part is removed.
Figure 11:
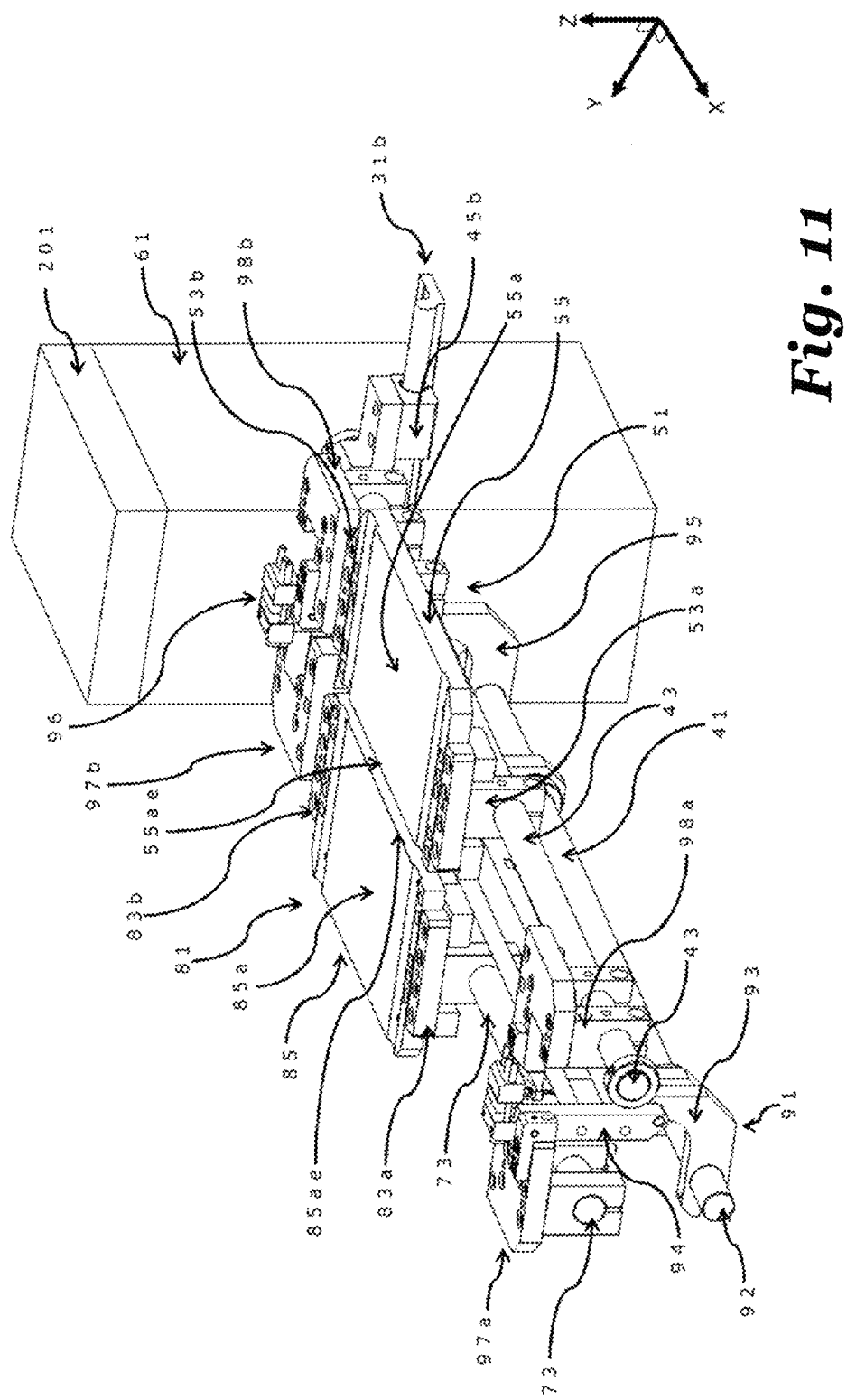
FIG. 11 shows an enlarged perspective view of a driving part, a guide rail, one support shaft part, one specimen attachment part, a drive shaft, the other specimen attachment part, and a link member.

First, a testing apparatus main body 11 will be explained. In order to make the testing apparatus main body 11 understood easily, a perspective view of that 3 (hereinafter referred to as "first part member") in which the shooting part 301 is removed from the present testing apparatus 1 is shown in FIG. 1 (The perspective view is seen from the same direction as shown in FIG. 1); FIG. 7 shows another perspective view showing the first part member 3 (It is seen from the same direction as shown in FIG. 2); FIG. 8 shows a left side view of the first part member 3 (It is seen from the same direction as shown in FIG. 3); FIG. 9 shows a plan view of the first part member 3 (It is seen from the same direction as shown in FIG. 4); and FIG. 10 shows a rear view of the first part member 3 (It is seen from the same direction as shown in FIG. 5). And, to be described later, FIG. 11 shows an enlarged perspective view in which a driving part 61, a guide rail 31*b*, one support shaft part 41, one specimen attachment part 51, a drive shaft 73, the other specimen attachment part 81, and a link member 91 are enlarged. With reference to FIGS. 6 to 11, the testing apparatus main body 11 will be explained.

For easier explanation and understanding, three orthogonal axes: X-axis, Y-axis, and Z-axis are used (Respective directions of the three axes are shown and specified by X, Y, and Z in the figures); a plane orthogonal to Z-axis is referred to as XY-plane; a plane orthogonal to X-axis is referred to as YZ-plane; and a plane orthogonal to Y-axis is referred to as XZ-plane.

The testing apparatus main body 11 has a similar configuration to that of "first present testing apparatus 11" disclosed in Japanese patent application publication No. 2019-39743 (Patent Reference 6).

The testing apparatus main body 11 roughly comprises a frame part 21 having a hollow rectangular parallelepiped shape; guide rails 31*a*, 31*b* (extending in the Y-axis direction) attached to a top surface of the frame part 21; one support shaft part 41 attached to the guide rails 31*a*, 31*b* slidably in the Y-axis direction; one specimen attachment part 51 attached to one support shaft 43 that the one support shaft part 41 has; a driving part 61 fixed to the right side face of the frame part 21; a drive shaft 73 supported rotatably with respect to the frame part 21; the other specimen attachment part 81 attached unrotatably to the drive shaft 73; and a link member 91 to make the one specimen attachment part 51 rotate.

The frame part 21 comprises: a ceiling plate part 23 (It is formed of a plate member (a notch is formed partially) having both main surfaces shaped approximately in a rectangular) over one face of the rectangular parallelepiped; and a rod-like component 25 formed from a rod-like member extending along a side of the rectangular wherein the ceiling plate part 23 constitutes the top face of the frame part 21. Respective sides of the rectangular parallelepiped constituting the frame part 21 are arranged parallel to X-axis, Y-axis, and Z-axis, respectively and the frame part 21 is made of metal so as to have enough strength.

The guide rails 31*a*, 31*b* are fixed to the top surface 23*a* of the ceiling plate part 23 of the frame part 21 so as to be parallel to Y-axis and belong to the same XY-plane.

The one support shaft part 41 comprises a sliding part 45*a* attached to the guide rail 31*a* slidably in the Y-axis direction; a sliding part 45*b* attached to the guide rail 31*b* slidably in the Y-axis direction; and the one support shaft 43 (It is formed of a round bar having a longitudinal direction parallel to X-axis) supported rotatably by the sliding part 45*a* and the sliding part 45*b*. In this way, the one support shaft 43 can move freely in the Y-axis direction along XY-plane while the longitudinal direction thereof is kept parallel to X-axis.

The one specimen attachment part 51 comprises: an attachment part 53*a* attached unrotatably to the one support shaft 43; an attachment part 53*b* attached unrotatably to the one support shaft 43 apart from the attachment part 53*a*; and one attachment plate 55 having both end sides attached to the attachment part 53*a* and the attachment part 53*b*, respectively.

The one attachment plate 55 has both main surfaces shaped in a rectangular, a top surface 55*a* as one of the both main surfaces has four edge portions, one of which is one edge portion ae (the edge portion closer to a folding portion of the specimen to be describe later among two edge portions parallel to X-axis of the four edge portions) that is constantly kept parallel to X-axis even if the one specimen attachment part 51 is rotated as the one support shaft 43 is rotated.

The driving part 61 is fixed to the right side face of the frame part 21 and has a base end of the drive shaft 73 attached thereto. The driving part 61 includes a motor and a transmission inside and makes the drive shaft 73 rotate around the central axis clockwise or counterclockwise with a predetermined rotation angle, a predetermined rotation speed and a predetermined number of rotation in accordance with the instruction by the controller 201. Thus, the test piece can be tested in the folding (bending) test with a desired folding (bending) angle, a desired folding (bending) speed and a desired number of folding (bending) cycle.

The drive shaft 73 is formed of a round bar and the central axis of the round bar is supported rotatably to the frame part 21 in parallel to X-axis. The round bar constituting the drive shaft 73 is shaped in the right circular cylinder and is rotated around the central axis of the right circular cylinder.

And, as mentioned above, the base end of the drive shaft 37 is attached to the driving part 61 such that the drive shaft 73 rotates clockwise or counterclockwise around the central axis with a predetermined rotation angle, rotation speed and rotation number.

The other specimen attachment part 81 comprises: an attachment part 83*a* attached unrotatably to the drive shaft 73; an attachment part 83*b* attached unrotatably to the drive shaft 73 apart from the attachment part 83*a*; and the other attachment plate 85 having both ends attached to the attachment part 83*a* and the attachment part 83*b*, respectively.

The other attachment plate 85 has both main surfaces shaped in the same rectangular and a top surface 85*a* as one of the both main surfaces has four edge portions, one of which is one edge portion 85*ae* (the edge portion closer to a folding portion of the specimen among two edge portions parallel to X-axis of the four edge portions) that is constantly kept parallel to X-axis even if the other specimen attachment part 81 is rotated as the drive shaft 73 is rotated.

Here, the top surface 85*a* in a predetermined rotation position (FIGS. 1 to 11) around the drive shaft 73 of the other specimen attachment part 81 and the top surface 55*a* in a predetermined rotation position (FIGS. 1 to 11) around the one support shaft 43 of the one specimen attachment part 51 are arranged so as to belong to one plane parallel to XY-plane (perpendicular to Z-axis).

And a sheet-like or film-like test piece is attached to the top surface 85*a* and the top surface 55*a* by gluing the main surface of the test piece thereto.

The link member 91 comprises: a link shaft 92 (it is formed of a straight round bar and a central axis thereof is supported in parallel to X-axis) supported rotatably to the frame part 21; a block 97*a* attached unrotatably to the drive shaft 73; a block 98*a* attached unrotatably to the one support shaft 43; a connecting member 94 having one end attached rotatably (rotatably around X-axis) to the other end of an angle member 93 and the other end attached rotatably to blocks 97*a*, 98*a* (The rotation center of the block 97*a* and the edge portion 85*ae* are on the same straight line parallel to X-axis. The rotation center of the block 98*a* and the edge portion 55*ae* are on the same straight line parallel to X-axis); an angle member 95 attached unrotatably to the link shaft 92; a block 97*b* attached unrotatably to the drive shaft 73; a block 98*b* attached unrotatably to the one support shaft 43; and a connecting member 96 having one end attached rotatably (rotatably around X-axis) to the other end of the angle member 95 and the other end attached rotatably to the blocks 97*b*, 98*b* (The rotation center of the block 97*b* and the edge portion 85*ae* and the rotation center of block 97*a* are on the same straight line parallel to X-axis. The rotation center of the block 98*b* and the edge portion 55*ae* and the rotation center of block 98*a* are on the same straight line parallel to X-axis). Patent Reference 6 (The entire contents of Japanese patent application unexamined publication No. 2019-39743 are incorporated herein by reference) also has descriptions about the link mechanism.

Such the connecting member 94 and the connecting member 96 are attached rotatably around the rotation axis included in the straight line including the edge portion 85*ae* to the blocks 97*a*, 97*b* and attached rotatably around the rotation axis included in the straight line including the edge portion 55*ae* to the blocks 98*a*, 98*b* such that, as the blocks 97*a*, 97*b* are rotated along with the rotation of the drive shaft 73, the one attachment plate 55 is also rotated while the distance between the edge portion 85*ae* and the edge portion 55*ae* is kept constant and the edge portion 85*ae* and the edge portion 55*ae* are kept parallel. Although the other attachment plate 85 is rotated along with the rotation of the drive shaft 73, the connecting members 94, 96 are held as their longitudinal direction is parallel to Z-axis and the plane including the edge portion 55*ae* and the edge portion 85*ae* is constantly kept perpendicular to Z-axis (The plane including the edge portion 55*ae* and the edge portion 85*ae* moves parallel by the rotation of the other attachment plate 85. Here, the edge portion 55*ae* and the edge portion 85*ae* are on the same XY-plane).

Here, according to the rotation of the one attachment plate 55, the one support shaft part 41 slidingly shifts along the guide rails 31*a*, 31*b*.

Figure 12:
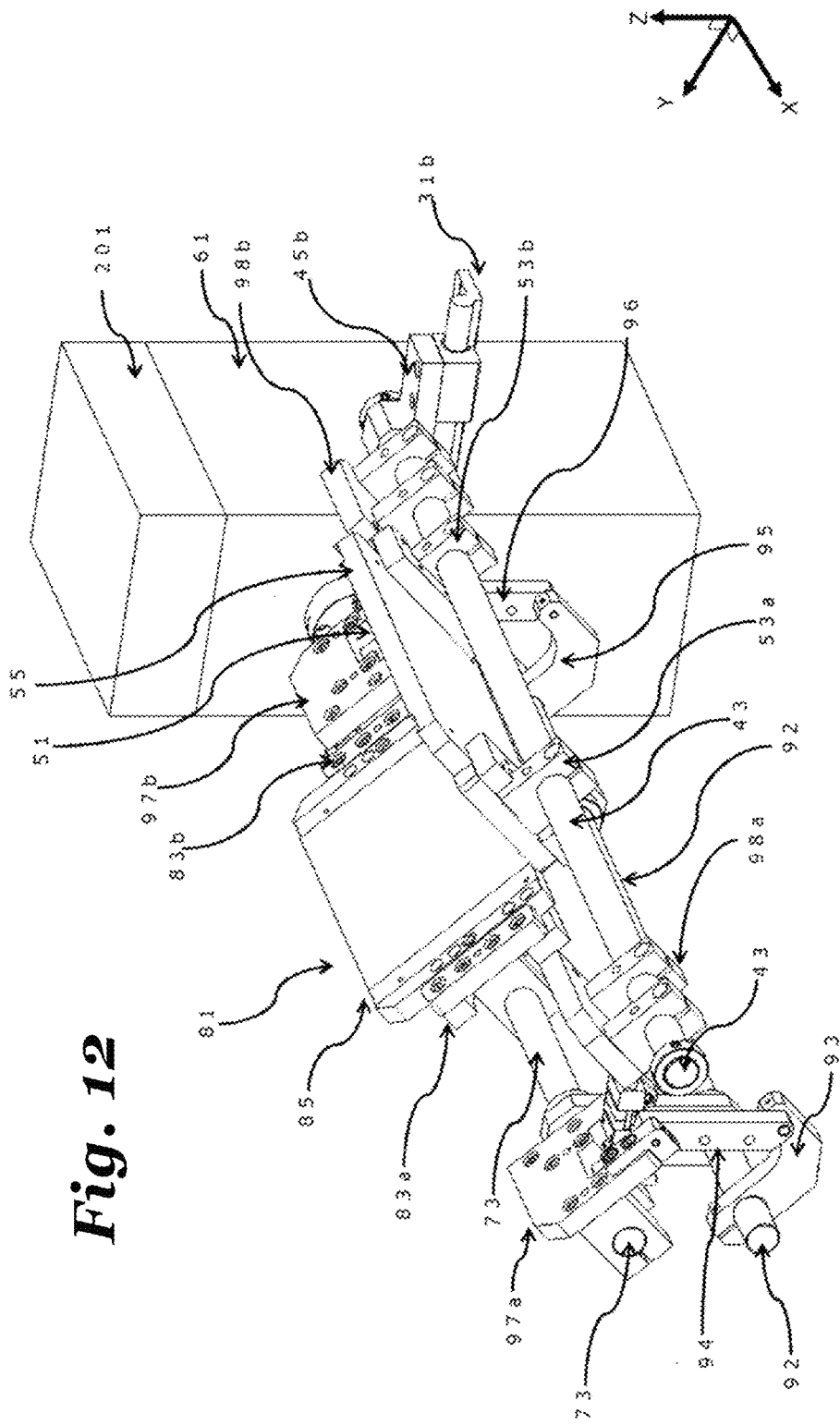
FIG. 12 shows a diagram illustrating a state in which a drive shaft is rotated counterclockwise from that of FIG. 11.
Figure 13:
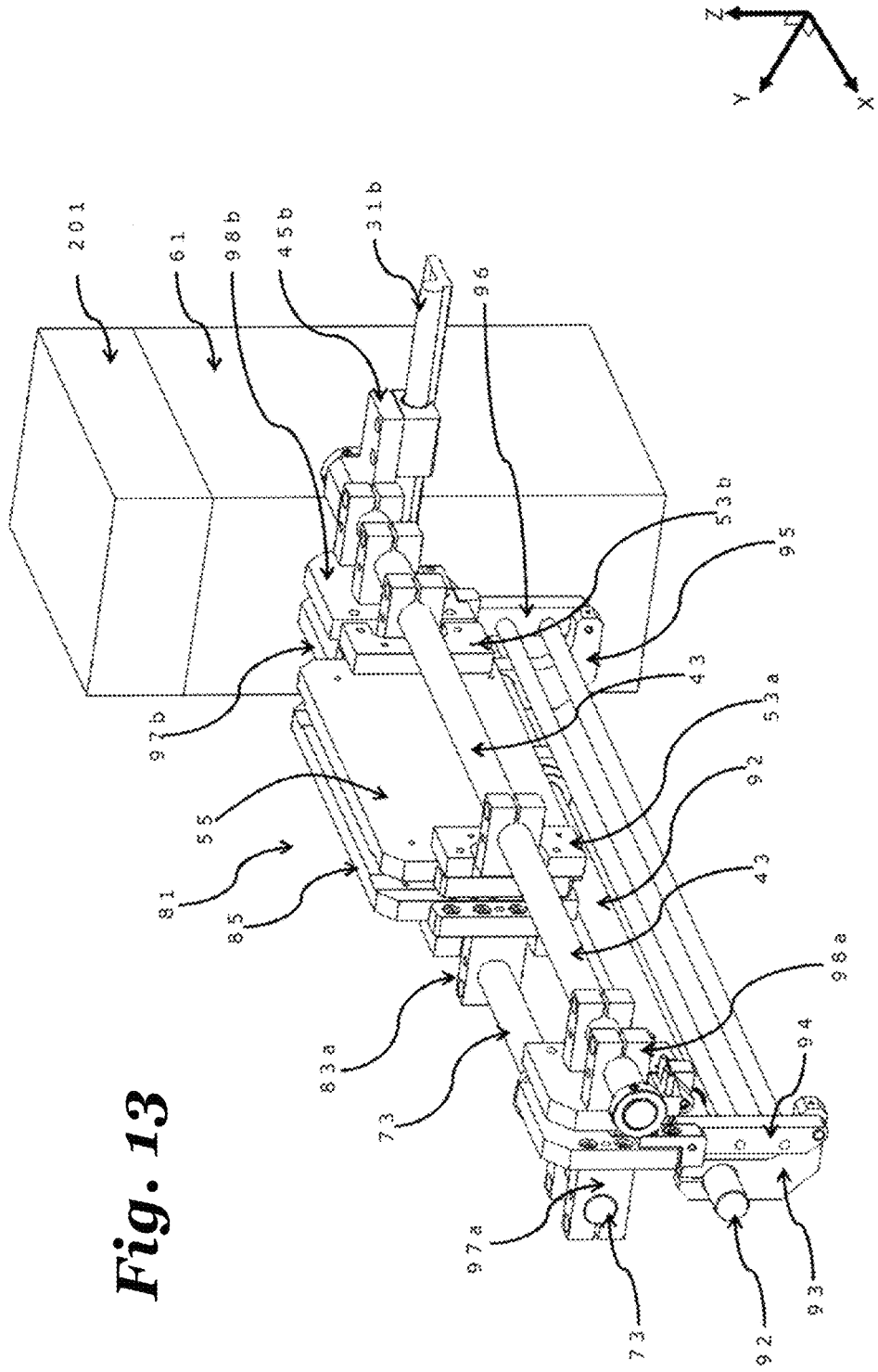
FIG. 13 shows a diagram illustrating a state in which the drive shaft is rotated clockwise from that of FIG. 12.
Figure 14:
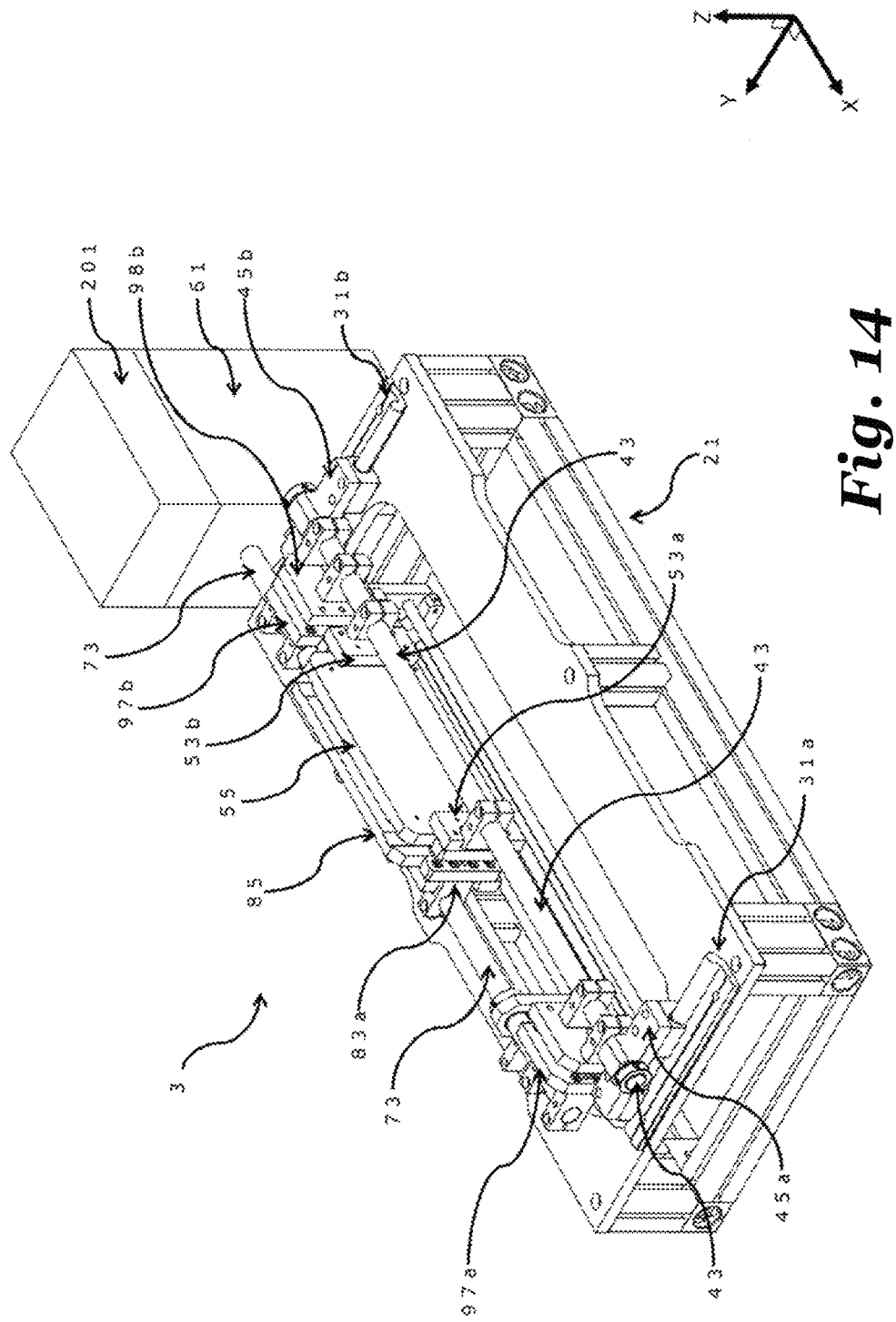
FIG. 14 shows a perspective view showing a testing apparatus main body in a state shown in FIG. 13.

The operation of the testing apparatus main body 11 is explained with reference mainly to FIGS. 11, 12, 13, and 14. FIGS. 12 and 13 show the same component of FIG. 11 seen from the same direction of FIG. 11 and states thereof in which the drive shaft 73 is rotated clockwise in the figures from the state of FIG. 11. And FIG. 14 shows a state of the testing apparatus main body 11 shown in FIG. 13 as seen from the same direction of FIG. 6.

First, in the state shown in FIG. 11, the top surface 85*a* of the other attachment plate 85 and the top surface 55*a* of the one attachment plate 55 belong approximately to the same plane perpendicular to Z-axis and the test piece (It is film-like. Showing is omitted) glued and attached to the top surface 85*a* and the top surface 55*a* is in a state of being straight along the plane.

As the drive shaft 73 is rotated in the forward direction (referred to as clockwise in FIGS. 11, 12, and 13) around the central axis of the drive shaft 73 by the driving part 61 from the state of FIG. 11, the other attachment plate 85 is also rotated around the drive shaft 73 in the forward direction along with the attachment parts 83*a*, 83*b* attached unrotatably to the drive shaft 73. Along with these, the blocks 97*a*, 97*b* are also rotated in the forward direction such that the connecting members 94, 96 are pushed down as shown in FIG. 12 while the longitudinal direction thereof is kept parallel to Z-axis (The link shaft 92 is also rotated in the forward direction). And as the connection members 94, 96 are pushed down, the blocks 98a, 98b are rotated in the backward direction such that the one support shaft 43 is rotated in the backward direction such that the one specimen attachment part 51 is rotated in the backward direction around the one support shaft 43 such that the one support shaft part 41 (sliding parts 45a, 45b; one support shaft 43) shifts approaching the other specimen attachment part 81 parallel to Y-axis along the guide rails 31a, 31b (By connecting members 94, 96, the distance between the edge portion 85ae and the edge portion 55ae is kept constant and the edge portion 85ae and the edge portion 55ae are kept parallel to each other).

By such rotation in the forward direction of the drive shaft 73 by the driving part 61, the rotation in the forward direction around the drive shaft 73 of the other specimen attachment part 81 (the attachment parts 83a, 83b, the other attachment plate 85) and the rotation in the backward direction around the one support shaft 43 of the one specimen attachment part 51 (the attachment parts 53a, 53b, the one attachment plate 55) are caused. In the three rotations, the distance between the edge portion 85ae and the edge portion 55ae is kept constant and the edge portion 85ae and the edge portion 55ae are kept parallel and further the one specimen attachment part 51 moves towards the drive shaft 73 in parallel to Y-axis.

The rotation of the drive shaft 73 in the forward direction continues from in a state of FIG. 11, via a state in FIG. 12, and to a state in FIG. 13 (In the state of FIG. 13, the top surface 85a of the other attachment plate 85 and the top surface 55ae of the one attachment plate 55 are in a mutual face-to-face state and approximately parallel) (The rotation is stopped to the state of FIG. 13). In the state of FIG. 13, the test piece (not shown in the figure) glued to the top surface 85a of the other attachment plate 85 and the top surface 55a of the one attachment plate 55 is in a folded state.

From the state that the specimen is folded in FIG. 13, the drive shaft 73 is rotated in the backward direction (the counterclockwise direction) by the driving part 61. Thus, it returns to the state of FIG. 11 via the state of FIG. 12. Thus, one cycle folding test of the test piece can be conducted by rotating the drive shaft 73 in the forward direction from the state of FIG. 11 (the state where the test piece is flat) to the state of FIG. 13 (the state where the test piece is folded) and then rotating the drive shaft 73 in the backward direction from the state of FIG. 13 to the state of FIG. 11 again (one deformation cycle) such that the test piece is changed from the flat state to the folded state and back to the flat state. By conducting the forward rotation and the backward rotation of the drive shaft alternatively, the folding test in which the test piece is folded for a plurality of times can be performed.

In such a folding test of the test piece, as shown in FIG. 8 of Japanese patent application publication No. 2019-39743, the edge portions 85ae, 55ae are constantly parallel and the distance therebetween K is kept constant such that they are in one plane perpendicular to Z-axis. And in the folding test of the test piece, the top surface 85a and the top surface 55a are always in a plane symmetry with respect to a plane P having equal distances from the edge portions 85ae, 55ae and vertical to Y-axis. And, the testing apparatus main body 11 has the features described in paragraph numbers: 0038-0039 and FIG. 8.

As mentioned above, the testing apparatus main body 11 has a similar configuration to the "first main testing apparatus 11", but it could also has a similar configuration to "the testing apparatus (second main testing apparatus) 211 in the second embodiment".

Figure 15:
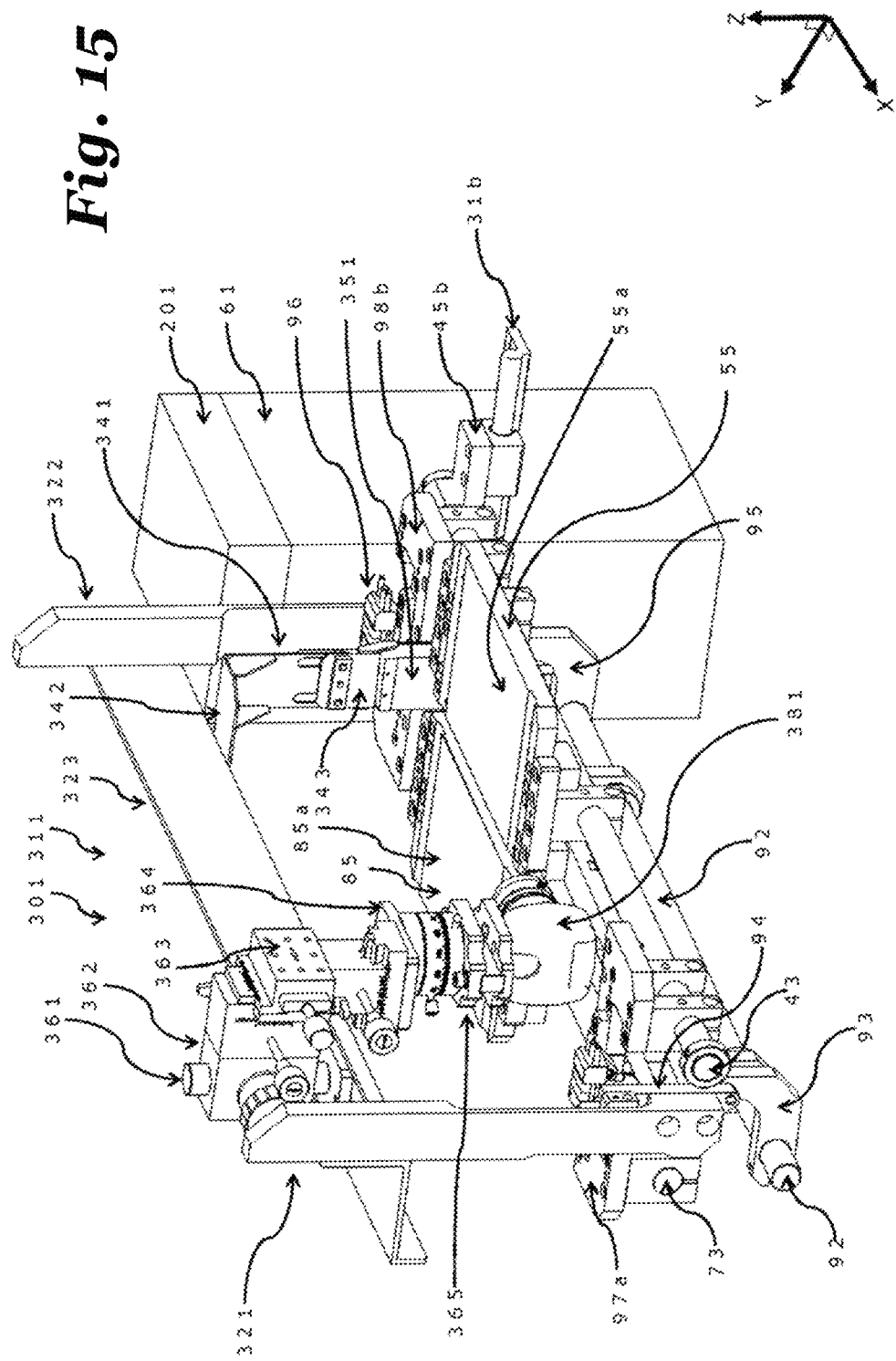
FIG. 15 shows a diagram showing a state in which the shooting part is attached to that shown in FIG. 11.
Figure 16:
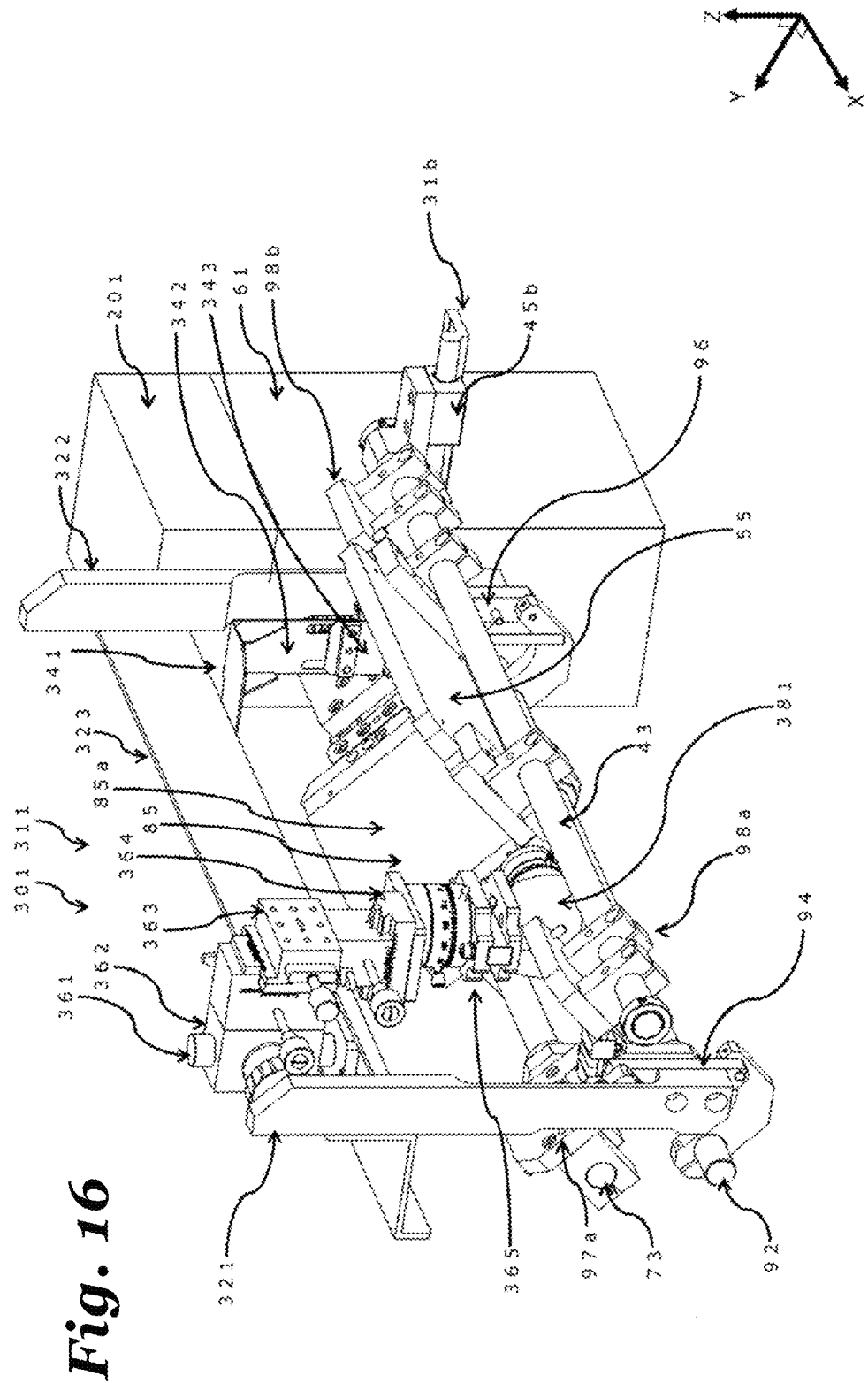
FIG. 16 shows a diagram showing a state in which the shooting part is attached to that shown in FIG. 12.
Figure 17:
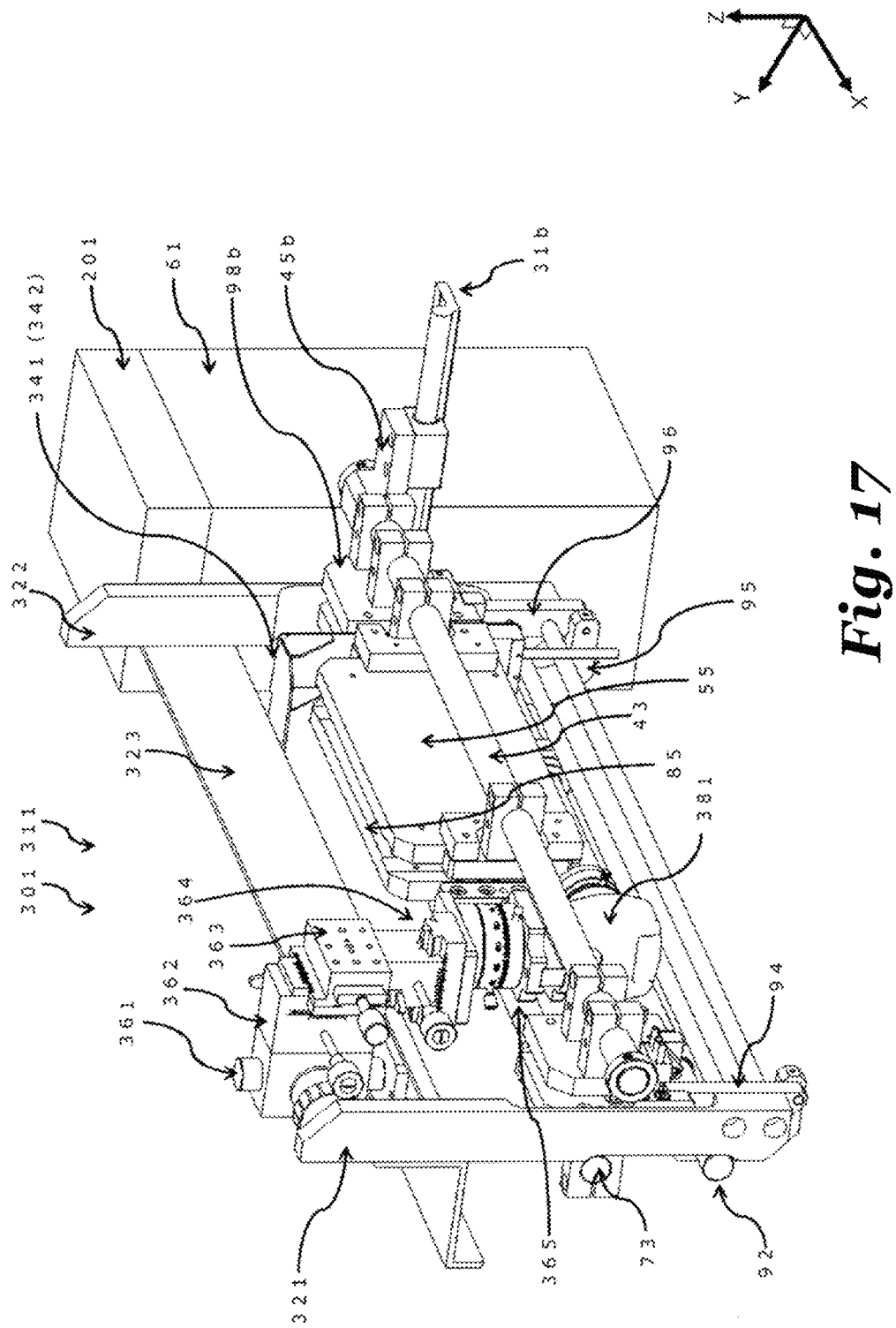
FIG. 17 shows a diagram showing a state in which the shooting part is attached to that shown in FIG. 13.
Figure 18:
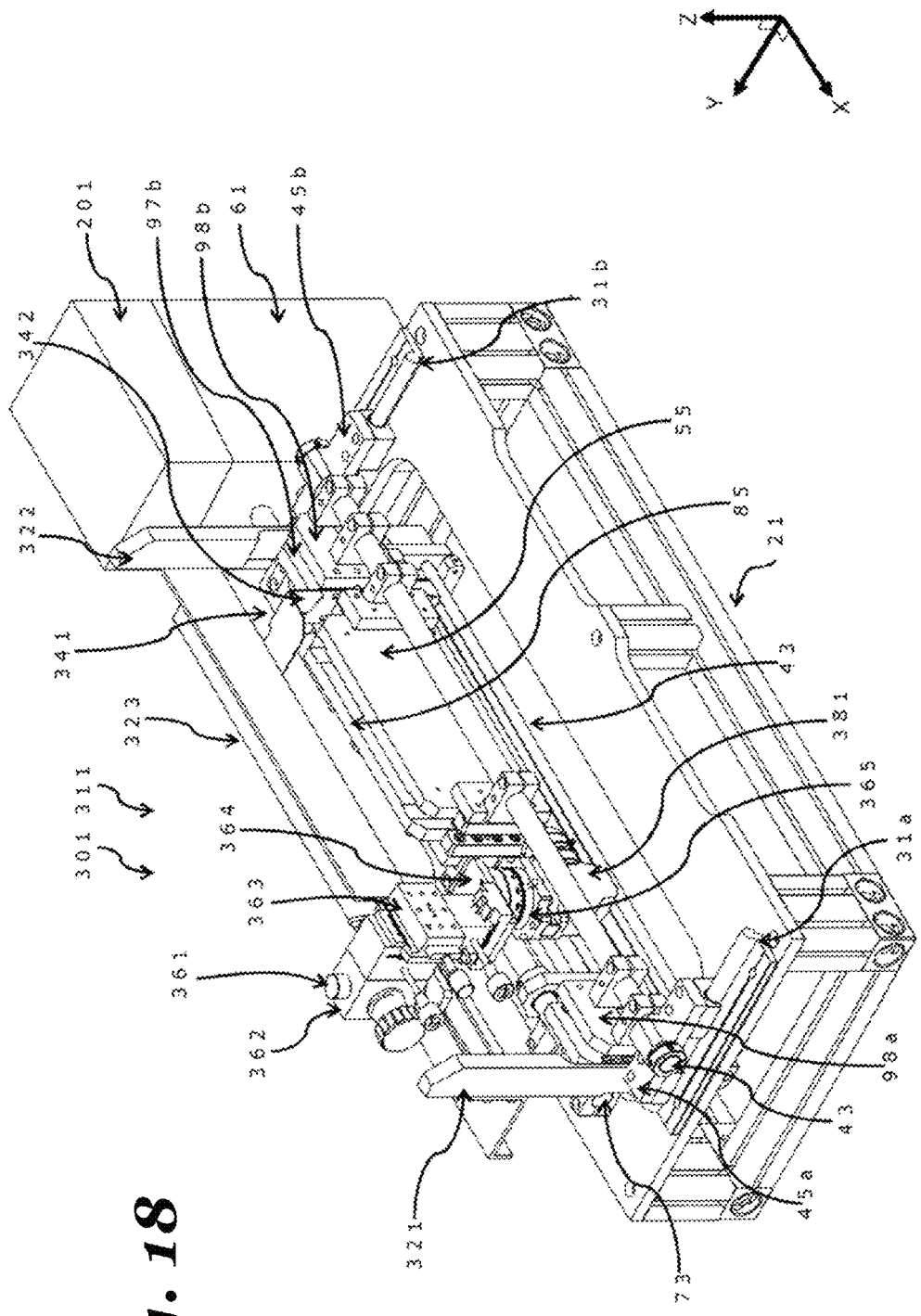
FIG. 18 shows a diagram showing a state in which the shooting part is attached to that shown in FIG. 14.

Then, the shooting part 301 of the present testing apparatus 1 will be explained in detail with reference to FIGS. 1-5 and 15-18 as mentioned above. FIG. 15 shows what is shown in FIG. 11 with the shooting part 301 attached thereto (seen from the same direction of FIG. 11); FIG. 16 shows what is shown in FIG. 12 with the shooting part 301 attached thereto (seen from the same direction of FIG. 12); FIG. 17 shows what is shown in FIG. 13 with the shooting part 301 attached thereto (seen from the same direction of FIG. 13); and FIG. 18 shows what is shown in FIG. 14 with the shooting part 301 attached thereto (seen from the same direction of FIG. 14). In FIGS. 1-5 and 15-18, the reference numerals already used signify the same elements are assigned to the same elements such that the duplicated explanation will be omitted.

The shooting part 301 roughly comprises: a support 311 attached to the connecting members 94, 96; a lighting support 341 attached to the support 311; a lighting part 351 attached to the light support 341; a camera support 361 attached to the support 311; a camera 381 attached to the camera support 361.

The support 311 comprises: a first column 321 (It is formed of a rod-like member) having one end attached to the connecting member 94 and a longitudinal direction thereof approximately parallel to Z-axis; a second column 322 (It is formed of a rod-like member) having one end attached to the connecting member 96 and a longitudinal direction thereof approximately parallel to Z-axis; and an attachment member 323 (It is formed by folding a sheet-like member along a straight line parallel to X-axis) formed of a rod-like member attached between the first column 321 and the second column 322 such that a longitudinal direction thereof is parallel to X-axis.

Such a support 311 is attached to the connecting members 94, 96 such that it conducts a reciprocating movement in the Z-axis direction together with the reciprocating movement of the connecting members 94, 96 as the connecting members 94, 96 move reciprocatingly in the Z-axis direction in the folding test of the above-mentioned test piece.

The light support 341 is attached to one end side (here, on a closer side of the end attached to the second column 322) of the attachment member 323 of the support 311 (It is attached to an attachment slit 32 shaped in an elongated manner along the X-axis direction); more specifically, it comprises a first part member 342 having a top end thereof attached moveably in the X-axis direction to the attachment member 323; and a second part member 343 attached moveably in the Z-axis direction to the first part member 342, and a lighting part 351 is attached to the second part member 343 to be described later. The top end of the first part member 342 is moveable along the attachment slit 323h (particularly refer to FIGS. 2 and 4) formed in an elongated manner in the attachment member 343 along the X-axis direction; and by adjusting the position in the Z-axis direction of the second part member 343 relative to the first part member 342, the position of the lighting part 351 in the X-axis direction and the Z-axis direction can be adjusted (After adjusting in a suitable position, the X-axis direction position of the top end of the first part member 342 and the Z-axis direction position of the second part member 343 are fixed).

For the lighting part 351, here, "OPF-S27X27B-PS" (blue color (470 nm)), narrow directive angle type, 3 cm square) manufactured by OPTEX FA CO., LTD. is used and emits visible light in a direction toward the camera 381 (mainly along the X-axis direction) to be described later and illuminates the test piece (not shown in the figure) attached to the top surface 85a of the other attachment plate 85 and the top surface 55a of the one attachment plate 55. Here, as the lighting part 351, it can be lighting to make it possible for the camera to shoot the image in order to grasp the state of the test piece (not shown in the figure) to a desired extent in the deformation test of the test piece (not shown in the figure) such that various lightings may be used other than this in accordance with the contents of the deformation test and the size and shape of the test piece (not shown in the figure). For example, it is also possible to light for a short period of time by a strobe or the like so as to obtain (intermittently) still figures with high sharpness (in a dark place such as a dark room).

The camera support 361 is attached to the other end side (here, on closer side of the end attached to the first column 321) of the attachment member 323 of the support 311 (It is attached to the attachment slit 323); more specifically, the camera support 361 comprises: the first part 362 attached to the attachment member 323 moveably along the X-axis direction along the attachment slit 323h of the attachment member 323; the second part 363 attached moveably in the Z-axis direction relative to the first part 362; the third part 364 attached moveably in the Y-axis direction relative to the second part 363; the fourth part 365 attached moveably in the Z-axis direction relative to the third part 364; and the camera 381 is attached to the fourth part 365.

The camera 381 attached to the camera support 361 can be adjusted freely in the X-axis direction (position adjustment of the first part 362 along the attachment slit 323h); the Y-axis direction (position adjustment of the third part 364 relative to the second part 363); the Z-axis direction (position adjustment of the third second part 363 relative to the first part 362); rotation position around an axis parallel to Z-axis (rotation position adjustment of the fourth part 365 relative to the third part 364) (These are adjusted in suitable positions and fixed).

The camera 381 is attached to the fourth part 365 of the camera support 361 so as to shoot the test piece (not shown in the figure) used in the folding test in the direction parallel to X-axis so as to transmit the shot image data to the controller 201. Here, as the camera 381, "UI-3480ML-M-GL" (4.92 mega pixel CMOS sensor implemented USB camera) manufactured by IDS Imaging Development Systems GmbH and "FV-2020" (lens featuring low distortion) manufactured by MYUTRON CO., LTD are used. And it goes without saying that various kinds of products other than the above can be used in accordance with contents of the deformation test, the size and shape of the test piece (not shown in the figure) as long as they can shoot the test piece (not shown in the figure) to grasp the state to a desired extent in the deformation test of the test piece (not shown in the figure). For example, as a selection standard of the camera 381, the angle of view (actual vertical and horizontal size of the image captured by the camera), the shooting distance (working distance), resolution, etc. may be included. The angle of view can be decided as appropriate depending on which area of the test piece (not shown in the figure) is shot and if only the tip section (a middle portion between the edge portions 85ae and 55ae) of the bending portion of the test piece (not shown in the figure) is shot, the angle of view may be about 10-20 cm vertically and horizontally. The shooting distance is the distance from the end of the lens installed in the camera to the object (test piece) and if the lens barrel (size) can be large enough such that good captured image without distortion can be shot which is suitable for the image processing, but the lens tends to be expensive and large (setting space becomes large) to cause problems such that these may try to be compatible. The resolution is the resolution of the image taken by the camera and the resolution may be selected in accordance with the image processing of the captured image and usually if the image processing to extract the contour of the test piece (not shown in the figure) is employed, it is not necessary to obtain high resolution, and if the general shape of the test piece (not shown in the figure) is used, it is not necessary to have so much high resolution.

Figure 19:
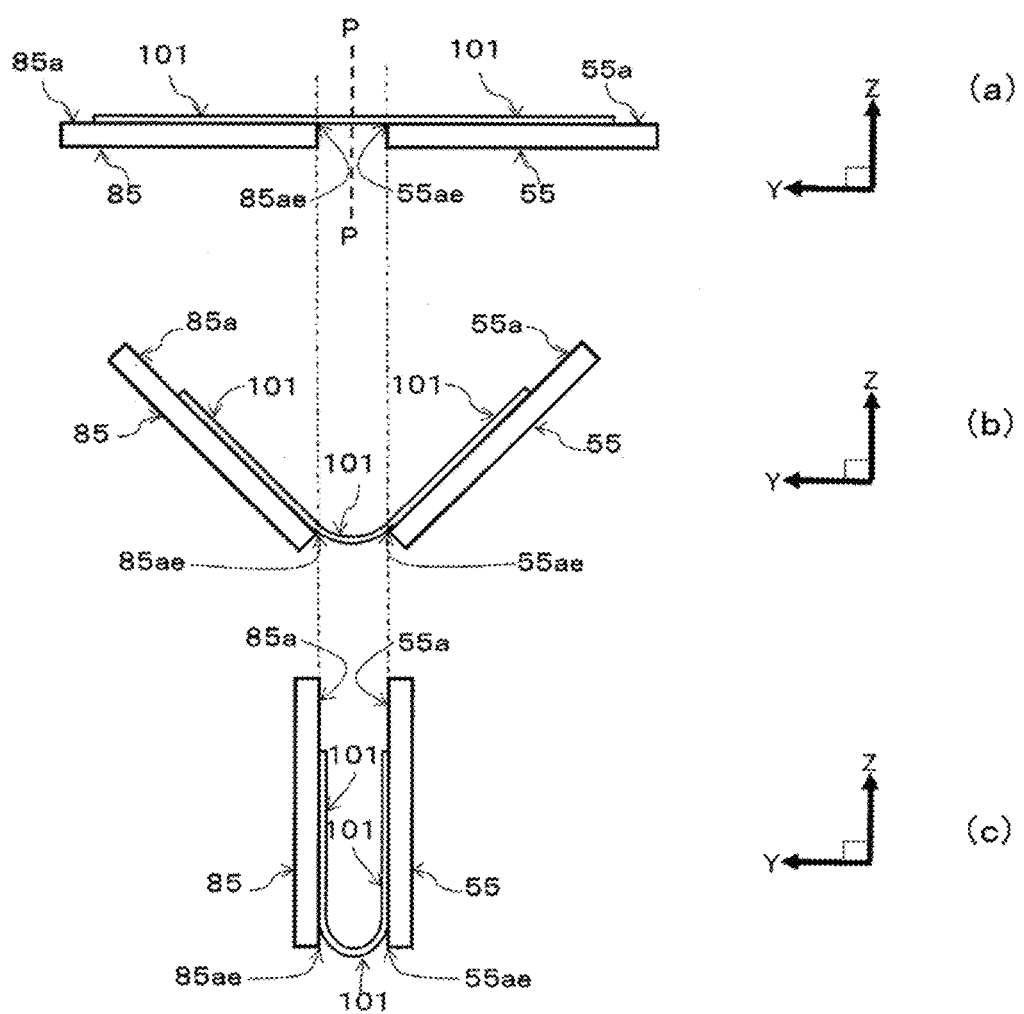
FIG. 19 shows a diagram showing schematically an example of the image taken by the camera.

In FIG. 19, from (a) to (c), examples of images shot by the camera 381 are schematically shown (Among the shot images, the one attachment plate 55, the other attachment plate 85, and the test piece 101 attached to the top surface 85a and the top surface 55a are shown, but the others are omitted). In detail, FIG. 19(a) shows the image shot by the camera 381 in the sate of FIG. 15, FIG. 19(b) shows the image shot by the camera 381 in the sate of FIG. 16, and FIG. 19(c) shows the image shot by the camera 381 in the sate of FIG. 17. The film-like test piece 101 is attached by glue to the top surface 85a and the top surface 55a such that two mutually parallel straight lines of one main surface thereof are aligned in parallel to the edge portions 55ae, 85ae when the one main surface thereof is along the plane. And the test piece 101 attached to the top surface 85a and the top surface 55a is folded between the two top surfaces 85a, 55a, which are rotated in a plane symmetrical manner with respect to the plane P (It is a plane vertical to Y-axis and has the same distances from the edge portions 85ae, 55ae) around the edge portions 85ae and 55ae, respectively, as the respective centers, which are mutually parallel with the constant distance. By the operation of FIG. 19 (a)→(b)→(c)→(b)→(a), one cycle of the folding test of the test piece 101 (one deformation cycle) is carried out. Here, as shown in the figure, a portion of the test piece 101 bridged between the edge portion 55ae and the edge portion 85ae is deformed by folding such that in the side view the curvature (or curvature radius) is constituted. By the deformation, near the plane P, it is plausible that the maximum curvature (or curvature radius) is tended to be caused.

Here, the position of the portion subject to the repeated folding of the test piece (the portion bridged between the edge portion 55ae and the edge portion 85ae) moves in accordance with the movement of the edge portions 55ae, 85ae. And the edge portions 55ae, 85ae move in the same way as the connecting members 94, 96 move such that the shooting part 301 attached to the connecting members 94, 96 are kept in the same relative position with respect to the edge portions 55ae, 85ae in any state of the folding test of the test piece 101 (for example, in any one state of FIGS. 15, 16, 17). Therefore, the camera 381 included in the shooting part 301 keeps approximately the same relative position with respect to the portion of the test piece 101 bridged between the edge portion 55ae and the edge portion 85ae such that the state of the portion of the test piece 101 bridged between the edge portion 55ae and the edge portion 85ae to be folded repeatedly can be shot by the camera 381 in a stable condition and with high quality of image in any state of the folding test. Here, the shooting direction (light axis) of shooting by the camera 381 exits on the straight line parallel to X-axis, which makes the shortest and equal distance from the edge portions 55ae, 85ae. Here, the test piece 101 can be attached to the top surface 55a and the top surface 85a such that the portion to be folded of the test piece 101 may not be overhung beyond the top surfaces as it passes beyond the edge portions 85ae, 55ae. If it overhangs, the test piece 101 may partially contact respective edge parts of the edge portions 55ae, 85ae.

Then, the controller 201 is explained, the controller 201 is explained separately in Embodiment 1 (controller 201 of first example) and in Embodiment 2 (controller 201a of second example).

Embodiment 1

First, the controller 201 in Embodiment 1 is explained. The controller 201 controls the testing apparatus main body 11 to conduct the folding test of the test piece 101 and analyzes the captured image data taken by the camera 381 of the shooting part 301.

Figure 20:
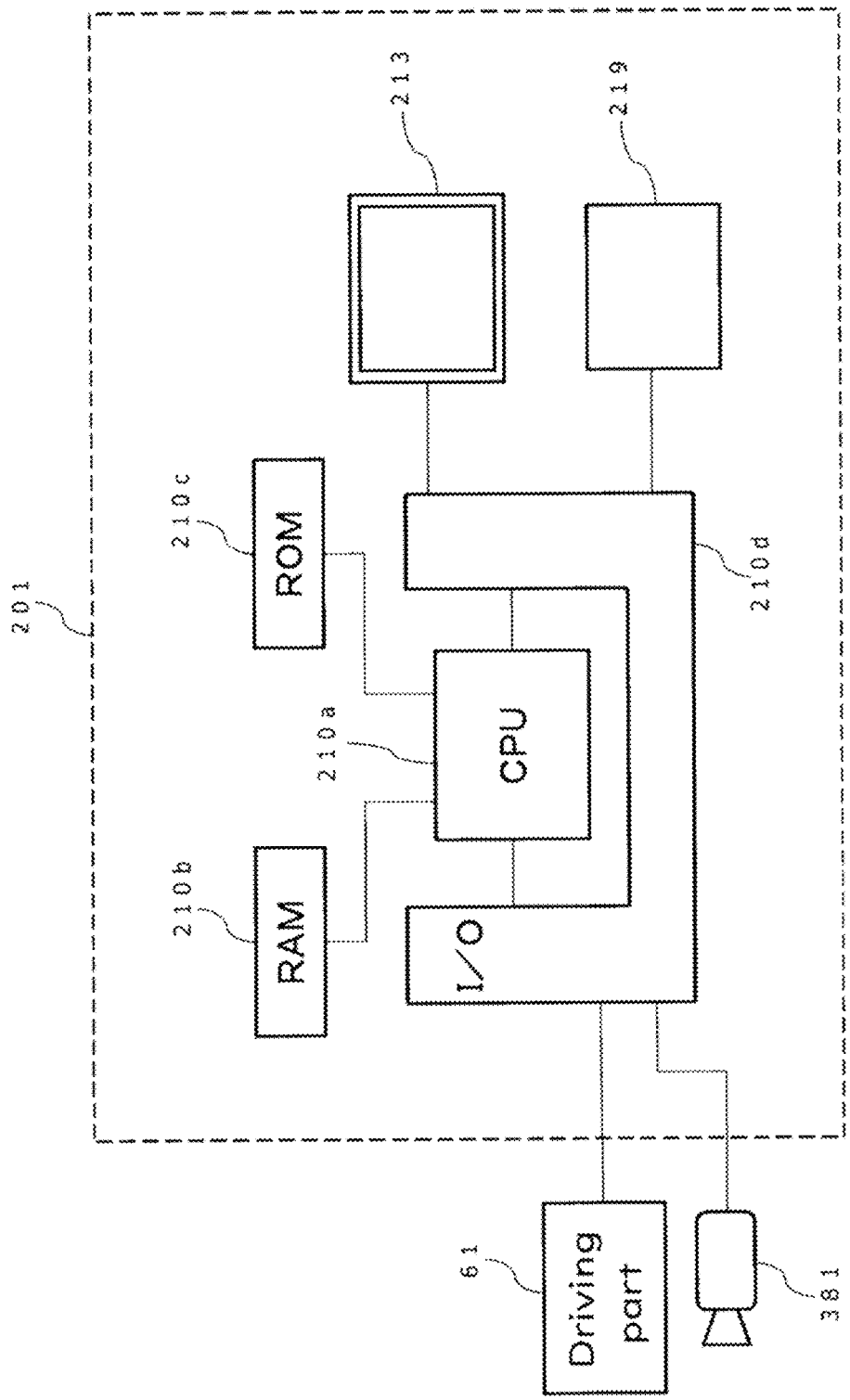
FIG. 20 shows a schematic block diagram showing a hardware structure of a controller.

FIG. 20 shows a schematic block diagram showing a hardware configuration of the controller 201. The hardware configuration of the controller 201 is explained with reference to FIG. 20. The controller 201 of Embodiment 1 comprises a computer with a built-in program; an input-output user interface 213 (e.g., touch pad) and a SSD (Solid State Drive) 219 as a large capacity storage. The computer comprises a CPU 210a to conduct a arithmetic processing; a RAM 210b as a work area and the like of the CPU 210a; a ROM 210c to store a control program and so on; and an interface 210d for exchanging information and is connected to the input-output user interface 213 such as a touch pad and the like for inputting and outputting information and a SSD 219 of large capacity for storing the information and the like. And the controller 201 can freely transmit data to and receive data from the camera 381 and driving part 61.

Figure 21:
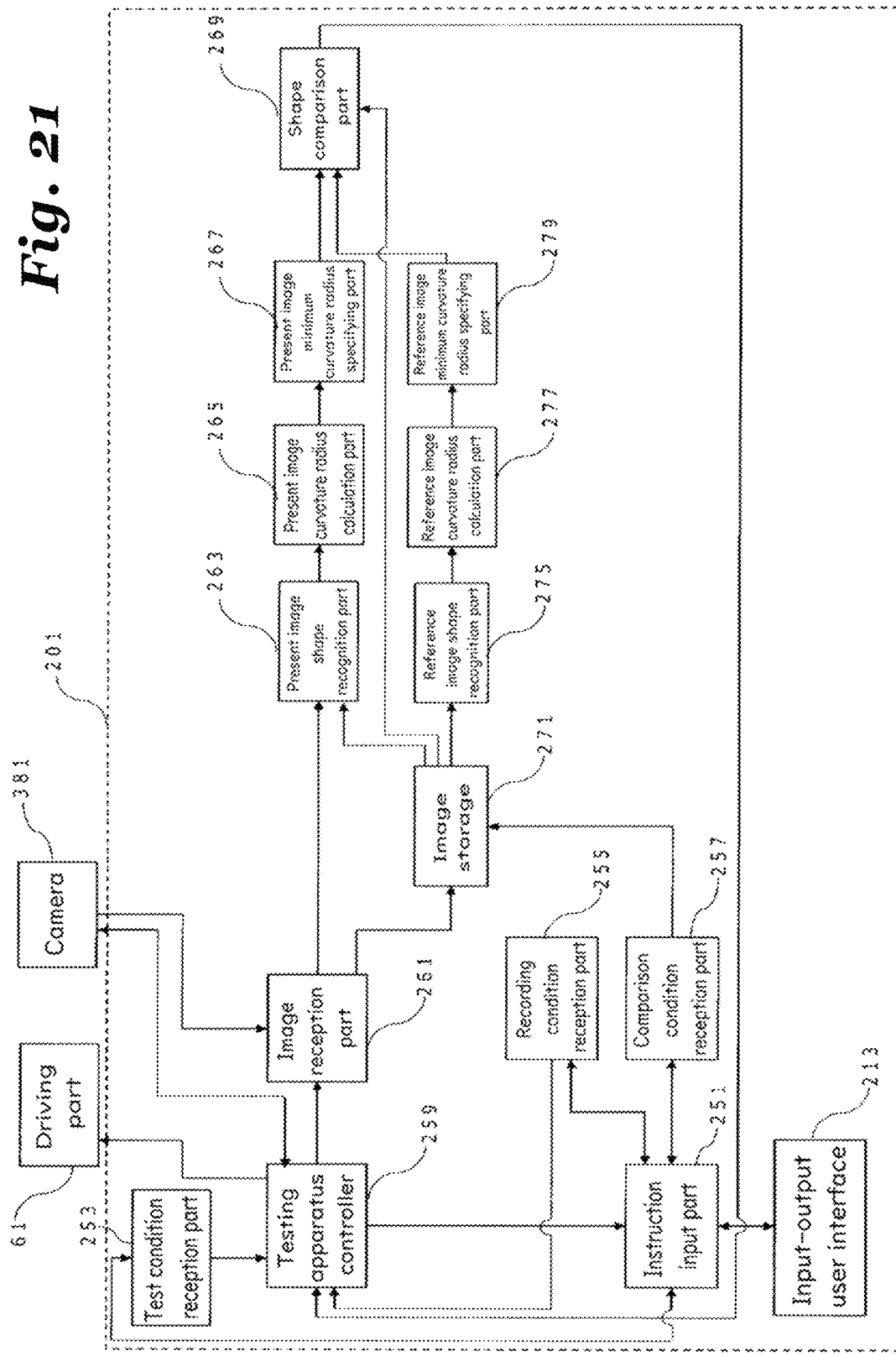
FIG. 21 shows a functional block diagram showing the controller of Embodiment 1.

FIG. 21 shows a functional block diagram of the controller 201 which is realized by the hardware of FIG. 20 and the program stored mainly in the ROM 210c. The controller 201 functionally comprises: an instruction input part 251; a test condition reception part 253; a recording condition reception part 255; a comparison condition reception part 257; a testing apparatus controller 259; an image reception part 261; a present image shape recognition part 263; a present image curvature radius calculation part 265; a present image minimum curvature radius specifying part 267; a shape comparison part 269; an image storage 271 (including RAM 210b and SSD 219); a reference image shape recognition part 275; a reference image curvature radius calculation part 277; and a reference image minimum curvature radius specifying part 279. And the input-output user interface 213 may be included.

Figure 22:
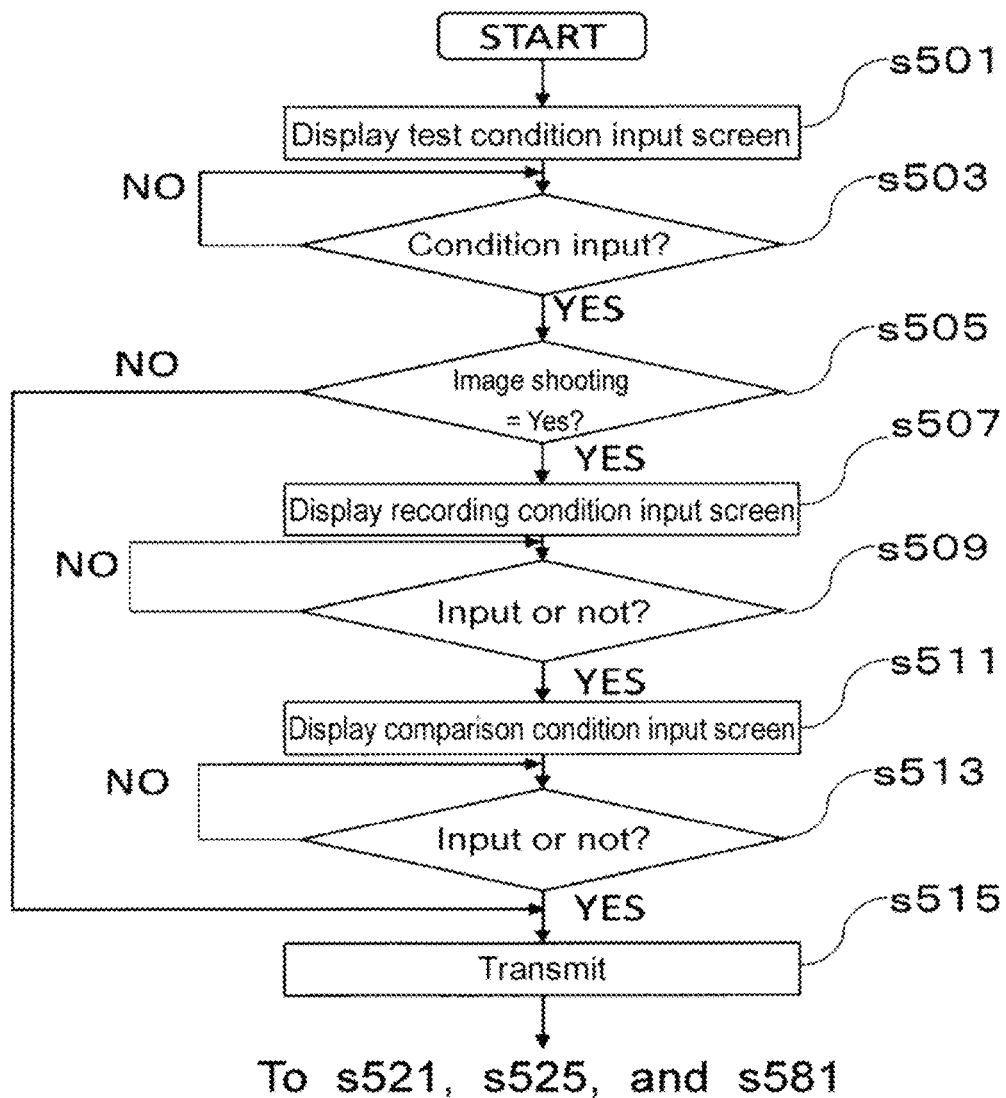
FIG. 22 shows a flowchart showing an operation of the controller of Embodiment 1.

As shown in FIG. 22, once the present testing apparatus 1 is initiated (START), the instruction input part 251 causes the input-output user interface 251 to display the screen from which the test condition can be input (s501). In the test condition input screen, each of an upper limit of folding cycle number, a minimum folding angle; a maximum folding angle, a folding speed, image shooting (Yes/No), a folding angle for image shooting, and test piece thickness can be input. The upper limit of folding cycle number is the maximum cycle number of folding cycles where the test piece 101 is subject to the folding test which is bridged between the top surface 55a and the top surface 85a (In an example as described above, it corresponds to the maximum number of deformation cycles to be carried out, one of which correspond to that as shown in FIG. 19 (a)→(b)→(c)→(b)→(a)). The minimum folding angle and the maximum folding angle are referred to the minimum value and the maximum vale of the angles formed by the plane to which the top surface 55a belongs and the plane to which the top surface 85a belongs during one folding cycle and, for example, in the case of the one folding cycle of FIG. 19 (a)→(b)→(c)→(b)→(a), the minimum folding angle is 0 degrees and the maximum folding angle is 180 degrees. The folding speed is the folding cycle number of times performed per minute (Here, the shooting interval (frequency) of the camera 381 and the folding speed can be set as appropriate such that the camera 381 shooting and the folding operation are synchronized). The image shooting (yes/No) indicates whether the image shooting should be conducted or not in the middle of performing the folding test and if the image shooting "No" is selected, the folding test is simply performed in accordance with the other test condition. The folding angle for image shooting indicates how many degrees of the folding (bending) angle of the testing apparatus (the angle made by the plane to which the top surface 55a belongs and the plane to which the top surface 85a belongs) as the interval between image shootings to be conducted. The test piece thickness indicates the thickness of the test piece 101 subject to the folding test (unit: micrometer (μm)). The user (not shown in the figure) of the present testing apparatus 1 can input such test condition by operating the input-output user interface 213.

After s501, the instruction input part 251 determines whether the test condition (all the above items) is input or not (s503), and if it determines that it has not been input in s503, then the process returns to s503 again. If it is determined that the condition has been input (YES), the instruction input part 251 stores the thus-input test condition and determine whether "shooting image or not" included in the thus-input test condition (s505), if it is determined that the shooting image is "affirmative" (YES), the instruction input part 215 causes an input-output user interface 213 to display a monitor screen for inputting a recording condition (s507). If it is not determined that the image shooting is "affirmative" (NO), the process proceeds to s515 (The test condition is transmitted to the test condition reception part 253 and is stored by the test condition reception part 253).

The controller 201 is to compare image data (present image) to be shot by the camera 381 of the test piece 101 being subject to the folding test with predetermined image data (reference image) having been shot by the camera 381 before; to detect differences therebetween to be caused by comparing the present image with the reference image; and to stop the driving part 61 (controls the testing apparatus main body 11). The controller 201 causes the image storage 271 to store an image candidate (hereinafter referred to as "recorded image") to be used for the comparison with the present image. The condition to shoot the recorded image is the recording condition and concretely is to specify a range of folding (bending) angle of the testing apparatus which shoots images in the folding cycles (an angle made by a plane to which the top surface 55a belongs and a plane to which the top surface 85a belongs) (Concretely, the maximum angle and the minimum angle of the range are specified); the number of folding cycles when the image shooting is conducted (the number of folding cycles when the image shooting is conducted by counting from the start of the folding test); and an interval in the number of folding cycles when the shooting is conducted (the number of folding cycles when the next shooting is conducted by counting from the start and end of the previous shooting). Therefore, on the screen of the input-output user interface 213 being displayed in s507, the minimum angle and the maximum angle of the range of folding (bending) angle of the testing apparatus shooting images in the folding cycles; the number of folding cycles when the image shooting is started; and the interval (for example, period) in the number of folding cycles when the image shooting is conducted can be input. For example, when 30 degrees and 120 degrees are set for the minimum angle and the maximum angle of the range of folding (bending) angle of the testing apparatus that shoots images during the folding cycles; 50 is set for the number of folding cycles when the image shooting is started; and 10 is set for the interval in the number of folding cycles when the image shooting is conducted, the image shooting is conducted at the time when the number of folding cycles is the 60th by counting from the start of the folding test while the range of folding (bending) angle of the testing apparatus is between 30 to 120 degrees.

After s507, the instruction input part 251 determines whether the recording condition is input or not (s509) and if it determines that it is input (YES), then the instruction input part 251 causes the input-output user interface 213 to display the screen on which comparison condition is input (s511). If it is not determined that it has been input (NO), then the process returns to s509. The comparison condition includes a condition to specify the image data having been shot previously by the camera 381 (reference image) to be compared to the image data to be shot by the camera 381 (present image) of the test piece being subject to the folding test and a condition to specify the time when the reference image and the present image should be compared. Therefore, on the screen of the input-output user interface 213 displayed in s511, (a) the number of folding cycles indicating what number of folding cycles (indicating the number of folding cycles by counting from the start of the folding cycle) on which the image should be shot as the reference image during the operation of the test; (b) the minimum folding angle and the maximum folding angle of the testing apparatus indicating the comparison timing of the reference image and the present image; and (c) a comparison period thereof can be input. Since it is necessary to select the folding cycle number at which the shooting is conducted, (a) the folding cycle number for the reference image is selected from folding cycle numbers at which shooting is conducted as determined based on the "folding cycle number to start shooting" and the "interval cycle numbers between the folding cycle numbers at which shootings are conducted", which are input as the recording condition. For example, if the "folding cycle number to start shooting" is the 50th and the "interval cycle numbers until restarting the shooting" is 10 cycles, the folding cycle number at which the shooting is conducted is the 50th, the 60th, the 70th, the 80th, . . . such that any one of them can be selected (for example, the 60th). And (b) the minimum folding angle and the maximum folding angle of the testing apparatus indicating the comparison timing of the reference image and the present image is to specify a range within the range of folding (bending) angles of the testing apparatus input as the recording condition, concretely, the minimum angle and the maximum angle of the specified range are specified (for example, if the folding (bending) angles of the testing apparatus input as the recording condition are the minimum angle of 10 degrees and the maximum angle of 170 degrees, 20 degrees and 160 degrees can be specified as the minimum angle and the maximum angle of the comparison condition, but 5 degrees and 175 degrees are not allowed). The (c) comparison period is the interval of the folding cycle at which the comparison is conducted and the interval of the folding cycle numbers carried out for shooting input as the recording condition times a predetermined constant may be specified (for example, if the interval of the folding cycle number is specified to be 10 in the recording condition, as the comparison condition, it is possible to make the interval of the folding cycle number is set to 20 cycles as the comparison condition, but it is not possible to make it 15 cycles). Therefore, on the screen for inputting the comparison condition, the folding cycle number to start shooting, minimum angle and maximum angle of the bending angle range of the testing apparatus for shooting, and interval of the folding cycles for conducting shooting to be judged as the recording condition to be input in s509 are displayed as references to show the settable comparison condition range.

After s511, the instruction input part 251 judges whether the comparison condition is input or not (s513), if it judges that it is input (YES), the instruction input part 251 transmits each condition so far input (s515). Concretely, the instruction input part 251 transmits and has the test condition to the test condition reception part 253 and stored therein; transmits and has the recording condition to the recording condition reception part 255 and stored therein; and transmits and has the comparison condition to the comparison condition reception part 257 and stored therein. If it is not judged that it is input in s513 (NO), the process returns to s513.

Figure 23:
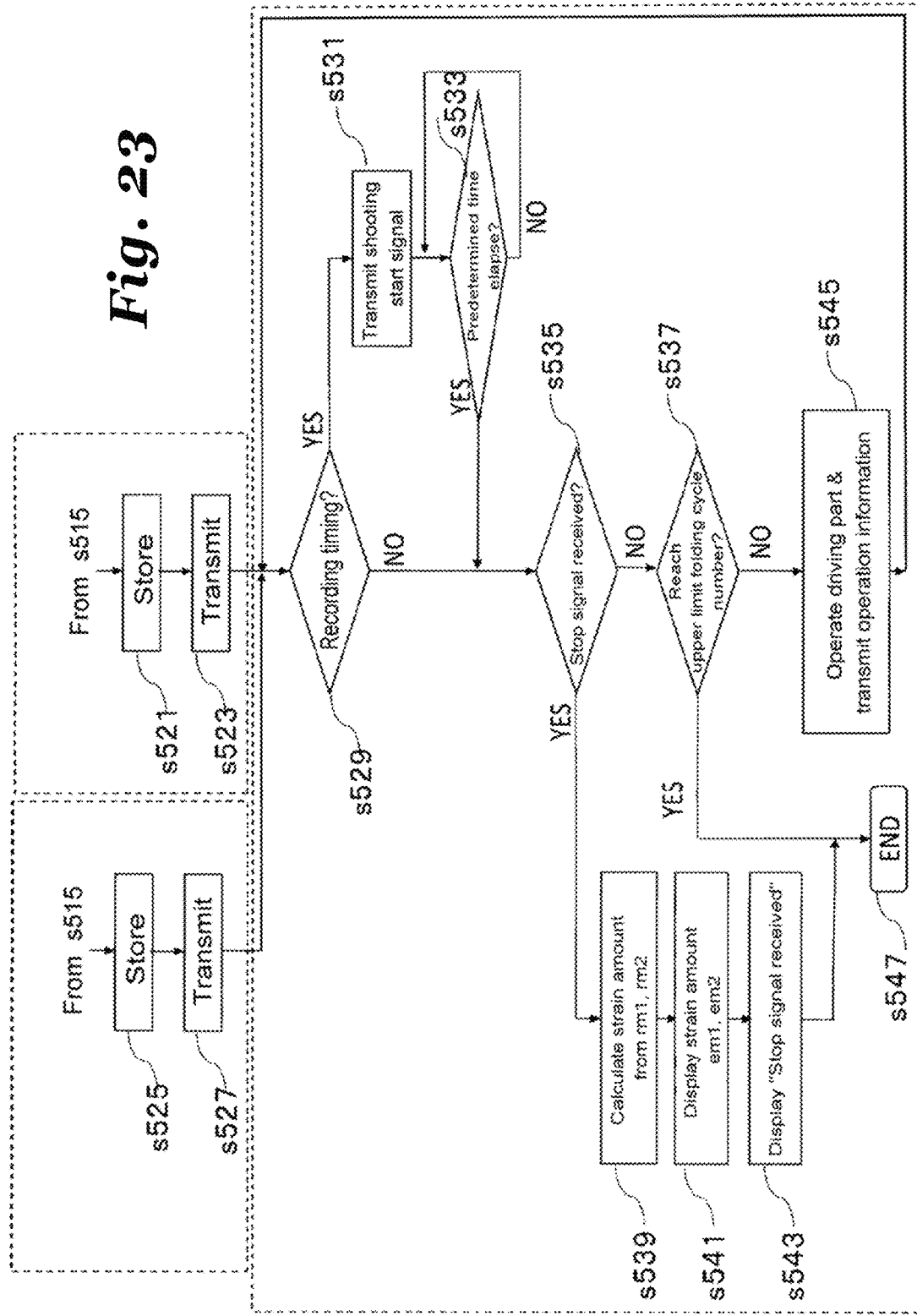
FIG. 23 shows a flowchart showing an operation of the controller of Embodiment 1.

As shown in FIG. 23, the test condition reception part 253 having received the test condition from the instruction input part 251 stores the received test condition (s521) and transmits the test condition to the testing apparatus controller 259 (s523).

And the recording condition reception part 255 having received the recording condition form the instruction input part 251 stores the received recording condition (s525), and transmits the recording condition to the testing apparatus controller 259 (s527).

The testing apparatus controller 259 judges whether the testing apparatus is in the operation state specified by the recording condition (the range of bending angle of the testing apparatus for shooting, the folding cycle number when the shooting starts, the interval of folding cycles when resuming the shooting) or not (s529), if it judges that it is in the operation state (YES), a signal to start shooting is transmitted to the camera (s531), it is judged whether a predetermined time (It is usually set as a period of time from transmitting the signal in s531 to completing the shooting by the camera 381. For example, if the time from transmitting the signal in s531 to completing the shooting by the camera 381 is 0.1 second, the predetermined time may be about 0.1 second) from transmitting the signal in s531 is elapsed or not (s533), if it is judged that the predetermined time from the signal transmission in s531 is elapsed (YES), the process proceeds to s535 to be described later. If it is not judged that the predetermined time from the signal transmission in s531 is not elapsed (NO) in s533, the process returns to s533. If it is not judged that it is in the specified operation state in s529 (NO), the process proceeds to s535. Here, in s533, the above-mentioned "whether the predetermined time from the signal transmission in s531 is elapsed or not" may be replaced with "whether the shooting by the camera 381 is completed or not" (for example, the camera 381 and the testing apparatus controller 259 may be modified such that a signal can be transmitted and received therebetween such that the testing apparatus controller 259 can sense electronically that the camera 381 completed shooting) for the judgment.

In s535, the testing apparatus controller 259 judges whether it receives a stop signal (to be described later) from the shape comparison part 269 or not (s535), and if it does not judge that the stop signal is received (NO), the testing apparatus controller 259 judges whether the total number of the folding cycles (the number of folding cycles having performed since the folding test is started) of the testing apparatus reaches the upper limit folding cycle number specified in the test condition or not (s537). In s537, the testing apparatus controller 259 judges that the folding cycle number does not reach the upper limit folding cycle number (NO), it has the driving part 61 operate in accordance with the test condition transmitted in s523 from the test condition reception part 253 (The testing apparatus controller 259 has the driving part 61 operate only by the folding angle for shooting of the test condition. The testing apparatus controller 259 includes a motor driver), and the testing apparatus controller 259 transmits the operation information of the driving part 61 to the image reception part 261 (s545). As mentioned above, here, the testing apparatus controller 259 makes the driving part 61 operate to change only by the folding angle for shooting of the test condition such that the operation information is transmitted to the image reception part 261 every time when the folding angle of the testing apparatus is changed only by the folding angle for shooting of the test condition. The operation information includes the folding cycle number of the testing apparatus (which folding cycle number is in operating from the start of the folding test of the test piece 101 (e.g., the 1624th)) and the bending angle of the testing apparatus.

The testing apparatus controller 259 judges that the folding cycle number of the testing apparatus reaches the upper limit folding cycle number in s537 (YES), the testing apparatus is stopped (s547).

The testing apparatus controller 259 judges that the stop signal is received from the shape comparison part 269 in s535 (YES), it calculates the maximum strain amount em1 on the surface in the present image and the maximum strain amount em2 on the surface in the reference image by the following formula 1 and formula 2 from the minimum curvature radius rm1 in the present image, the minimum curvature radius rm2 in the reference image, and the thickness of the test piece, which are transmitted from the shape comparison part 269 in association with the stop signal.

$$em1 = h/(2 \times rm1) \quad \text{(Formula 1)}$$

$$em2 = h/(2 \times rm2) \quad \text{(Formula 2)}$$

The testing apparatus controller 259 instructs the instruction input part 251 to have the input-output user interface 213 to display em1 and em2, a phrase of "stop signal received", and the folding cycle number up to the time (s541), and the input-output user interface 213 displays these (s543) upon receiving the instruction of s541. Then, the testing apparatus controller 259 stops the operation of the driving part 61 (s547).

Figure 24:
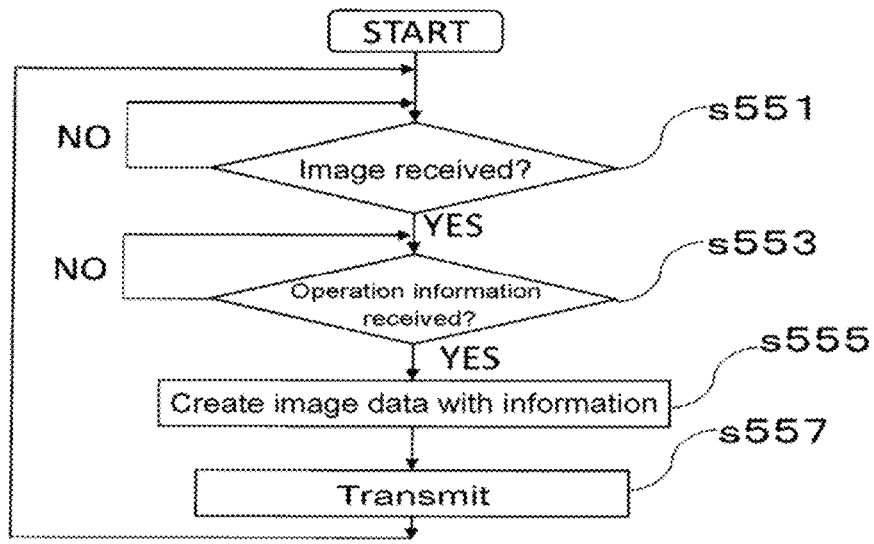
FIG. 24 shows a flowchart showing an operation of the controller of Embodiment 1.

On the other hand, the camera 381 shoots the test piece 101 in the middle of folding test upon a shooting-start instruction transmitted in s531 from the testing apparatus controller 259 and the thus-shot image data is transmitted to the image reception part 261. The image reception part 261, as shown in FIG. 24, determines whether the image data has been received from the camera or not (s551) and if it determines that the image data has been received (YES), then it determines whether the operation information (the number of folding cycles of the testing apparatus and the bending angle of the testing apparatus) transmitted from the testing apparatus controller 259 in s545 or not (s553). The image reception part 261, if it is determined that the operation information is received in s553 (YES), creates image data with information (s555) in which the image data from the camera 381 is associated with the operation information (the number of cycles and the folding (bending) angle) received from the testing apparatus controller 259, and transmits the thus-created image data with the information to the present image shape recognition part 263 and the image storage 271 in a parallel manner (s557). After s557, the process returns to s551. If it is not determined that the image data has been received in s551 (NO), then the process returns to s551. If it is not determined that the operation information has been received in s553, the process returns to s553.

Figure 25:
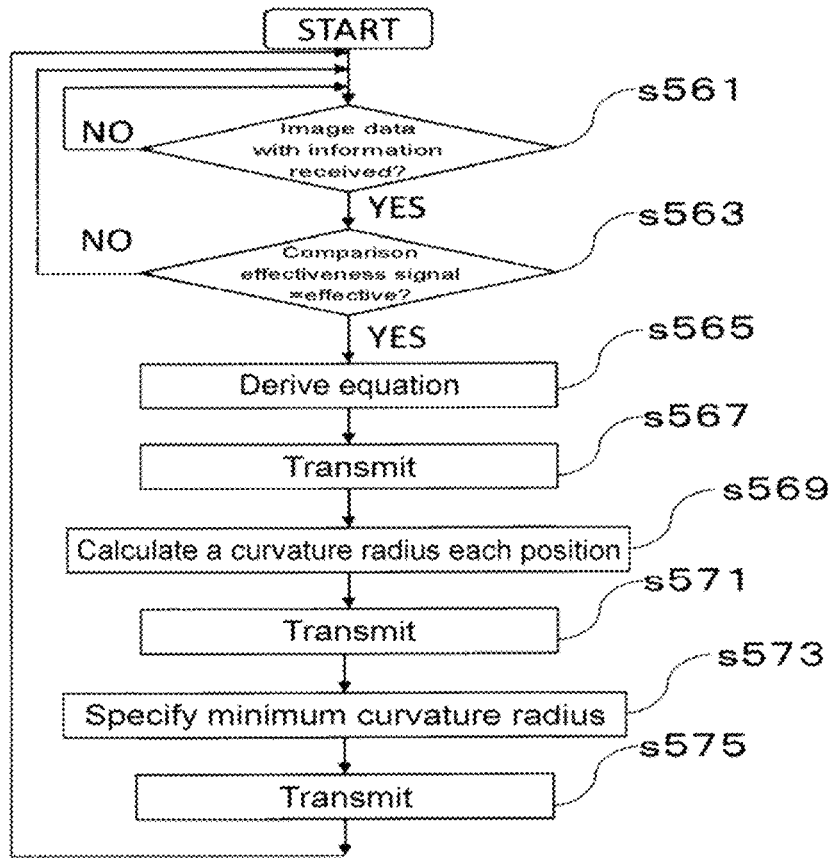
FIG. 25 shows a flowchart showing an operation of the controller of Embodiment 1 and Embodiment 2.

As shown in FIG. 25, the present image shape recognition part 263 determines whether image data with information is received from the image reception part 261 or not (s561) and if it determines that the image data with the information has been received (YES), then it determines whether a comparison effectiveness signal transmitted from the image storage as described later is "effective" or not (s563) and if it determines that it is "effective" (YES), an equation (or an approximation formula (for example, n-polynomial formula (n is a real number including a positive integer))) is derived (s565).

Figure 26A:
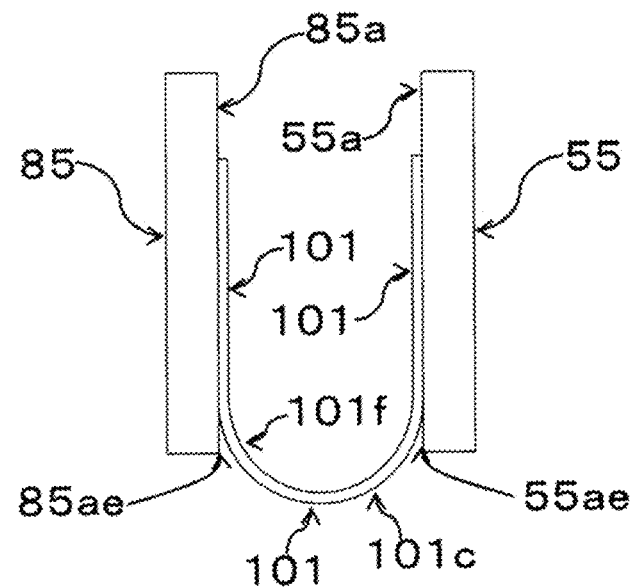
FIG. 26A shows a diagram showing details of a test piece of FIG. 19(C).
Figure 26B:
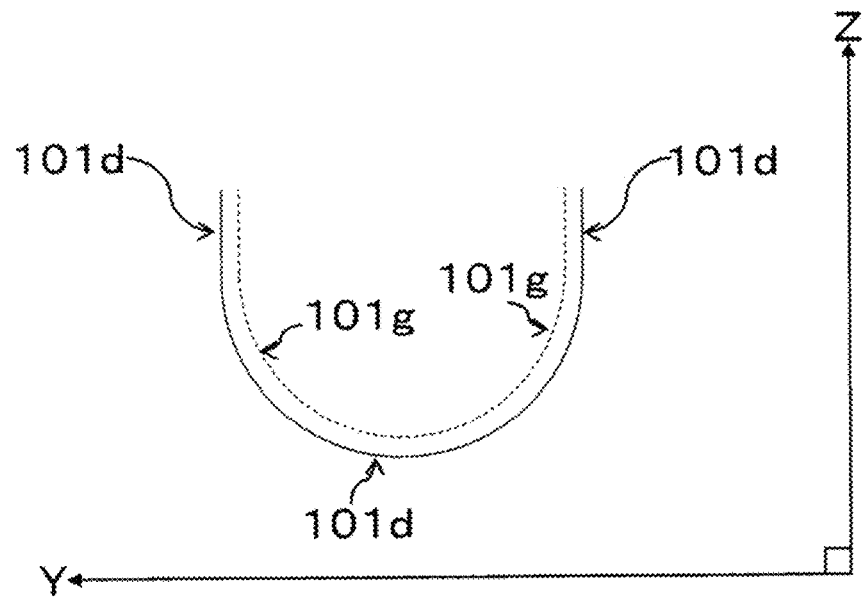
FIG. 26B shows a diagram illustrating a method of deriving an equation showing an outer edge of the test piece of FIG. 19(C).

FIGS. 26A and 26B show diagrams briefly illustrating a method of deriving the equation and FIG. 26A shows a detailed diagram as an example shown in FIG. 19(*c*). Y-axis and Z-axis (both axes are orthogonal with each other) are taken in predetermined directions in a captured image and combinations of y coordinate and z coordinate of a curve line 101*d* indicating an outer edge 101*c* (an outer edge of a curved test piece 101) of the test piece 101 as shown in a solid line are extracted by using an image processing. Here, depending on the sharpness of the captured image, difference in the signal levels against the background, S/N, and so on, combinations of y coordinate and z coordinate of a curve line 101*g* (a dotted line in FIG. 26B) indicating an inner edge 101*f* (an inner edge of a curved test piece 101) of the test piece 101 may be extracted or combinations of y coordinate and z coordinate of a center line (that is, in the middle of the curve line 101*d* and the curve line 101*g*) in the thickness direction of the test piece may be extracted. And a curve line (polynomial of y) approximating the curve line 101*d* is derived from a group of points indicated by the combination of y coordinate and z combination of the curve line 101*d* indicating an outer edge 101*c* of the test piece 101, processing of which is called as curve fitting and, for example, a least-square method may be used. This process is publicly known such that explanation thereof is omitted. In the case where it is not determined that the image data with information is received in s561 (NO), the process returns to s561. In the case where it is not determined that a comparison effectiveness signal is effective in s563 (NO), the process returns to s561.

The present image shape recognition part 263 that derives an equation in s565 transmits the equation to the present image curvature radius calculation part 265 (s567).

The present image curvature radius calculation part 265 that receives the equation transmitted from the present image shape recognition part 263 in s567 obtains a curvature radius in a position of the equation (s569). Concretely, a curvature radius at a point existing on the equation in a section divided equally with a predetermined resolution in y-coordinate between one end (smaller y coordinate) and the other end (bigger y coordinate) of the equation is calculated and such calculation for the curvature radius may be conducted, for example, using the differentiation. When the equation is f, the curvature radius r at the y coordinate may be calculated by the following formula 3.

$$r = (1 + f'(y)^2)^{1.5} / \text{ABS}(f''(y)) \quad \text{(Formula 3)}$$

Here, in the formula 3, f' is a first derivative of the function f; f'' is a second derivative; and ABS(a) is an absolute value of a.

The present image curvature radius calculation part 265 transmits to the present image minimum curvature radius specifying part 267 curvature radius information associated mutually with y coordinate (y) and a curvature radius (r) at the position such as (y1, r1), (y2, r2), (y3, r3), . . . (yn, rn) (here, n is a natural number) calculated in this way. Here, y coordinates (from y1 to yn) for calculating the curvature radius may be in the entire range included in the image or may be limited to y coordinates around the center portion of folding (bending) at the time of folding.

The present image minimum curvature radius specifying part 267 having received the curvature radius information transmitted from the present image curvature radius calculation part 265 in s571 specifies the minimum value of the curvature radius r among the curvature radius information (y1, r1), (y2, r2), (y3, r3), . . . (yn, rn) (s573). And the present image minimum curvature radius specifying part 267 transmits (ym, rm) (here, m is a natural number) of the smallest curvature radius as the position information where the maximum strain occurs to the shape comparison part 269 (s575). After s575, the process returns to s561.

Figure 27:
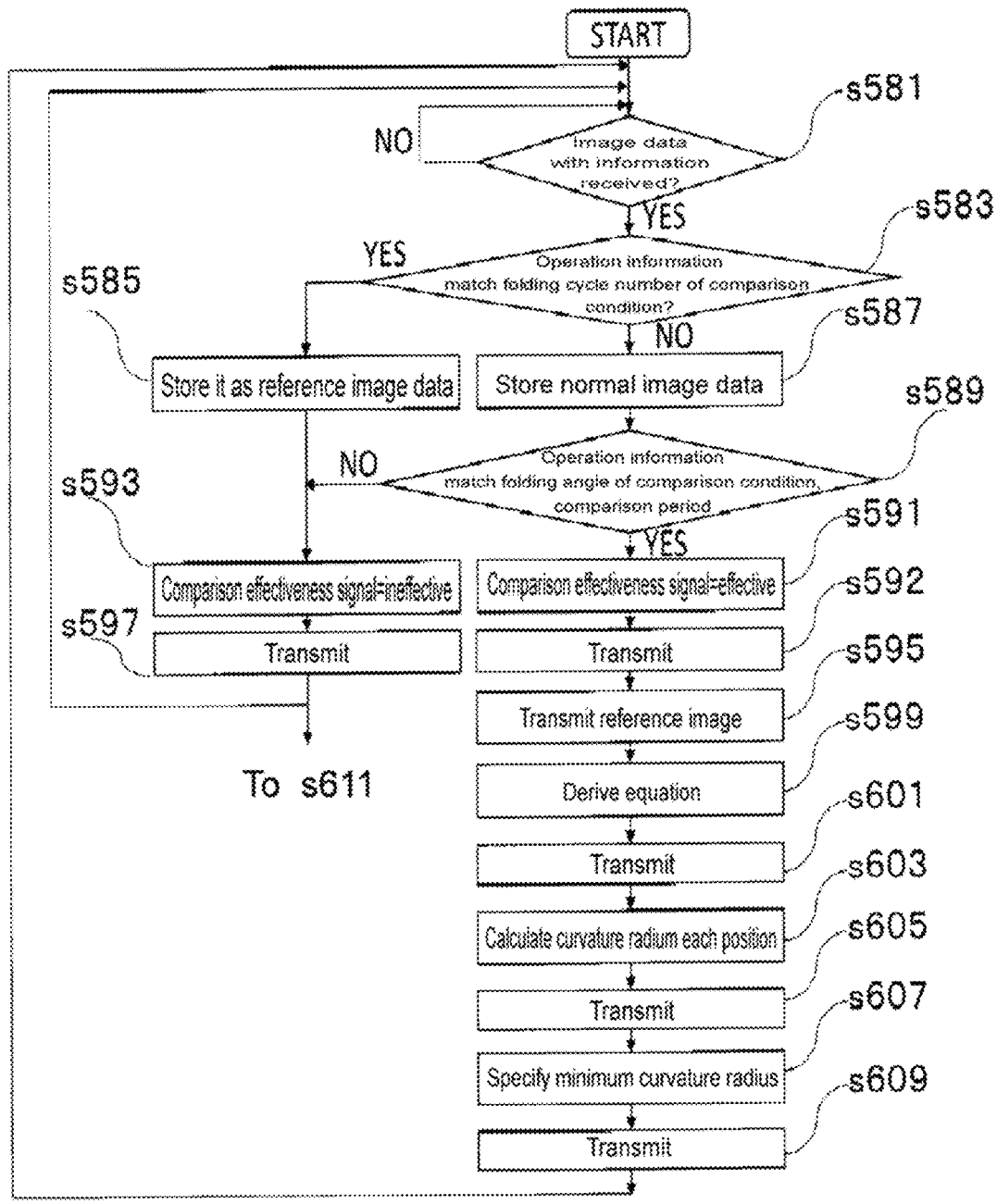
FIG. 27 shows a flowchart showing an operation of the controller of Embodiment 1.

On the other hand, the image storage 271, as shown in FIG. 27, judges whether to receive the image data with information having been transmitted from the image reception part 261 in s557 or not (s581), in the case where it is judged that the image data with information is received (YES), the comparison condition ((a) a folding cycle number indicating how many folding cycle numbers having been performed during the test operation by the time when shooting the image to be made as the reference image; (b) minimum folding angle and maximum holding angle of the testing apparatus indicating the comparison timing of the reference image and the present image; and (c) a comparison period) transmitted to and stored at the comparison condition reception part 257 from the instruction input part 251 in s515 is read out from the comparison condition reception part 257 and obtained, it is judged whether the folding cycle number of the operation information (the folding cycle number of the testing apparatus, the bending angle of the testing apparatus) included in the received image data with information matches (a) the folding cycle number among the read and obtained comparison condition or not (s583), in the case where it is judged that both folding cycle numbers match each other (YES), the image storage 271 stores the image data with information having been judged to be received (s585), creates a comparison effectiveness signal of "ineffective" (s593), and transmits the signal in parallel to the shape comparison part 269 and the present image shape recognition part 263 (s597), and the process returns to s581. On the other hand, in the case where it is not judged that both folding cycle numbers match with each other in s583 (NO), the image storage 271 records as the normal image the image data with information having been judged to be received in s581 (s587). After s587, it is judged whether the operation information (the folding cycle number of the testing apparatus, the bending angle of the testing apparatus) included in the received image data with information matches the folding cycle number to be compared (for example, (a) the folding cycle number is 60, which indicates how many times the folding cycles have been performed during the operation until the captured image is made as the reference image and (c) if the comparison period is 10 times, the number of folding cycles to be compared is 70 (=60+10), 80, 90, 100, 110, . . . ) and (c) the minimum folding angle and the maximum folding angle of the testing apparatus or not (s589), in the case where it is judged to be included (YES), a comparison effectiveness signal of "effective" is created (s591), and the signal is transmitted in parallel to the shape comparison part 269 and the present image shape recognition part 263 (s592). In the case where it is not judged that it is included in s589 (NO), the process proceeds to s593.

After s592, the image storage 271 reads the reference image data having the same folding angle as the bending angle included in the operation information (the folding cycle number of the testing apparatus, the bending angle of the testing apparatus) of the received image data with information among the reference image data recorded in the image storage 271 and transmit the reference image data to the reference image shape recognition part 275 (s595).

In the case where it is not judged that the image data with information is received in s581 (NO), the process returns to s581.

The reference image shape recognition part 275 having received the reference image data having been transmitted by the image storage 271 in s595 derives an equation indicating the outer edge of the test piece 101 included in the reference image data (s599). Here, the operation of the s599 is the same as that of s565 described above such that the explanation is omitted.

The reference image shape recognition part 275 having derived the equation in s599 transmits the equation to the reference image curvature radius calculation part 277 (s601). The thus-transmitted equation is stored by the reference image curvature radius calculation part 277.

The reference image curvature radius calculation part 277 having received the equation having been transmitted from the reference image shape recognition part 275 in s601 calculates the curvature radius with respect to a predetermined range of y coordinate in the same way as in s569 as mentioned above.

The reference image curvature radius calculation part 277 transmits the curvature radius information in which the curvature radius (r) at the position is associated with y coordinate (y) such as (y1, r1), (y2, r2), (y3, r3), . . . (yn, rn) (here, n is a natural number) calculated in this way to the reference image minimum curvature radius specifying part 279 (s605).

The reference image minimum curvature radius specifying part 279 having received the curvature radius information specifies the minimum value among curvature radii calculated by the reference image curvature radius calculation part in the same way as the present image minimum curvature radius specifying part 267 does in s573 as mentioned above (s607).

The reference image minimum curvature radius specifying part 279 transmits the minimum curvature radius specified in s607 and the corresponding y coordinate to the shape comparison part 269 (s609). Then, the process returns to s581 after s609.

Figure 28:
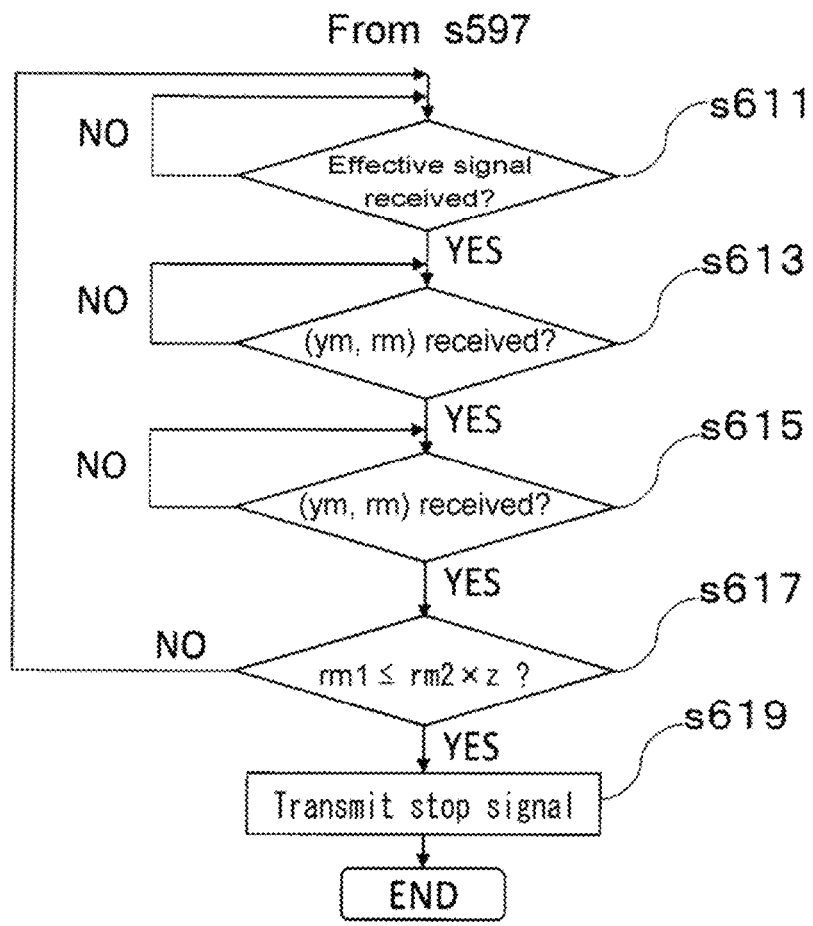
FIG. 28 shows a flowchart showing an operation of the controller of Embodiment 1 and Embodiment 2.

The shape comparison part 269, as shown in FIG. 28, judges whether the comparison effectiveness signal transmitted from the image storage 271 in s592 and s597 indicates "effective" or not (s611), in the case where it is judged that the signal indicating "effective" is received (YES), it is judged whether (ym, rm) transmitted from the present image minimum curvature radius specifying part 267 in s575 is received or not (s613). In the case where it is judged that (ym, rm) is received in s613 (YES), it is judged whether the reference image minimum curvature radius information (ym, rm) transmitted from the reference image minimum curvature radius specifying part 279 in s609 is received or not (s615), in the case where it is judged that the reference image minimum curvature radius information (ym, rm) is received (YES), the process proceeds to s617. To make the explanation easier, (ym, rm) transmitted in s575 from the present image minimum curvature radius specifying part 267 is referred to as (ym1, rm1) and (ym, rm) transmitted in in s609 from the reference image minimum curvature radius specifying part 279 is referred to as (ym2, rm2) and the explanation is described as follows. It is judged whether rm1 is not exceeding the product of mr2 and a predetermined multiplying factor or not in s617. Concretely, it is judged whether rm1 is not exceeding a value (z×rm2) of rm2 times a predetermined multiplying factor z or not. Here, z is set to a value at least 0 and not exceeding 1 and if it is too small, the change of the curvature radius cannot be detected well, but if it is too big, an unnecessary detection case may be erroneously detected such that it may be in a compatible range. It depends on the properties of the subject test and the usage or the like how much change of the surface strain amount should be detected, but z is usually at least 0.1, more preferably at least 0.2, and most preferably at least 0.3 and is preferably not exceeding 0.9, more preferably not exceeding 0.8, and most preferably not exceeding 0.7.

In the case where it is judged that rm1 is not exceeding (z×rm2) in s617 (YES), the shape comparison part 269 transmits (ym1, rm1) and (ym2, rm2), and a stop signal in association with each other to the testing apparatus controller 259 (s619). The testing apparatus controller 259 having received the stop signal transmitted from the shape comparison part in s619, as mentioned above, calculates maximum strain amount em1 and em2 on the surface from the curvature radii rm1 and rm2 (s539), instructs the instruction input part 251 to display on the input-output user interface 213 em1 and em2, a phrase of "Stop signal received", and the folding cycle numbers up to the time point (s541), and stops the operation of the driving part 61 (s547).

In the case where it is not judged that the comparison effectiveness signal indicates "effective" (NO) in s611, the process returns to s611. In the case where it is not judged that (ym, rm) is received in s613 (NO), the process returns to s613. In the case where it is not judged that (ym, rm) is received in s615 (NO), the process returns to s615. In the case where it is not judged that rm1 is not exceeding (z×rm2) (ym, rm) in s617 (NO), the process returns to s611.

As explained above, the present testing apparatus 1 having the controller 201 in Embodiment 1 performs the deformation test in which the deformation cycle (e.g., FIG. 19 (a)→(b)→(c)→(b)→(a)) is conducted for a plurality of times, which is supposed to cause the same deformation in the specimen (here, test piece 101) in each cycle, and is a deformation testing apparatus to detect that the deformation caused in the specimen (test piece 101) is changed with an increase of the number of carried out deformation cycles, the deformation testing apparatus comprises: image capturing means (here, camera 381) capable of creating captured image data by shooting a specimen (test piece 101); reference data storing means (here, image storage 271) to store reference data (here, reference captured image data) of reference cycle number deformation data indicating a deformation state of the specimen (test piece 101) in a reference cycle number calculated based on reference captured image data or the reference captured image data in which the image capturing means (camera 381) shoots the specimen (test piece 101) at the reference cycle number ((a) a folding cycle number indicating how many folding cycle numbers having been performed during the test operation by the time when shooting the image to be made as the reference image, which is input as comparison condition) of a cycle number of times the deformation cycle is performed as the reference deformation caused in the specimen (test piece 101); reference cycle number deformation data calculating means (here, a reference image shape recognition part 275, a reference image curvature radius calculation part 277, and a reference image minimum curvature radius specifying part 279) to calculate reference cycle number deformation data (here, a minimum curvature radius specified in s607) based on reference captured image data; detection cycle number deformation data calculating means (here, a present image shape recognition part 263, a present image curvature radius calculation part 265, and a present image minimum curvature radius specifying part 267) to calculate detection cycle number deformation data (a minimum curvature radius specified in s573) showing a deformation state of the specimen (test piece 101) at a detection cycle number based on detection captured image data (a present image) of the specimen (test piece 101) shot at the detection cycle number of a cycle number of times the deformation cycle is performed, which is greater than the reference cycle number; and change detection means (here, shape comparison part 269) to detect a change between deformations caused in the specimen (test piece 101) at the reference cycle number and the detection cycle number based on the reference cycle number deformation data and the detection cycle number deformation data.

In the present testing apparatus 1 having a controller 201 in Embodiment 1, reference cycle number deformation data calculating means (a reference image shape recognition part 275, a reference image curvature radius calculation part 277, and a reference image minimum curvature radius specifying part 279) comprises: reference formula deriving means (or reference formula deriving unit) to derive a reference formula of a formula expressing the shape of the specimen based on the reference captured image data; reference-deformation-degree calculating means (reference image curvature radius calculation part 277) to calculate reference deformation degree ((y1, r1), (y2, r2), (y3, r3), (yn, rn) as mentioned above) showing the deformation degree in at least two or more portions of the specimen (test piece 101) based on the reference formula derived by the reference formula deriving means (reference image shape recognition part 277); and reference-deformation-degree selecting means (reference image minimum curvature radius specifying part 279) to select what is judged to be the largest deformation degree among at least two or more reference deformation degrees calculated by the reference-deformation-degree calculating means (reference image curvature radius calculation part 277) as the reference cycle number deformation data.

In the present testing apparatus 1 having a controller 201 in Embodiment 2, the detection cycle number deformation data calculating means (a present image shape recognition part 263, a present image curvature radius calculation part 265, and a present image minimum curvature radius specifying part 267) comprises: detection formula deriving means (a present image shape recognition part 263) to derive a detection formula (an equation derived in s565) of a formula indicating the shape of the specimen (test piece 101) based on the detection captured image data (present image); detection-deformation-degree calculating means (a present image curvature radius calculation part 265) to calculate a detection deformation degree ((y1, r1), (y2, r2), (y3, r3), . . . (yn, rn) as mentioned above) indicating deformation degrees of at least two or more portions of the specimen (test piece 101) based on the detection formula derived by the detection formula deriving means (a present image shape recognition part 263); and detection-deformation-degree selecting means (a present image curvature radius calculation part 267) to select the one judged to have the largest deformation degree among at least two or more detection deformation degrees calculated by the detection-deformation-degree calculating means (a present image curvature radius calculation part 265).

In the present testing apparatus 1 having the controller 201 in Embodiment 1, detection cycle number deformation data (rm1) and reference cycle number deformation data (rm2) are curvature radii showing shapes of the specimen (test piece 101).

In the present testing apparatus 1 having the controller 201 in Embodiment 1, change detection means (shape comparison part 269) detects that the deformation caused in the specimen (test piece 101) is changed between at the reference cycle number and at the detection cycle number by the rate of change that is a ratio (rm1/rm2) of the other (rm1) over one (rm2) of the detection cycle number deformation data (rm1) over the reference cycle number deformation data (rm2).

In the present testing apparatus 1 having the controller 201 in Embodiment 1, it is detected that the deformation caused in the specimen (test piece 101) is changed between at the reference cycle number and at the detection cycle number by the comparison between the other (rm1) with the value (z×rm2) of the one (rm2) times a predetermined value z or the value of the one divided by the predetermined value.

In the present testing apparatus 1 having the controller 201 in Embodiment 1, the deformation test is stopped (Once the stop signal is received from the shape comparison part 269 in s535) in the case where the change detection means (shape comparison part 269) detects that the deformation caused in the specimen (test piece 101) is changed between at the reference cycle number and at the detection cycle number (it is judged that rm1 is not exceeding (z×rm2) in s617).

In the present testing apparatus 1 having the controller 201 in Embodiment 1, the image capturing means (camera 381) takes an image when a cycle progression that is a temporal progression in one deformation cycle (Here, a bending angle of the testing apparatus (an angle made by a plane to which the top surface 55a belongs and a plane to which the top surface 85a belongs) indicating the deformation of the specimen in the deformation cycle as a degree indicating how much the present situation proceeds in the deformation cycle is used) is a different shooting timing in the same or different cycle; the reference data storing means (image storage 271) stores the reference data (here, the reference captured image data) in association with the reference shoot cycle progression that is the cycle progression (the bending angle of the testing apparatus) at the shoot timing with respect to the reference data; there is provided the subject reference data reading means (here, image storage 271) that reads out from the reference data storing means (image storage 271) the reference data associated with the reference shoot cycle progression closest to or the same as the detection shoot cycle progression that is the cycle progression with respect to the detection captured image data; and the change detection means (shape comparison part 269) conducts the detection based on the reference cycle number deformation data (reference captured image data) based on the reference data read out by the subject reference data reading means (image storage 271 in s595).

In the present testing apparatus 1 having the controller 201 in Embodiment 1, there is provided the associated data creation means (image reception part 261) to create the associated data (image data with information created in s555) in which the captured image data taken by the image capturing means (camera 381) and the deformation operation information (operation information including the folding cycle number of the testing apparatus and the bending angle of the testing apparatus) at the shoot timing including the deformation cycle number and the cycle progression (bending angle of the testing apparatus) in the deformation test are associated, and the reference data storing means (image storage 271) stores the associated data (image data with information) in association with the cycle progression (bending angle of the testing apparatus) included in the associated data (image data with information) created by the associated data creation means (image reception part 261) as the reference shoot cycle progression.

In the present testing apparatus 1 having the controller 201 in Embodiment 1, the reference data storing means (image storage 271) stores as the reference data the associated data (image data with information) in the case where the deformation cycle number (folding cycle number of the testing apparatus) included in the associated data (image data with information) among the associated data (image data with information) created by the associated data creation means (image reception part 261) is the same as the reference cycle number.

In the present testing apparatus 1 having the controller 201 in Embodiment 1, the reference data storing means (image storage 271) stores the associated data (image data with information) as the normal data in the case where the deformation cycle number (folding cycle number of the testing apparatus) included in the associated data (image data with information) among the associated data (image data with information) created by the associated data creation means (image reception part 261) is different from the reference cycle number.

In the present testing apparatus 1 having the controller 201 in Embodiment 1, there is provided the data specifying information receiving means (Here, it comprises: an instruction input part 251 and a recording condition reception part 255) to receive the data specifying information (here, recording condition) indicating the cycle progression (bending angle of the testing apparatus) and the deformation cycle number of the associated data (image data with information) stored as the reference data and the normal data, and the reference data storing means (image storage 271) stores the associated data (image data with information) that matches the data specifying information (recording condition) received by the data specifying information receiving means (instruction input part 251 and recording condition reception part 255).

In the present testing apparatus 1 having the controller 201 in Embodiment 1, there are provided the captured image judgement means (testing apparatus controller 259 in s529) to judge whether the deformation cycle number and the cycle progression (bending angle of the testing apparatus) in the deformation test matches the data specifying information (recording condition), and the capturing order means (testing apparatus controller 259 in s531) to instruct the image capturing means (camera 381) to take an image in the case where the captured image judgement means (testing apparatus controller 259 in s529) judges that the deformation cycle number and the cycle progression (bending angle of the testing apparatus) in the deformation test matches the data specifying information (recording condition), and the reference data storing means (image storage 271) stores the associated data (image data with information) including the captured image data the image capturing means (camera 381) takes according to the instruction by the capturing order means (testing apparatus controller 259 in s531).

In the present testing apparatus 1 having the controller 201 in Embodiment 1, there is provided the judgment subject condition reception means (Here, it comprises: an instruction input part 251 and a comparison condition reception part 257) to receive the judgment subject condition (comparison condition) specifying the deformation cycle number and the cycle progression (bending angle of the testing apparatus) in which it is judged whether the deformation caused in the specimen (test piece 101) is changed, and it is judged whether the deformation caused in the specimen (test piece 101) is changed or not in the case where the associated data (image data with information) including the deformation operation information that matches the judgment subject condition received by the judgment subject condition reception means (instruction input part 251 and comparison condition reception part 257) is created, but it is not judged in the case where the associated data (image data with information) including the deformation operation information (operation information) that does not match the judgment subject condition (comparison condition).

In the present testing apparatus 1 having the controller 201 in Embodiment 1, it is judged whether the deformation operation information (operation information) included in the associated data (image data with information) matches the judgment subject condition (comparison condition) received by the judgment subject condition reception means (the instruction input part 251 and comparison condition reception part 257) or not; there is provided the necessity signal creating means (the image storage 271 in s591 and s593) creating the necessity signal (the comparison effectiveness signal) indicating whether to match or not; in accordance with the necessity signal (the comparison effectiveness signal) created by the necessity signal creating means (the image storage 271 in s591 and s593), it is determined that it is judged or not whether the deformation caused in the specimen (the test piece 101) is changed or not.

In the present testing apparatus 1 having the controller 201 in Embodiment 1, the necessity signal creating means (the image storage 271 in s591 and s593) transmits the necessity signal (the comparison effectiveness signal) to the change detection means (the shape comparison part 269), in accordance with the necessity signal (the comparison effectiveness signal) the change detection means (the shape comparison part 269) determines whether it is detected or not that the deformation caused in the specimen (the test piece 101) is changed or not.

In the present testing apparatus 1 having the controller 201 in Embodiment 1, if it is judged that the deformation operation information (operation information) included in the associated data (image data with information) does not match the judgment subject condition (the comparison condition) received by the judgment subject condition reception means (the instruction input part 251 and the comparison condition reception part 257), the detection cycle number deformation data calculating means (the present image shape recognition part 263, present image curvature radius calculation part, and the present image minimum curvature radius specifying part 267) does not calculate the detection cycle number deformation data (the minimum curvature radius specified in s573).

In the present testing apparatus 1 having the controller 201 in Embodiment 1, if it is judged that the deformation operation information (operation information) included in the associated data (image data with information) does not match the judgment subject condition (the comparison condition) received by the judgment subject condition reception means (the instruction input part 251 and the comparison condition reception part 257), the subject reference data reading means (the image storage 271 in s595) does not read out the reference data from the reference data storing means (the image storage 271).

In the present testing apparatus 1 having the controller 201 in Embodiment 1, the deformation cycle is to repeat the folding the specimen (the test piece 101) around the folding line (the intersection line with the main surface of the specimen (the test piece 101) and the plane P in FIG. 19 (a)) that is a virtual straight line passing through the specimen (the test piece 101), the shooting direction of the image capturing means (the camera 381) is approximately parallel to the folding line.

In the present testing apparatus 1 having the controller 201 in Embodiment 1, the specimen (the test piece 101) is in a film-like or sheet-like shape having main surfaces including the folding line.

In the present testing apparatus 1 having the controller 201 in Embodiment 1, there is provided the illuminating means (the lighting part 351) illuminating the specimen (the test piece 101) parallel to the folding line from the opposite side across the specimen (the test piece 101) from the image capturing means (the camera 381).

In the present testing apparatus 1 having the controller 201 in Embodiment 1, the first attachment plate (here, the other attachment plate 85) having: the first attachment face (here, the top surface 85*a*) to which the specimen (here, the test piece 101) is attached, and the first edge portion (the edge portion 85*ae*) that is the edge portion of the first attachment face (the top surface 85*a*) existing on the first line segment (the line segment on which the edge portion 85*ae* exists); the second attachment plate (here, the one attachment plate 55) having: the second attachment face (here, the top surface 55*a*) to which the specimen (the test piece 101) is attached, and the second edge portion (the edge portion 55*ae*) that is the edge portion of the second attachment face (the top surface 55*a*) existing on the second line segment (the line segment on which the edge portion 55*ae* exists); such that a gap across which the specimen (the test piece 101) is bridged is formed between the first edge portion (the edge portion 85*ae*) and the second edge portion (the edge portion 55*ae*); such that the first line segment and the second line segment are mutually parallel and keep the relative positions; such that the first attachment plate (the other attachment plate 85) is rotatably around the first line segment as the center relative to the second line segment; such that the second attachment plate (the one attachment plate 55) is rotatably around the second line segment as the center relative to the first line segment; the supporting means (Here, that comprises the guide rails 31*a*, 31*b*, the sliding parts 45*a*, 45*b*, the one support shaft part 43, the attachment parts 53*a*, 53*b*, the drive shaft 73, the attachment parts 83*a*, 83*b*, and the connecting members 94, 96); and the rotating means (Here, that comprises the driving part 61, the drive shaft 73, the blocks 97*a*, 97*b*, the blocks 98*a*, 98*b*, the connecting members 94, 96, the link shaft 92, the angle members 93, 95) to rotate the first attachment plate (the other attachment plate 85) around the first line segment as the center relative to the second line segment and to rotate the second attachment plate (the one attachment plate 55) around the second line segment as the center relative to the first line segment; such that the first attachment plate (the other attachment plate 85) is rotated around the first line segment as the center relative to the second line segment, and/or the second attachment plate (the one attachment plate 55) is rotated around the second line segment as the center relative to the first line segment, in the deformation test in which the portion of the specimen (the test piece 101) exists between the first edge portion (the edge portion 85ae) and the second edge portion (the edge portion 55ae), the absolute position of the subject area that is in a virtual rectangular having the first line segment and the second segment as two sides is changed; although the absolute position of the subject area is changed, the relative position of the subject area relative to the image capturing means (the camera 381) is approximately the same. Here, to be relative with respect to the second line segment/the first line segment may also signify the meaning of viewing from the second line segment/the first line segment.

In the present testing apparatus 1 having the controller 201 in Embodiment 1, the image capturing means (the camera 381) is attached (here indirectly) to the first edge portion (the edge portion 85ae) and/or the second edge portion (the edge portion 55ae), the absolute position of which is changed.

In the present testing apparatus 1 having the controller 201 in Embodiment 1, the first attachment plate (the other attachment plate 85) is directly or indirectly attached rotatably around the first straight line including the first line segment and the second attachment plate (the one attachment plate 55) is directly or indirectly attached rotatably around the second straight line including the second line segment to the supporting means (the guide rails 31a, 31b, the sliding parts 45a, 45b, the one support shaft 43, the attachment parts 53a, 53b, the drive shaft 73, the attachment parts 83a, 83b, the connecting members 94, 96), which has the both-edge position relation holding member (the connecting members 94, 96) to keep the distance constant between the first straight line and the second straight line; the image capturing means (the camera 381) is attached to the both-edge position relation holding member (the connecting members 94, 96) (Here, it is attached indirectly).

As a similar embodiment of Embodiment 1 mentioned above, the following is also described. In a deformation testing apparatus carrying out a plurality of deformation cycles with respect to the plate-like or film-like specimen, the apparatus comprises: one and the other attachment plate affixing both sides of the specimen across an unfixed deformation subject portion of the specimen; a driving part capable of driving the attachment plates such that the deformation subject portion is folded and unfolded by rotating the attachment plates in accordance with the deformation cycle; an image capturing device fixed so as to move together with the one and the other attachment plates such that the deformation subject portion is in a view thereof; a controller capable of controlling the driving part and the image capturing device, wherein the image capturing device shoots an image of a substantial side face of the deformation subject portion of the specimen from a direction perpendicular to the one direction; the controller comprises a processor (e.g., CPU), a storage device (e.g., RAM, ROM, SSD, HD, etc.), an interface to a peripheral device, and an input-output device, the processor transmits an instruction to start a deformation cycle to the driving device, compare an image shot by the image capturing device under a first condition with a reference image, judges whether both images are different more than a predetermined difference or not, and if it judges that both are different, it transmits a stop signal to cause the driving device to stop the deformation cycle. Here, the first predetermined condition may be a predetermined number of cycles, and more specifically, a predetermined cycle numbers and a predetermined state during FIG. 19, (a)→(b)→(c)→(b)→(a) (For example, the state in (b) of FIG. 19. The predetermined folding angle, etc.). And if the shooting is conducted based on deformation cycle information form the driving part or the deformation cycle instruction to the driving part, the shooting timing may be shifted (delayed or advanced) such that the adjustment may be conducted as appropriate. The reference image may be a substantial side face of the deformation subject portion of the specimen shot before the first predetermined condition or before the test. The substantial difference may be the minimum curvature radius obtained from the substantial side face of the deformation subject portion. The curvature radius may be obtained from an approximate formula obtained from the image captured data and may be obtained from the measured results after enough smoothing of the captured image data. It may be the minimum curvature radius for one portion in the range larger than the imaging resolution and may be obtained from a plurality of curvature radii including the minimum for a plurality of portions in the range larger than the imaging resolution.

Embodiment 2

The controller 201a of Embodiment 2 is explained. The controller 201a (the same as the controller 201 in FIG. 1), in the same way as the controller 201 of Embodiment 1, controls the testing apparatus main body 11 to conduct the folding test of the test piece 101 and analyzes the captured image data shot by the camera 381a (the same way as the camera 381 in FIG. 1).

The hardware configuration of the controller 201a in Embodiment 2 is the same as the controller 201 in Embodiment 1 as mentioned above such that the explanation is omitted here.

Figure 29:
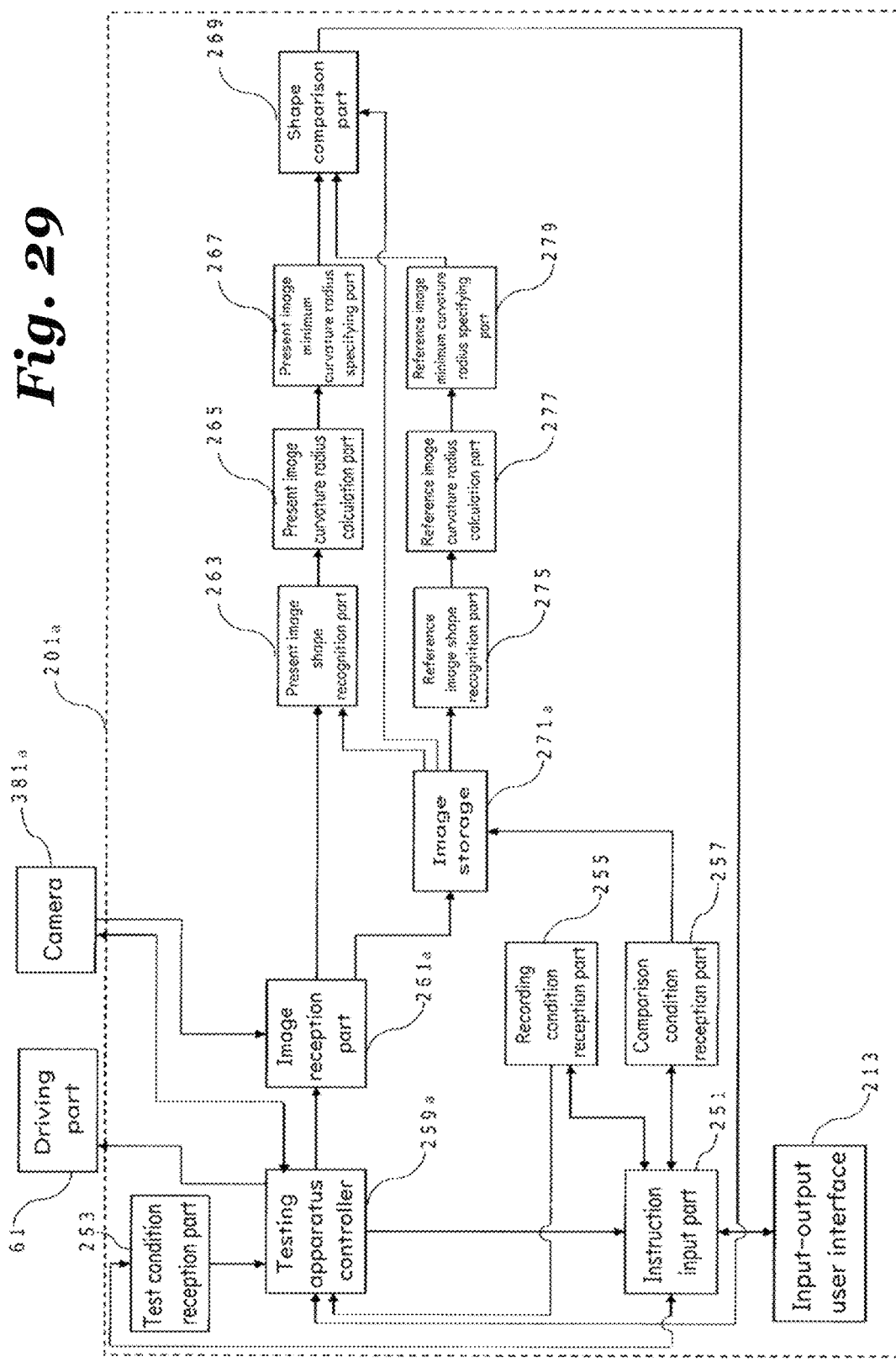
FIG. 29 shows a functional block diagram showing the controller of Embodiment 2.

FIG. 29 shows a functional block diagram of the controller 201a. The controller 201a comprises: functionally an instruction input part 251, a test condition reception part 253, a recording condition reception part 255, a comparison condition reception part 257, a testing apparatus controller 259a, an image reception part 261a, a present image shape recognition part 263, a present image curvature radius calculation part 265, a present image minimum curvature radius specifying part 267, a shape comparison part 269, an image storage 271a (that comprises RAM 210b and SSD 219), a reference image shape recognition part 275, a reference image curvature radius calculation part 277, and a reference image minimum curvature radius specifying part 279.

First, with respect to the controller 201 in Embodiment 1, the controller 201a also conducts the same operation as shown in FIG. 22. In the following, with reference to FIG. 22, a brief explanation about the controller 201a is also made (Refer to the above descriptions for details).

As shown in FIG. 22, when the present testing apparatus 1 is activated (START), the instruction input part 251 causes the input-output user interface 213 to display a screen to input test condition. On the screen for inputting the test condition, each item such as the upper limit of folding cycle number, the minimum folding angle, the maximum folding angle, the folding speed, the shooting image or not, and thickness of the test piece can be input. The user (not shown in the figure) of the testing apparatus 1 can input such test condition by operating the input-output user interface 213.

After s501, the instruction input part 251 judges whether the test condition (all items mentioned above) is input or not (s503), and the process returns to s503 again if it judges that it is not input (NO). If it judges that it is input (YES), the instruction input part 251 has the input test condition stored and judges whether shooting image or not (s505) and if it is judged that the shooting image is "affirmative" (YES), the instruction input part 251 causes the input-output user interface 213 to display the screen to input the recording condition (s507). If it is not judge that the shooting image is "affirmative" (NO), the process proceeds to s515 (The test condition is transmitted to the test condition reception part 253 and is stored by the test condition reception part 253).

In Embodiment 1 as mentioned above, the shooting images by the camera 381 is controlled in synchronization with the testing apparatus operation in accordance with the recording condition such that the shot images are all recorded and, as described later in Embodiment 2, the shooting images by the camera 381*a* is not synchronized with the testing apparatus operation, but it is conducted by the camera's own timing such that only the images that match the specified condition in the recording condition are recorded from all the shot images.

On the screen of the input-output user interface 213 displayed in s507, the minimum angle and the maximum angle in the range of bending angles of the testing apparatus, the folding cycle number to start storing (storing from which cycle number of folding cycle from the start of the folding cycle), and the folding cycle interval (to store every how many cycle numbers (period) after the folding cycle number for the first storing) of the images to be stored by the controller 201*a* among the images having shot at predetermined timings the camera 381 stores.

After s507, the instruction input part 251 judged whether the recording condition is input or not (s509), if it is judged that it is input (YES), the instruction input part 251 causes the input-output user interface 213 to display the screen on which the comparison condition is input (s511). If it is not judged that it is input in s509 (NO), the process returns to s509. On the screen of the input-output user interface displayed in s511, (a) the folding cycle number to indicate which folding cycle number (The number indicates how many times the folding cycles have been carried out from the beginning of the folding cycle) the image taken during operation is made to be the reference image, (b) the minimum folding angle and the maximum folding angle of the testing apparatus indicating the comparison timing of the reference image and the present image, and (c) the comparison period can be input. This (a) folding cycle number for the reference image is selected from folding cycle numbers to be recorded as determined based on "the folding cycle number to start storing" and "the interval number (period) of the folding cycles" having been input as recording condition. For example, if "the folding cycle number to start storing" is the 50th and "the interval number (period) of the folding cycles for storing" is 10 cycles, the folding cycle numbers for recordation are the 50th, the 60th, the 70th, the 80th, . . . such that any one of them (e.g. the 60th) can be specified as (a) the folding cycle number for the reference image. The minimum folding angle and the maximum folding angle of the testing apparatus (b) to indicate the comparison timing of the reference image and the present image specify the range within the range of bending angles of the testing apparatus having been input as the recording condition, and the comparison period (c) is the interval number of the folding cycles for the comparison and can be specified by the value of the folding cycle number for recordation having been input as the recording condition times a constant value.

After s511, the instruction input part 251 judges whether the comparison condition is input or not (s513) and if it judges that it is input (YES), the instruction input part 251 transmits each condition having been input so far (s515).

Concretely, the instruction input part 251 transmits the test condition to the test condition reception part 253 and has it stored and the recording condition is transmitted to the recording condition reception part 255 and stored therein, and the comparison condition is transmitted to the comparison condition reception part 257 and stored therein. If it is not judged that it is input in s513 (NO), the process returns to s513.

Figure 30:
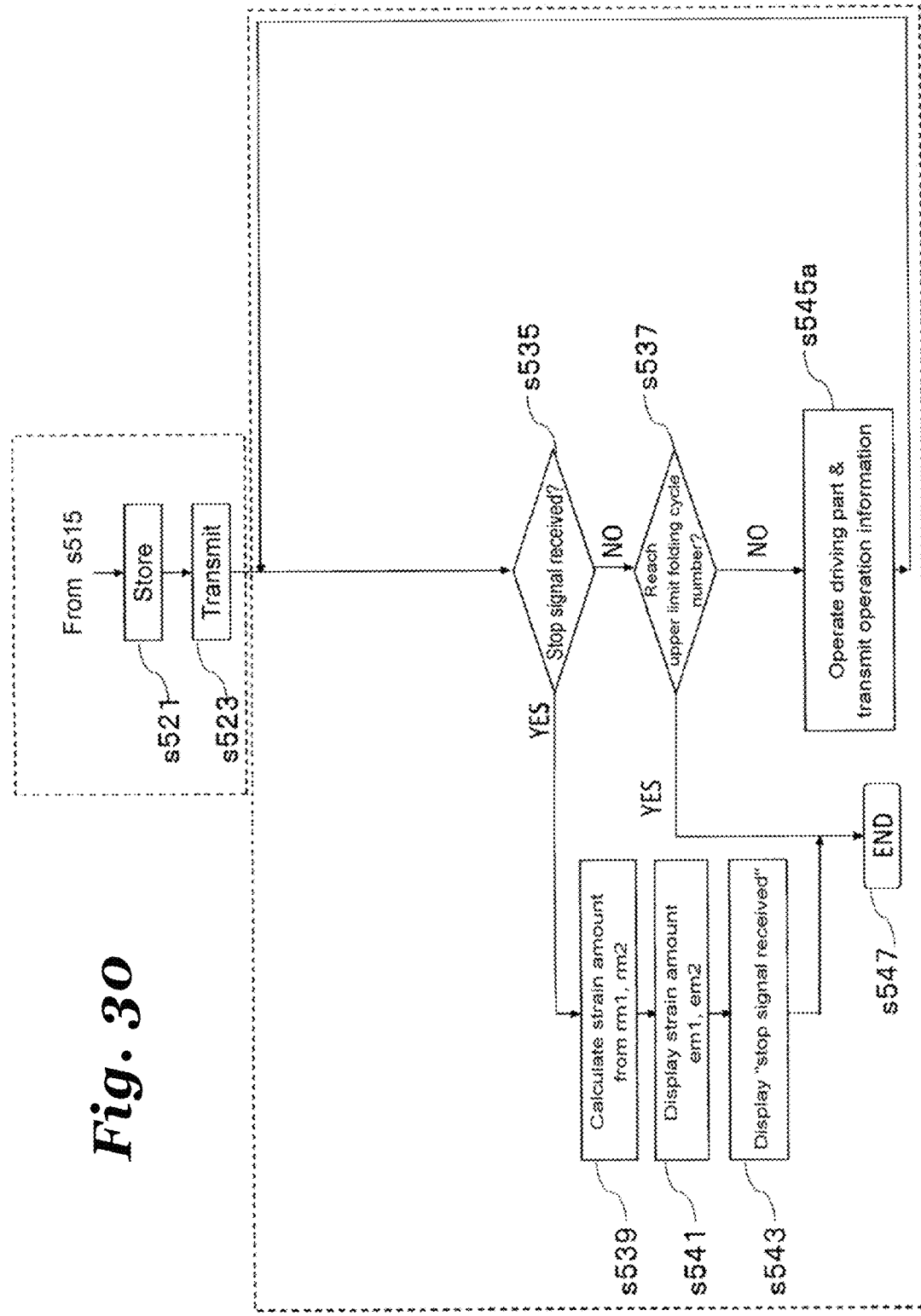
FIG. 30 shows a flowchart showing an operation of the controller of Embodiment 2.

As shown in FIG. 30, the test condition reception part 253 having received the test condition from the instruction input part 251 stores the thus-received test condition (s521) and transmits the test condition to the testing apparatus controller 259*a* (s523).

The testing apparatus controller 259*a* judges whether a stop signal (to be described later) is received from the shape comparison part 269 or not (s535), if it does not judge that the stop signal is received (NO), the testing apparatus controller 259*a* judges whether the total cycle number of the folding cycles of the testing apparatus (the cycle number of the folding cycles having been carried out from the start of the folding test) reaches the upper limit folding cycle number specified in the test condition or not (s537). If the testing apparatus controller 259*a* judges that the folding cycle number does not reach the upper limit folding number in s537 (NO), the testing apparatus controller 259*a* has the driving part 61 operate in accordance with the test condition transmitted from the test condition reception part 253 in s523 (The testing apparatus controller 259*a* has the driving part 61 operate to change the folding angle for image shooting. The testing apparatus controller 259 includes a motor driver) and transmits the operation information of the driving part 61 to the image reception part 261*a* (s545*a*. As mentioned above, here, the testing apparatus controller 259*a* has the driving part 61 operate to change the folding angle of the testing apparatus only by the folding angle for image shooting of the test condition such that the operation information is transmitted to the image reception part 261*a* at every change when the folding angle of the testing apparatus is changed by the folding angle for image shooting of the test condition). This operation information includes the folding cycle number of the testing apparatus (which cycle number of folding cycles is operating (for example, 1624 cycles) since the folding cycle test of the test piece 101 is started) and the bending angle of the testing apparatus. The testing apparatus controller 259*a* judges that the folding cycle number of the testing apparatus reaches the upper limit cycle number in s537 (YES), the testing apparatus is stopped (s547).

The testing apparatus controller 259*a* judges that the stop signal is received from the shape comparison part 269 in s535 (YES), the maximum strain amount em1 on the surface in the present image and the maximum strain amount em2 on the surface in the reference image are calculated by the formula 1 and the formula 2 from the minimum curvature radius rm1 in the present image transmitted from the shape comparison part 269 in association with the stop signal, the minimum curvature radius rm2 in the reference image, and the thickness h of the test piece (s539) (These rm1 and rm2 are described later).

The testing apparatus controller 259*a* instructs the instruct input part 251 to have the input-output user interface 213 display the thus-obtained em1 and em2, a phrase of "stop signal received", and the folding cycle number of the cycles having been carried out until the time and the input-output user interface 213 displays these in accordance with the instruction of s541 (s543). Then, the testing apparatus controller 259 have the driving part 61 stop the operation (s547).

Figure 31:
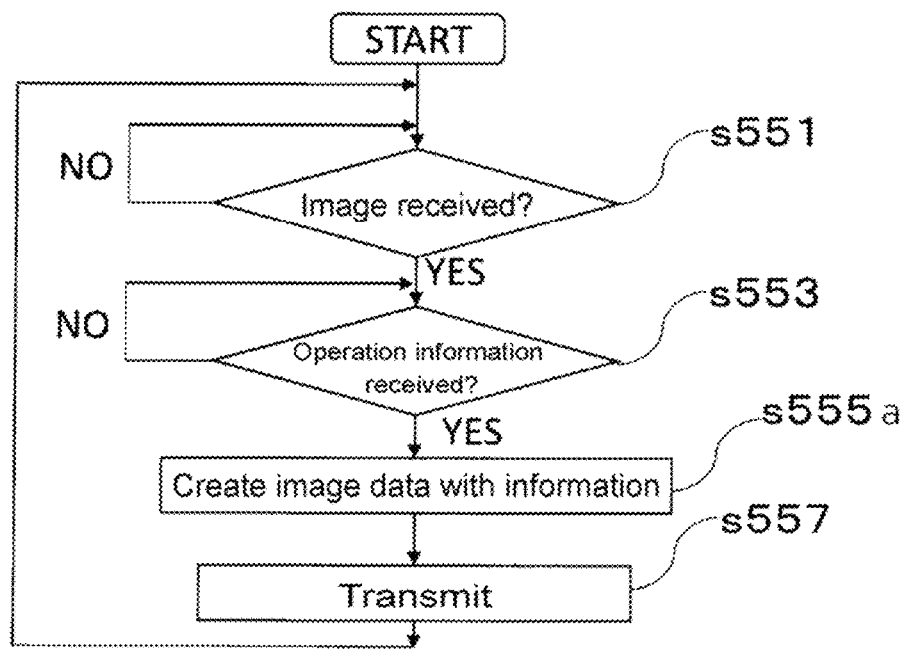
FIG. 31 shows a flowchart showing an operation of the controller of Embodiment 2.

On the other hand, the camera 381a shoots the test piece 101 during the folding test with the predetermined shooting period and the shot image data is transmitted to the image reception part 261a. The image reception part 261a, as shown in FIG. 31, judges whether the image data is received from the camera 381a or not (s551), and if it judges that the image data is received (YES), it judges whether the operation information transmitted from the testing apparatus controller 259a in s545a is received or not (s553). If it is judged that the operation information is received (YES), the image reception part 261a creates the image data with information associated with the image data from the camera 381a and the operation information (folding cycle number of the testing apparatus, bending angle of the testing apparatus) received from the testing apparatus controller 259a (s555a) and transmits the thus-created image data with information to the present image shape recognition part 263 and the image storage 271a in parallel (s557). After s557, the process returns to s551. If it is not judged that the image data is received in s551 (NO), the process returns to s551. If it is not judged that the operation information is received in s553, the process returns to s553.

The present image shape recognition part 263, as shown in FIG. 25, judges whether the image data with information is received from the image reception part 261a or not (s561), if it is judged that the image data with information is received (YES), it is judged whether the comparison effectiveness signal transmitted from the image storage 271a to be described later is "effective" or not (s563), and if it is judged that it is "effective" (YES), an equation and so on indicating the outer edge of the test piece 101 in the shot image included in the image data with information is derived (s565). The operation of s565 is the same as the above-mentioned Embodiment 1 such that detailed explanation is omitted.

If it is not judged that the image data with information is received in s561 (NO), the process returns to s561. If it is not judged that the comparison effectiveness signal is "effective" in s563 (NO), the process returns to s561.

The present image shape recognition part 263 having derived the equation and so on in s565 transmits the equation and so on to the present image curvature radius calculation part 265 (s567).

The present image curvature radius calculation part 265 having received the equation and so on transmitted from the present image shape recognition part 263 in s567, as shown in FIG. 25, seeks a curvature radius at a position on the equation and so on (s569). The operation in s569 is the same as the above-mentioned Embodiment 1, here, detailed explanation is omitted.

The present image curvature radius calculation part 265 transmits the thus-calculated curvature radius information in which y coordinate (y) and a curvature radius (r) at a position thereof are associated with each other such as (y1, r1), (y2, r2), (y3, r3), . . . (yn, rn) (here, n is a natural number) to the present image minimum curvature radius specifying part 267 (s571).

The present image minimum curvature radius specifying part 267 having received the curvature radius information transmitted from the present image curvature radius calculation part 26 in s571 specifies the smallest curvature radius r from the curvature radius information such as (y1, r1), (y2, r2), (y3, r3), . . . (yn, rn) (s573). And the present image minimum curvature radius specifying part 267 transmits (ym, rm) having the smallest curvature radius (here, m is a natural number), as the maximum strain is caused, to the shape comparison part 269 (s575). After s575, the process returns to s561.

Figure 32:
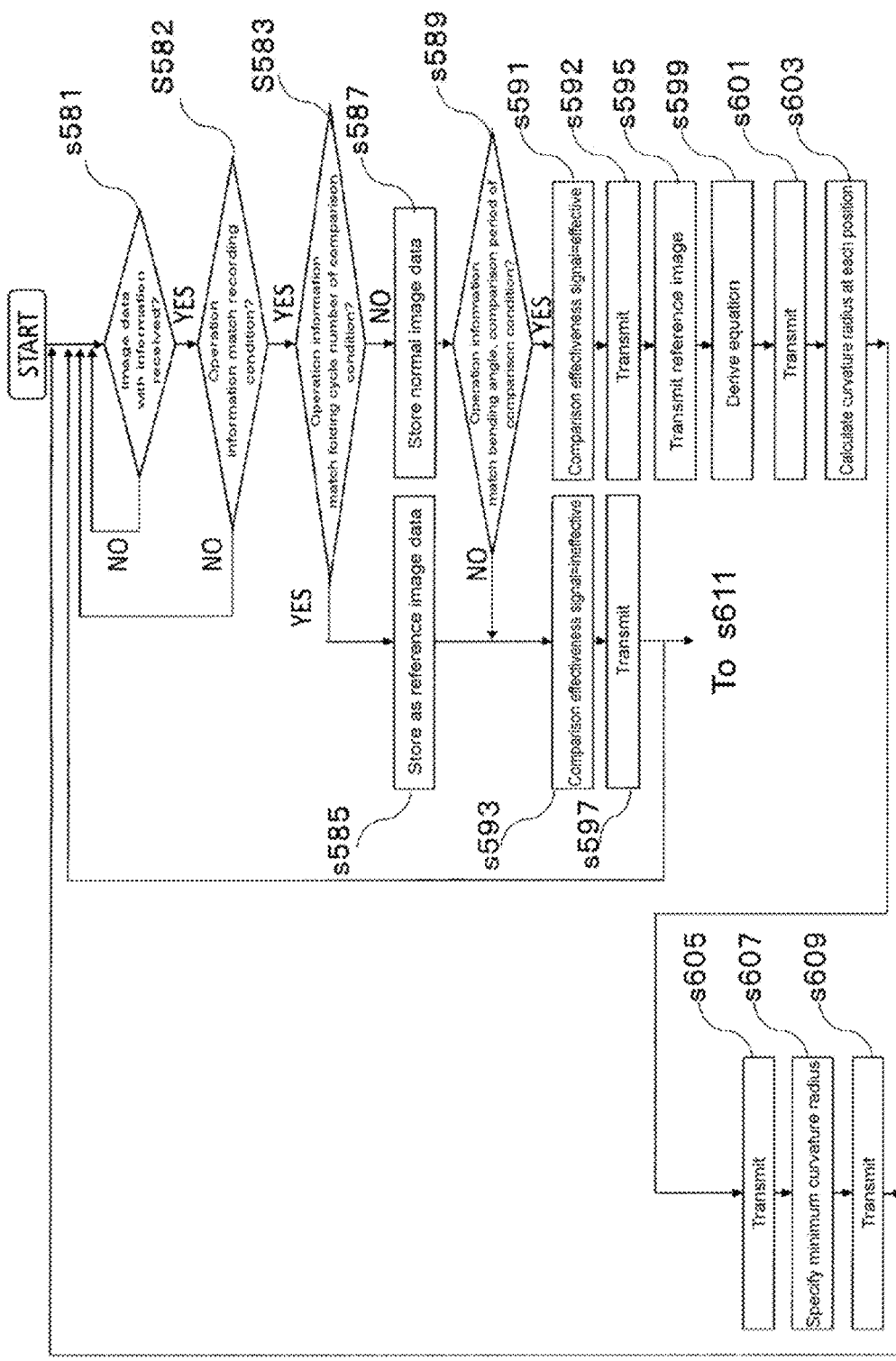
FIG. 32 shows a flowchart showing an operation of the controller of Embodiment 2.

On the other hand, the image storage 271a, as shown in FIG. 32, judges whether the image data with information transmitted from the image reception part 261a in s557 is received or not (s581), and if it is judged that the image data with information is received (YES), the recording condition (the minimum angle and maximum angle of the range of the bending angle of the testing apparatus of the image to be stored, the folding cycle number for starting storing, and the interval number (period) of folding cycles for storing) transmitted and stored by the recording condition reception part 255 from the instruction input part 251 in s515 is read out and obtained from the recording condition reception part 255, and it is judged whether the operation information included in the received image data with information (folding cycle number of the testing apparatus, bending angle of the testing apparatus) matches the recording condition read out and obtained from the recording condition reception part 255 or not (s582). In s582, it is judge whether the "folding cycle number of the testing apparatus" among the operation information included in the thus-received image data with information corresponds to the folding cycle number to be recorded that is determined based on the recording condition (for example, if the folding cycle number to start storing is the 50th and the interval number (period) of folding cycles for storing is 10 cycles, the folding cycle numbers for storing are the 50th, the 60th, the 70th, the 80th, . . . ) and the "bending angle of the testing apparatus" among the operation information is included in "the minimum angle and the maximum angle of the range of the bending angle of the testing apparatus of the image to be stored" of the recording condition or not. If it is judged that the operation information included in the image data with information matches the recording condition in s582 (YES), the image storage 271a judges, among the comparison condition ((a) a folding cycle number indicating how many folding cycle numbers having been performed during the test operation by the time when shooting the image to be made as the reference image; (b) minimum folding angle and maximum holding angle of the testing apparatus indicating the comparison timing of the reference image and the present image; and (c) a comparison period) transmitted from the instruction input part 251 to the comparison condition reception part 257 and stored therein, the information (the folding cycle number of the testing apparatus) indicating which number of folding cycles the image is shot matches the folding cycle number indicating (a) which cycle number of folding cycles the image is shot during operation as the reference image or not (s583), and if it is judged that both folding cycle numbers match with each other (YES), the image storage 271a stores the image data with information judged to be received in s581 as the reference image (s585) and the comparison effectiveness signal of "ineffective" is created (s593) and transmitted to the shape comparison part 269 and the present shape recognition part 263 in parallel (s597), and the process returns to s581.

If it is not judged that both folding cycle numbers match in s583 (NO), the image storage 271a stores the image data with information judged to be received in s581 as the normal image (s587). After s587, it is judged whether the operation information (folding cycle number of the testing apparatus, bending angle of the testing apparatus) included in the received image data with information matches the folding cycle number (for example, if (a) the folding cycle number indicating which number of folding cycles the image is shot in operation as the reference image is 60 cycles and (c) the comparison period is 10 cycles, the folding cycle numbers to be compared are 70 cycles (=60+10), 80 cycles, 90 cycles, 100 cycles, 110 cycles, . . . ) to be compared that is determined based on the comparison condition read out and obtained from the comparison condition reception part 257 and (b) the minimum folding angle and the maximum folding angel of the testing apparatus or not (s589), and if it is judged that it is included (YES), the comparison effectiveness signal of "effective" is created (s589) and transmitted to the shape comparison part 269 and the present image shape recognition part 263 in parallel (s592). If it is not judge that it is not included in s589 (NO), the process proceeds to s593.

After s592, the image storage 271*a* transmits the reference image data having the same folding angle as the folding angle included in the received image data with information among the reference image data stored by the image storage 271*a* itself to the reference image shape recognition part 275 (s595).

If it is not judged that the image data with information is received (NO), the process returns to s581.

The reference image shape recognition part 275 having received the reference image transmitted from the image storage 271*a* in s595 derives the equation indicating the outer edge of the test piece 101 included in the reference image data (s599). Here, the operation of s599 is the same as that of s556 as mentioned above, the explanation is omitted.

The reference image shape recognition part 275 having derived the equation in s599 transmits the equation to the reference image curvature radius calculation part 277 (s601). The transmitted equation is stored in the reference image curvature radius calculation part 277.

The reference image curvature radius calculation part 277 having received the equation transmitted from the reference image shape recognition part 275 in s601 calculates the curvature radius for the y coordinate in the predetermined range in the same way as the above-mentioned s569 (s603).

The reference image curvature radius calculation part 277 transmits the curvature radius information in which y coordinate (y) and the curvature radius (r) at the position thereof are associated with each other such as (y1, r1), (y2, r2), (y3, r3), . . . (yn, rn) (here, n is a natural number) to the reference image minimum curvature radius specifying part 279 (s605).

The reference image minimum curvature radius specifying part 279 having received the curvature radius information specifies the minimum value among the curvature radii calculated by the reference image curvature radius calculation part 277 in the same way as the case of the present image minimum curvature radius specifying part 267 in the above-mentioned s573 (s607).

The reference image minimum curvature radius specifying part 279 transmits the minimum curvature radius and the corresponding y coordinate specified in s607 to the shape comparison part 269 (s609). Then, after s609, the process returns to s581.

The shape comparison part 269, as shown in FIG. 28, judges whether the comparison effectiveness signal transmitted from the image storage 271*a* in s592 and s597 is "effective" or not (s611), if it is judged that the signal indicating "effective" (YES), it is judged whether (ym, rm) transmitted from the present image minimum curvature radius specifying part 267 in s575 is received or not (s613). If it is judged that (ym, rm) is received in s613 (YES), it is judged whether the reference image minimum curvature radius information (ym, rm) transmitted from the reference image minimum curvature radius specifying part 279 in s609 is received or not (s615), and if it is judged that the reference image minimum curvature radius information (ym, rm) is received (YES), the process proceeds to s617. In the following, to make the explanation easier, (ym, rm) transmitted from the present image minimum curvature radius specifying part 267 in s575 is referred to as (ym1, rm1) and (ym, rm) transmitted from the reference image minimum curvature radius specifying part 279 in s609 is referred to as 'ym2, rm2). It is judged whether rm1 is not exceeding rm2 times a predetermined multiplying factor or not in s617. Concretely, it is judged whether rm1 is not exceeding the value (z×rm2) of the predetermined multiplying factor z times rm2 or not. Here, z is set in the same way as the above-mentioned Embodiment 1, here, detailed explanation is omitted.

If it is judged that rm1 is not exceeding (z×rm2) in s617, the shape comparison part 269 transmits (ym1, rm1) and (ym2, rm2) and the stop signal as they are associated with each other (s619). The testing apparatus controller 259*a* having received the stop signal transmitted from the shape comparison part 269 in s619, as mentioned above, calculates the maximum strain amount em1 on the surface in the present image and the maximum strain amount em2 on the surface in the reference image by the above-mentioned formula 1 and the formula 2 from the minimum curvature radius rm1 in the present image, the minimum curvature radius rm2 in the reference image, and the thickness of the test piece (s539), and instructs the instruction input part 251 to cause the input-output user interface 213 to display the thus-obtained em1 and em2, the phrase of "stop signal received", and the folding cycle number up to this time (s541), and the input-output user interface 213 displays these upon the instruction in s541 (s543). Then, the testing apparatus controller 259 stops the operation of the driving part 61 (s547).

If it is not judged that the comparison effectiveness signal indicates "effective" (NO), the process returns to s611. If it is not judged that (ym, rm) is received in s613, the process returns to s613. If it is not judged that (ym, rm) is received in s615, the process returns to s615. If it is not judged that rem1 is not exceeding (z×rm2) in s617, the process returns to s611.

As explained above, the present testing apparatus 1 having the controller 201*a* in Embodiment 2 comprises a deformation testing apparatus that performs the deformation test in which a plurality of deformation cycles (for example, FIG. 19 (a)→(b)→(c)→(b)→(a)) are carried out such that the same deformation is supposed to be caused in the specimen (here, test piece 101) for each cycle and detects that the deformation caused in the specimen (test piece 101) varies with an increase of the carrying number of deformation cycles, the deformation testing apparatus comprises: image capturing means (here, camera 381*a*) capable of creating image data by shooting the specimen (test piece); reference data storing means (here, image storage 271*a*) capable of storing reference data (here, reference image data) that is reference cycle number deformation data showing a deformation state of the specimen (test piece 101) at a reference cycle number calculated based on reference captured image data or reference captured image data of the specimen (test piece 101) shot by the image capturing means (camera 381*a*) at the reference cycle number ((a) the folding cycle number (input as the comparison condition) indicating which number of folding cycles the image is shot in operation as the reference image) of a cycle number of times a deformation cycle is performed as a reference deformation caused in the specimen (test piece 101); reference cycle number deformation data calculating means (here, the reference image shape recognition part 275, the reference image curvature radius calculation part 277, and the reference image minimum curvature radius specifying part 279) capable of calculating reference cycle number deformation data (here, the minimum curvature radius specified in s607) based on the reference captured image data; detection cycle number deformation data calculating means (here, the present image shape recognition part 263, the present image curvature radius calculation part 265, and the present image minimum curvature radius specifying part 267) capable of calculating detection cycle number deformation data (the minimum curvature radius specified in s573) showing a deformation state of the specimen (test piece 101) at a detection cycle number based on detection captured image data (present image) of the specimen (test piece 101) shot at the detection cycle number of a cycle number of times the deformation cycle is performed, which is greater than the reference cycle number; and change detection means (here, shape comparison part 269) capable of detecting a change between deformations caused in the specimen (test piece 101) at the reference cycle number and the detection cycle number based on the reference cycle number deformation data and the detection cycle number deformation data.

In the present testing apparatus 1 having the controller 201a in Embodiment 2, the reference cycle number deformation data calculating means (the reference image shape recognition part 275, the reference image curvature radius calculation part 277, and the reference image minimum curvature radius specifying part 279) comprises: the reference formula deriving means (the reference image shape recognition part 275) capable of deriving a reference formula (an equation derived in s599) of a formula indicating the shape of the specimen (test piece 101) base on the reference captured image data; and the reference-deformation-degree calculating means (the reference image curvature radius calculation part 277) capable of calculating the reference deformation degree ((y1, r1), (y2, r2), (y3, r3), . . . (yn, rn) as mentioned above) indicating the deformation degree in at least two or more portions of the specimen (test piece 101) based on the reference formula derived by the reference formula deriving means (the reference image shape recognition part 277).

In the present testing apparatus 1 having the controller 201a in Embodiment 2, the detection cycle number deformation data calculating means (the present image shape recognition part 263, the present image curvature radius calculation part 265, and the present image minimum curvature radius specifying part 267) comprises: the detection formula deriving means (the present image shape recognition part 263) capable of deriving the detection formula (the equation derived in s565) of the formula indicating the shape of the specimen (test piece 101) based on the detection captured image data (present image); the detection-deformation-degree calculating means (the present image curvature radius calculation part 265) capable of calculating the detection deformation degree ((y1, r1), (y2, r2), (y3, r3), . . . (yn, rn) as mentioned above) indicating the deformation degree in at least two or more portions of the specimen (test piece 101) based on the detection formula derived by the detection formula deriving means (the present image shape recognition part 263); and the detection-deformation-degree selecting means (the present image minimum curvature radius specifying part 267) capable of selecting as the detection cycle number deformation data what is judged to be the largest deformation degree among at least two or more reference deformation degrees calculated by the reference-deformation-degree calculating means (the present image curvature radius calculation part 265) as the reference cycle number deformation data.

In the present testing apparatus 1 having the controller 201a in Embodiment 2, the detection cycle number deformation data (rm1) and the reference cycle number deformation data (rm2) comprise a curvature radius indicating the shape of the specimen (test piece 101).

In the present testing apparatus 1 having the controller 201a in Embodiment 2, the change detection means (the shape comparison part 269) comprises: one that detects the deformation caused in the specimen (test piece 101) is changed between at the reference cycle number and at the detection cycle number from the rate of change that is the rate (rm1/rm2) of one (rm2) and the other (rm1) of the detection cycle number deformation data (rm1) and the reference cycle number deformation data (rm2).

In the present testing apparatus 1 having the controller 201a in Embodiment 2, it is detected that the deformation caused in the specimen (test piece 101) is changed between at the reference cycle number and the detection cycle number depending on which is bigger; the other (rm1) or the value (z×rm2) of the one (rm2) times the predetermined value z or the value of the one (rm2) divided by the predetermined value.

In the present testing apparatus 1 having the controller 201a in Embodiment 2, if the change detection means (the shape comparison part 269) detects that the deformation caused in the specimen (test piece 101) is changed between at the reference cycle number and at the detection cycle number (in the case where it is judged that rm1 is not exceeding (z×rm2) in s617 (YES)), the deformation test is stopped (If the stop signal from the shape comparison part 269 is received in s535, the process proceeds via s539, s541, s543 and to s547.)

In the present testing apparatus 1 having the controller 201a in Embodiment 2, the image capturing means (camera 381a) takes the image when the cycle progression that is the temporal progression in one deformation cycle (Here, the bending angle of the testing apparatus (an angle made by a plane to which the top surface 55a belongs and a plane to which the top surface 85a belongs) indicating the deformation of the specimen in the deformation cycle as the degree indicating how much the present situation proceeds in the deformation cycle is used) is a different shooting timing in the same or different cycle; the reference data storing means (the image storage 271) stores the reference data (here, the reference captured image data) in association with the reference shoot cycle progression that is the cycle progression (the bending angle of the testing apparatus) at the shoot timing with respect to the reference data; there is provided the subject reference data reading means (here, the image storage 271a in s595) that reads out from the reference data storing means (image storage 271) the reference data associated with the reference shoot cycle progression closest to or the same as the detection shoot cycle progression that is the cycle progression with respect to the detection captured image data; and the change detection means (the shape comparison part 269) conducts the detection based on the reference cycle number deformation data (the reference captured image data) based on the reference data read out by the subject reference data reading means (the image storage 271a in s595).

In the present testing apparatus 1 having the controller 201a in Embodiment 2, there is provided the associated data creation means (the image reception part 261a) capable of creating the associated data (the image data with information created in s555a) in which the captured image data shot by the image capturing means (the camera 381a) and the deformation operation information (the operation information including the folding cycle number of the testing apparatus and the bending angle of the testing apparatus) at the shoot timing including the deformation cycle number and the cycle progression (the bending angle of the testing apparatus) in the deformation test are associated with each other; and the reference data storing means (the image storage 271a) stores the associated data (the image data with information) including the cycle progression (the bending angle of the testing apparatus) as the reference shoot cycle progression, the associated data (the image data with information) being created by the associated data creation means (the image reception part 261a).

In the present testing apparatus 1 having the controller 201a in Embodiment 2, the reference data storing means (the image storage 271) stores the associated data (the image data with information) as the reference data in the case where, among the associated data (the image data with information) created by the associated data creation means (the image reception part 261a), the deformation cycle number (the folding cycle number) included in the associated data (the image data with information) is the same as the reference cycle number.

In the present testing apparatus 1 having the controller 201a in Embodiment 2, the reference data storing means (the image storage 271) stores the associated data (the image data with information) as the normal data in the case where, among the associated data (the image data with information) created by the associated data creation means (the image reception part 261a), the deformation cycle number (the folding cycle number) included in the associated data (the image data with information) is different from the reference cycle number.

In the present testing apparatus 1 having the controller 201a in Embodiment 2, there is provided the data specifying information receiving means (Here, that comprises the instruction input part 251 and the recording condition reception part 255) receiving the data specifying information (here, the recording condition) indicating the deformation cycle number and the cycle progression (the bending angle of the testing apparatus) of the associated data (the image data with information) stored as the normal data and the reference data; and the reference data storing means (the image storage 271a) stores the associated data (image data with information) that matches the data specifying information (the recording condition) received by the data specifying information receiving means (the instruction input part 251 and the recording condition reception part 255).

In the present testing apparatus 1 having the controller 201a in Embodiment 2, there is provided the memorization necessity judgement means (the image storage 271a in s582) that judges whether the deformation operation information (the operation information) included in the associated data (the image data with information) matches the data specifying information (the recording condition); and the reference data storing means (the image storage 271a) stores the associated data in the case where the memorization necessity judgement means (the image storage 271a in s582) judges that the deformation operation information (the operation information) matches the data specifying information (the recording condition).

In the present testing apparatus 1 having the controller 201a in Embodiment 2, there is provided the judgment subject condition reception means (Here, that comprises the instruction input part 251 and the comparison condition reception part 257) that receives the judgment subject condition (the comparison condition) that specifies the deformation cycle number and the cycle progression (the bending angle of the testing apparatus) that judges whether the deformation caused in the specimen (the test piece 101) is changed or not; and it is judged that the deformation caused in the specimen (the test piece 101) is changed or not in the case where the associated data (the image data with information) including the deformation operation information (the operation information) that matches the judgment subject condition (the comparison condition) received by the judgment subject condition reception means (the instruction input part 251 and the comparison condition reception part 257) is created; but it is not judged in the case where the associated data (the image data with information) including the deformation operation information (the operation information) that does not match the judgment subject condition (the comparison condition).

In the present testing apparatus 1 having the controller 201a in Embodiment 2, it is judged whether the deformation operation information (the operation information) included in the associated data (the image data with information) matches the judgment subject condition (the comparison condition) received by the judgment subject condition reception means (the instruction input part 251 and the comparison condition reception part 257) or not; and there is provided the necessity signal creating means (the image storage 271a in s591 and s593) creating the necessity signal (the comparison effectiveness signal) indicating whether to match or not; and it is determined whether it is judged or not whether the change caused in the specimen (the test piece 101) is changed or not in accordance with the necessity signal (the comparison effectiveness signal) created by the necessity signal creating means (the image storage 271a in s591 and s593).

In the present testing apparatus 1 having the controller 201a in Embodiment 2, the necessity signal creating means (the image storage 271a in s591 and s593) transmits the necessity signal (the comparison effectiveness signal) to the change detection means (the shape comparison part 269); and the change detection means (the shape comparison part 269) determines whether it is detected or not that the deformation caused in the specimen (the test piece 101) is changed or not in accordance with the necessity signal (the comparison effectiveness signal).

In the present testing apparatus 1 having the controller 201a in Embodiment 2, the detection cycle number deformation data calculating means (the present image shape recognition part 263, the present image curvature radius calculation part 265, and the present image minimum curvature radius specifying part 267) does not calculate the detection cycle number deformation data (the minimum curvature radius specified in s573) in the case where the deformation operation information (the operation information) included in the associated data (the image data with information) does not match the judgment subject condition (the comparison condition) received by the judgment subject condition reception means (the instruction input part 251 and the comparison condition reception part 257).

In the present testing apparatus 1 having the controller 201a in Embodiment 2, the subject reference data reading means (the image storage 271a in s595) does not read out the reference data from the reference data storing means (the image storage 271a) in the case where the deformation operation information (the operation information) included in the associated data (the image data with information) does not match the judgment subject condition (the comparison condition) received by the judgment subject condition reception means (the instruction input part 251 and the comparison condition reception part 257).

In the present testing apparatus 1 having the controller 201*a* in Embodiment 2, the deformation cycle is to repeat folding the specimen (the test piece 101) around the folding line (the line of intersection of the main surface of the specimen (the test piece 101) and the plane P in FIG. 19(*a*)) that is a virtual straight line passing through the specimen (the test piece 101); and the shooting direction of the image capturing means (camera 381*a*) is approximately parallel to the folding line.

In the present testing apparatus 1 having the controller 201*a* in Embodiment 2, the specimen (the test piece 101) is in a film-like or sheet-like shape having a main surface including the folding line.

In the present testing apparatus 1 having the controller 201*a* in Embodiment 2, there is provided the illuminating means (the illumination part 351) illuminates the specimen (the test piece 101) in parallel to the folding line in the opposite direction across the specimen (the test piece 101) from the image capturing means (the camera 381).

In the present testing apparatus 1 having the controller 201*a* in Embodiment 2, the testing apparatus comprises: the first attachment plate (here, the other attachment plate 85) having: the first attachment face (here, the top surface 85*a*) to which the specimen (here, the test piece 101) is attached, and the first edge portion (the edge portion 85*ae*) that is the edge portion of the first attachment face (the top surface 85*a*) existing on the first line segment (the line segment on which the edge portion 85*ae* exists); the second attachment plate (here, the one attachment plate 55) having: the second attachment face (here, the top surface 55*a*) to which the specimen (the test piece 101) is attached, and the second edge portion (the edge portion 55*ae*) that is the edge portion of the second attachment face (the top surface 55*a*) existing on the second line segment (the line segment on which the edge portion 55*ae* exists); such that a gap across which the specimen (the test piece 101) is bridged is formed between the first edge portion (the edge portion 85*ae*) and the second edge portion (the edge portion 55*ae*); such that the first line segment and the second line segment are mutually parallel and keep the relative positions; such that the first attachment plate (the other attachment plate 85) is rotatably around the first line segment as the center relative to the second line segment; such that the second attachment plate (the one attachment plate 55) is rotatably around the second line segment as the center relative to the first line segment; the supporting means (Here, that comprises the guide rails 31*a*, 31*b*, the sliding parts 45*a*, 45*b*, the one support shaft part 43, the attachment parts 53*a*, 53*b*, the drive shaft 73, the attachment parts 83*a*, 83*b*, and the connecting members 94, 96); and the rotating means (Here, that comprises the driving part 61, the drive shaft 73, the blocks 97*a*, 97*b*, the blocks 98*a*, 98*b*, the connecting members 94, 96, the link shaft 92, the angle members 93, 95) to rotate the first attachment plate (the other attachment plate 85) around the first line segment as the center relative to the second line segment and to rotate the second attachment plate (the one attachment plate 55) around the second line segment as the center relative to the first line segment; such that the first attachment plate (the other attachment plate 85) is rotated around the first line segment as the center relative to the second line segment, and/or the second attachment plate (the one attachment plate 55) is rotated around the second line segment as the center relative to the first line segment, in the deformation test in which the portion of the specimen (the test piece 101) exists between the first edge portion (the edge portion 85*ae*) and the second edge portion (the edge portion 55*ae*), the absolute position of the subject area that is in a virtual rectangular having the first line segment and the second segment as two sides is changed; although the absolute position of the subject area is changed, the relative position of the subject area relative to the image capturing means (the camera 381) is approximately the same.

In the present testing apparatus 1 having the controller 201*a* in Embodiment 2, the image capturing means (the camera 381*a*) is attached (Here, it is attached indirectly) to the first edge portion (the edge portion 85*ae*) and/or the second edge portion (the edge portion 55*ae*), the absolute position of which is changed.

In the present testing apparatus 1 having the controller 201*a* in Embodiment 2, the first attachment plate (the other attachment plate 85) is directly or indirectly attached rotatably around the first straight line including the first line segment and the second attachment plate (the one attachment plate 55) is directly or indirectly attached rotatably around the second straight line including the second line segment to the supporting means (the guide rails 31*a*, 31*b*, the sliding parts 45*a*, 45*b*, the one support shaft 43, the attachment parts 53*a*, 53*b*, the drive shaft 73, the attachment parts 83*a*, 83*b*, the connecting members 94, 96), which has the both-edge position relation holding member (the connecting members 94, 96) to keep the distance constant between the first straight line and the second straight line; the image capturing means (the camera 381) is attached to the both-edge position relation holding member (the connecting members 94, 96) (Here, it is attached indirectly).

Figure 33:
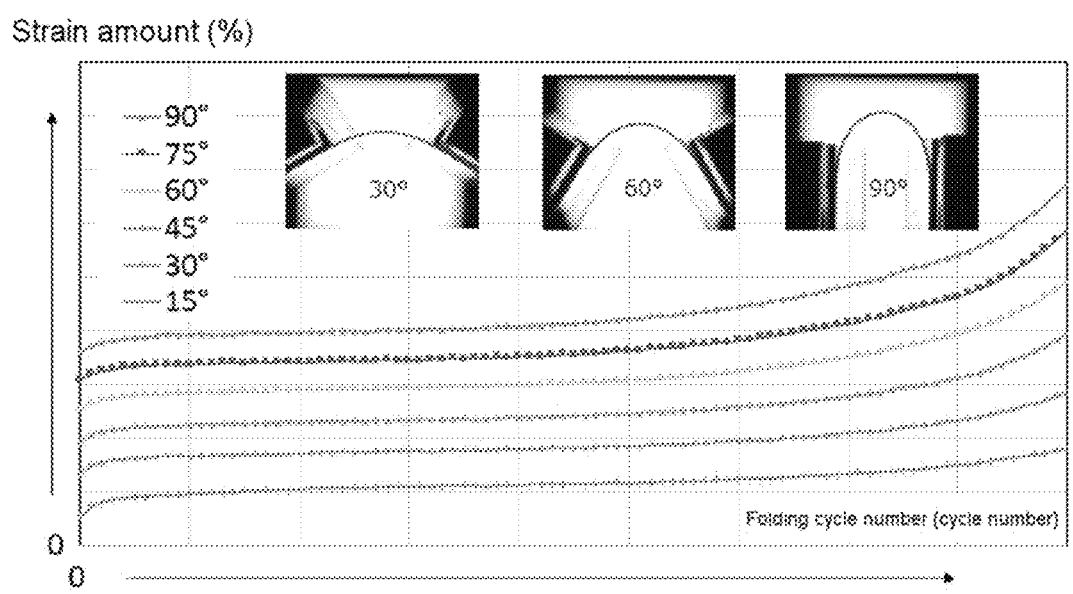
FIG. 33 shows a graph showing a result example in the case where a test was carried out by the present testing apparatus.

FIG. 33 shows a graph illustrating a result of one experiment. In the graph, the folding cycle number is taken in the horizontal axis and the maximum strain amount on the surface is taken in the vertical axis. And the results are plotted every 15 degrees, 30 degrees, 45 degrees, 60 degree, 75 degrees, and 90 degrees of the folding angle. As shown in the graph, when the folding angle is large, the maximum strain amount on the surface tends to be large (The curvature radius at the folding angle is small. Refer to three diagrams inserted in the graph). And as the folding cycle number increases, the maximum strain amount on the surface increases. Further, with an increase of the folding cycle number, it looks like that the degree of the change in the maximum strain amount on the surface become larger (the inclination of the maximum strain amount on the surface against the folding cycle number). In particular, at the folding angle of 90 degrees, the degree of the change of the maximum strain amount on the surface becomes significantly large when the folding cycle number exceeds some value. In general, since it is considered that the curvature radius depends on the physical properties of the sample, the change of the curvature radius may suggest the change of the properties. Therefore, it is possible to signify the sign of some kind of damages such that the test by the present testing apparatus could detect some kind of damages beforehand.

EXPLANATION OF NUMERALS

| | | |
|---|---|---|
| 1 present testing apparatus | 3 first part member | |
| 11 testing apparatus main body | 21 frame part | |
| 23 top plate part | 23a top surface | |
| 25 rod-like component | 31a, 31b guide rail | |
| 41 one support shaft part | 43 one support shaft | |
| 45a, 45b sliding part | 51 one test piece | |
| 51a, 53b attachment part | 55 one attachment plate | |
| 55a top surface | 55ae edge portion | |
| 61 driving part | 73 driving shaft | |
| 81 the other specimen attachment part | | |
| 83a, 83b attachment part | 85 the other attachment plate | |
| 85a top surface | 85ae edge portion | 91 link member |
| 92 like shaft | 93, 95 angle member | |
| 94, 96 connecting member | 97a, 97b, 98a, 98b block | |
| 101 test piece | 101c outer edge | 101d curve line |
| 101f inner edge | 101g curve line | |
| 201, 201a controller | 210a CPU | 210b RAM |
| 210c ROM | 210d interface | |
| 213 input-output user interface | 219 SSD | |
| 251 instruction input part | | |
| 253 test condition reception part | | |
| 255 recording condition reception part | | |
| 257 comparison condition reception part | | |
| 259, 259a recording condition reception part | | |
| 261, 261a image reception part | | |
| 263 present image shape recognition part | | |
| 265 present image curvature radius calculation part | | |
| 267 present image minimum curvature radius specifying part | | |
| 269 shape comparison part | 271, 271a image storage | |
| 275 reference image shape recognition part | | |
| 277 reference image curvature radius calculation part | | |
| 279 reference image minimum curvature radius specifying part | | |
| 301 shooting part | 311 supporting part | |
| 321 first column | 322 second column | |
| 323 attachment member | 323h attachment slit | |
| 341 lighting support | 342 first part member | |
| 343 second part member | 351 lighting part | |
| 361 camera support | 362 first part | 363 second part |
| 364 third part | 365 fourth part | 381 camera |

What is claimed is:

1. A deformation testing apparatus in which a plurality of deformation cycles are carried out such that a same deformation is supposed to be caused in a specimen for each cycle and a deformation caused in the specimen varies as a number of deformation cycles having been carried out is increased, the deformation testing apparatus comprising: image capturing means capable of creating captured image data by shooting the specimen; reference data storing means capable of storing reference data that is reference cycle number deformation data showing a deformation state of the specimen at a reference cycle number calculated based on reference captured image data or reference captured image data of the specimen shot by the image capturing means at the reference cycle number of a cycle number of times a deformation cycle is performed as a reference deformation caused in the specimen;

reference cycle number deformation data calculating means capable of calculating reference cycle number deformation data based on the reference captured image data; detection cycle number deformation data calculating means capable of calculating detection cycle number deformation data showing a deformation state of the specimen at a detection cycle number based on detection captured image data of the specimen shot at the detection cycle number of a cycle number of times the deformation cycle is performed, which is greater than the reference cycle number; and change detection means capable of detecting a change between deformations caused in the specimen at the reference cycle number and the detection cycle number based on the reference cycle number deformation data and the detection cycle number deformation data, wherein the reference cycle number deformation data calculating means comprises: reference formula deriving means capable of deriving a reference formula of a formula expressing a shape of the specimen based on the reference captured image data;

reference-deformation-degree calculating means capable of calculating a reference deformation degree showing a deformation degree in at least two or more portions of the specimen based on the reference formula derived by the reference formula deriving means; and reference-deformation-degree selecting means capable of selecting what is judged to be a largest deformation degree among at least two or more reference deformation degrees calculated by the reference-deformation-degree calculating means as the reference cycle number deformation data.

2. The deformation testing apparatus according to claim 1 wherein the detection cycle number deformation data calculating means comprises:

detection formula deriving means capable of deriving a detection formula of a formula showing a shape of the specimen based on the detection captured image data;

detection-deformation-degree calculating means capable of calculating a detection deformation degree showing deformation degrees of at least two or more portions of the specimen based on the detection formula derived by the detection formula deriving means;

and detection-deformation-degree selecting means capable of selecting one judged to have a largest deformation degree among at least two or more detection deformation degrees calculated by the detection-deformation-degree calculating means.

3. The deformation testing apparatus according to claim 1 wherein the detection cycle number deformation data and the reference cycle number deformation data comprise a curvature or a radius of curvature showing a shape of the specimen.

4. The deformation testing apparatus according to claim 1 wherein the change detection means comprises: one that detects a deformation caused in the specimen is changed between at the reference cycle number and at the detection cycle number from a rate of change that is a rate of one and the other among the detection cycle number deformation data and the reference cycle number deformation data.

5. The deformation testing apparatus according to claim 4 wherein deformations caused in the specimen are detected to be changed between at the reference cycle number and at the detection cycle number by comparing a value obtained from a product of the one times a predetermined value or from a quotient of the one divided by a predetermined value with a value of the other depending on which is smaller or larger.

6. The deformation testing apparatus according to claim 1 wherein the change detection means detects a deformation caused in the specimen is changed between at the reference cycle number and at the detection cycle number and stops a deformation test.

7. The deformation testing apparatus according to claim 1 wherein:
the image capturing means is one that takes an image of the specimen at a different shoot timing in a same cycle or in a different cycle along a cycle progression as a temporal progression in one deformation cycle;
the reference data storing means is capable of storing the reference data in association with a reference shoot cycle progression that is a cycle progression of shoot timing with respect to the reference data;
the apparatus comprises: subject reference data reading means capable of reading the reference data from the reference data storing means, the reference data being associated with the reference shoot cycle progression which is a same as or closest to a detection shoot cycle progression of a cycle progression of shooting with respect to the detection captured image data; and the change detection means is capable of conducting detection based on reference cycle number deformation data based on the reference data read out by the subject reference data reading means.

8. The deformation testing apparatus according to claim 7 wherein the image capturing means comprises: associated data creation means capable of creating associated data in which the captured image data that the image capturing means takes and deformation operation information with respect to the shoot timing including a deformation cycle number and the cycle progression in a deformation test are associated with each other; and the reference data storing means stores the associated data in which the cycle progression included in the associated data created by the associated data creation means is taken as the reference shoot cycle progression.

9. The deformation testing apparatus according to claim 8 wherein the reference data storing means stores the associated data as the reference data, in a case where the deformation cycle number included in the associated data is same as a reference cycle number, among the associated data created by the associated data creation means; and stores the associated data as normal data in a case where the deformation cycle number included in the associated data is different from the reference cycle number.

10. The deformation testing apparatus according to claim 1, comprising: data specifying information receiving means capable of receiving data specifying information showing the deformation cycle number and the cycle progression of the associated data stored as the normal data and the reference data and the reference data storing stores the associated data which matches the data specifying information received by the data specifying information receiving means.

11. The deformation testing apparatus according to claim 10, comprising: captured image judgment means capable of judging whether the deformation cycle number and the cycle progression in the deformation test matches the data specifying information; and capturing order means capable of instructing the image capturing means to take an image in a case where the captured image judgment means judges that the deformation cycle number and the cycle progression in the deformation test match the data specifying information, wherein the reference data storing means stores the associated data including the captured image data taken by the image capturing means upon an instruction by the capturing order means.

12. The deformation testing apparatus according to claim 10, comprising:
memorization necessity judgment means capable of judging whether the deformation operation information included in the associated data matches the data specifying information or not;
wherein the reference data storing means stores the associated data in a case where the memorization necessity judgment means judges that the deformation operation information matches the data specifying information.

13. The deformation testing apparatus according to claim 8, comprising:
judgment subject condition reception means capable of receiving judgment subject condition specifying the deformation cycle number and/or the cycle progression determining whether the deformation caused in the specimen is changed or not
wherein it is judged whether the deformation caused in the specimen is changed or not in a case where the associated data including the deformation operation information that matches the judgment subject condition received by the judgment subject 5 condition reception means is created, but it is not judged in a case where the associated data including the deformation operation information that does not match the judgment subject condition is created.

14. The deformation testing apparatus according to claim 13, comprising:
necessity signal creating means capable of creating a necessity signal indicating whether to match or not after it is judged whether the deformation operation information included in the associated data matches the judgment subject condition received by the judgment subject condition reception means and, wherein the necessity signal creating means transmits the necessity signal to the change detection means, and the change detection means determines it is determined whether it is judged detected or not whether that the deformation caused in the specimen is changed or not in accordance with the necessity signal created by the necessity signal creating means.

15. The deformation testing apparatus according to claim 13, wherein the detection cycle number deformation data calculating means does not calculate the detection cycle number deformation data and the subject reference data reading means does not read the reference data from the reference data storing means in a case where the deformation operation information included in the associated data does not match the judgment subject condition received by the judgment subject condition reception means.

16. A deformation testing apparatus in which a plate-like or film-like specimen is repeatedly folded and unfolded, comprising: a first attachment plate having a first attachment face on which the specimen is attached and a first edge portion that is an edge portion of the first attachment face existing on a first line segment;
a second attachment plate having a second attachment face on which the specimen is attached and a second edge portion that is an edge portion of the second attachment face existing on a second line segment;
a supporting unit capable of supporting the first attachment plate and the second attachment plate such that the first attachment plate is rotatable around the first line segment as the center relatively to the second line segment and/or the second attachment plate is rotatable around the second line segment as the center relatively to the first line segment as the first line segment and the second line segment keep their relative positions in parallel with each other such that a gap is formed between the first edge portion and the second edge portion, the specimen being bridged across the gap;
and a rotating unit capable of rotating the first attachment plate around the first line segment as the center relatively to the second line segment and/or the second attachment plate around the second line segment as the center relatively to the first line segment;
a camera capable of shooting a side face of the specimen bridged across the gap;
a camera supporting unit capable of supporting the camera and moving in accordance with movement of the first edge portion and the second edge portion;
and a controller capable of analyzing a sign of breakage of the specimen by obtaining a change of deformation of the specification shot by the camera.

17. The deformation testing apparatus according to claim 16, wherein the first edge portion and the second edge portion have a constant distance therebetween in a deformation cycle.

18. The deformation testing apparatus according to claim 17, wherein:
comprising: a connecting member capable of holding a distance constant between a first straight line and a second straight line such that the first attachment plate is directly or indirectly attached rotatably around a first straight line including a first line segment and the second attachment plate is directly or indirectly attached rotatably around a second straight line including a second line segment, and the camera supporting unit is attached to the connecting member.

19. A testing method using a deformation testing apparatus in which a plate-like or film-like specimen is repeatedly folded and unfolded, wherein the deformation testing apparatus comprises: a first attachment plate and a second attachment plate to which the specimen is attached; a supporting unit capable of supporting the first attachment plate and the second attachment plate rotatably in opposite directions around respective edge portions as respective rotation centers of the first attachment plate and the second attachment plate that define a gap therebetween, across which the specimen is bridged between the first attachment plate and the second attachment plate;
a rotation unit capable of rotating the first attachment plate and the second attachment plate; a camera capable of shooting a side face of the specimen bridged across the gap;
a camera supporting unit capable of supporting the camera and moving in accordance with movements of the respective edge portions of the first attachment plate and the second attachment plate;
an image storage capable of storing captured image data;
and a controller capable of analyzing a sign of breakage of the specimen, the method comprising the steps of: conducting a deformation test for a predetermined reference number of cycles;
shooting an image of the specimen with the camera after conducting the deformation test for the predetermined reference number of cycles;
storing thus-obtained reference captured image data of the specimen in association with the reference cycle number in the image storage;
conducting the deformation test for a detection cycle number that exceeds the reference cycle number;
shooting an image of the specimen with the camera after conducting the deformation test for the detection number of cycles;
storing thus-obtained detection captured image data of the specimen in association with the detection cycle number in the image storage;
and detecting a change therebetween by comparing the reference captured image data and the detection captured image data.

20. The testing method according to claim 19, comprising: transmitting a stop instruction of the deformation testing apparatus in a case where the change detected in the detecting exceeds a predetermined change.

* * * * *